United States Patent [19]

Endo et al.

[11] Patent Number: 5,241,421
[45] Date of Patent: Aug. 31, 1993

[54] ZOOM LENS

[75] Inventors: Hiroshi Endo, Kanagawa; Hideki Ogawa, Tokyo, both of Japan

[73] Assignee: Canon Kabushiki Kaisha, Tokyo, Japan

[21] Appl. No.: 647,495

[22] Filed: Jan. 29, 1991

[30] Foreign Application Priority Data

Jan. 31, 1990 [JP] Japan ................................. 2-020712
Jan. 31, 1990 [JP] Japan ................................. 2-020713
Jan. 31, 1990 [JP] Japan ................................. 2-020714
Jan. 31, 1990 [JP] Japan ................................. 2-020717

[51] Int. Cl.⁵ .......................................... G02B 15/14
[52] U.S. Cl. .................................. 359/684; 359/683; 359/692
[58] Field of Search ................ 350/423, 427; 359/683, 359/685, 688, 689, 684, 692

[56] References Cited

U.S. PATENT DOCUMENTS

| 4,702,567 | 10/1987 | Kato et al. | 350/427 |
| 4,789,226 | 12/1988 | Ogata | 350/427 |
| 4,830,477 | 5/1989 | Takahashi et al. | 359/685 X |
| 4,836,663 | 6/1989 | Hirakawa | 350/427 |
| 4,842,385 | 6/1989 | Tanaka | 350/427 |
| 4,861,145 | 8/1989 | Kikuchi | 350/427 |
| 5,042,927 | 8/1991 | Ogawa et al. | 359/683 |

FOREIGN PATENT DOCUMENTS

| 59-33418 | 2/1984 | Japan . |
| 59-52215 | 3/1984 | Japan . |
| 63-195618 | 8/1988 | Japan . |

Primary Examiner—Scott J. Sugarman
Attorney, Agent, or Firm—Fitzpatrick, Cella, Harper & Scinto

[57] ABSTRACT

A zoom lens is disclosed comprising a front lens group having a positive lens unit, a negative lens unit and a positive lens unit and whose overall refractive power is positive, and a rear lens group having a positive lens unit and a negative lens unit and whose overall refractive power is negative, wherein zooming is performed by varying all the lens separations between the successive two of the lens units and focusing is performed by varying at least the lens separation between the positive lens unit and the negative lens unit of the rear lens group.

20 Claims, 47 Drawing Sheets

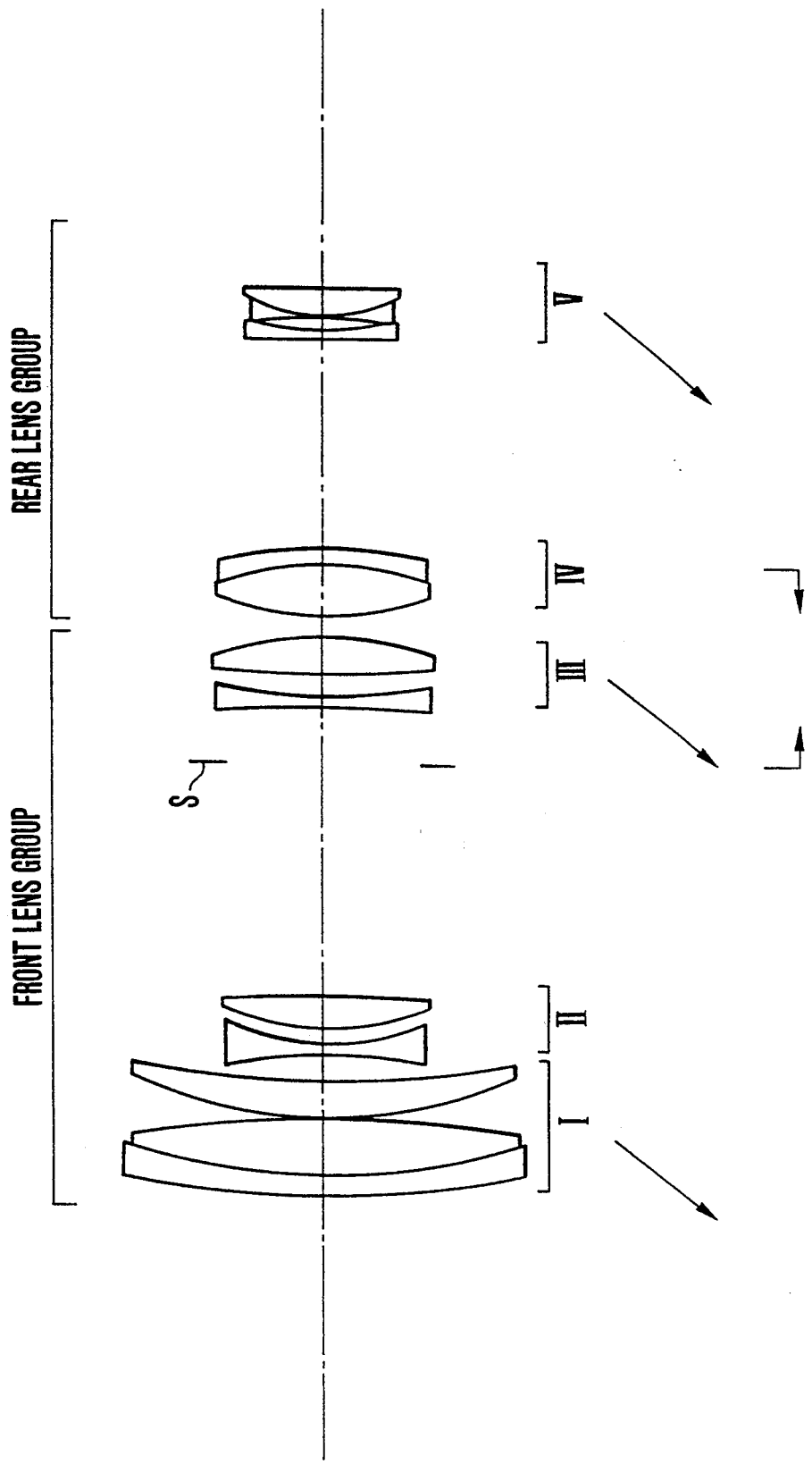

ZOOM LENS

BACKGROUND OF THE INVENTION

1. Field of the Invention

This invention relates to zoom lenses suited to 35 mm cameras, video cameras, etc. and, more particularly, to rear-focusing zoom lenses which, though being compact, have a high zoom ratio and, despite the employment of the rear-focusing method, maintain good stability of optical performance throughout an extended focusing range.

2. Description of the Related Art

The zoom lenses have generally the focusing method of moving the frontmost lens unit. Since the amount of movement of this focusing lens unit for the same object distance is constant, independent of the focal length, this method has merit in that the structure of the operating mechanism becomes relatively simple.

To extend the focusing range to very close objects, however, there is the necessity of providing an increased diameter. Otherwise, the light beam would be vignetted. In recent years, use of an electric motor in moving the focusing lens unit, or auto-focus camera, has been getting into the stream. Because the frontmost lens unit is far heavier than any of the other lens units in the photographic lens, the use of this front most lens unit as the focusing lens leads to other demerits in the consumption of electric energy by the motor and even in the focusing speed.

In a counterview to this, to reduce the difficulties due to such problems, there are many previous proposals for moving a lens unit other than the front lens unit in focusing, that is, the so-called "rear focusing" method, as, for example, in Japanese Laid-Open Patent Applications Nos. Sho 59-33418, Sho 59-52215 and Sho 63-195618.

In the Patent Application No. Sho 59-33418, the image forming lens unit, which remains stationary during zooming, is made to move in part to effect focusing. Because the focusing sensitivity E (movement of a plane of sharp focus with respect to movement of the focusing lens) is constant in the entire zooming range, the focusing speed has to be increased particularly in the telephoto positions. Even in the compact aspect, no sufficient improvements have been attained.

The Patent Application No. Sho 59-52215 discloses a zoom lens composed of four lens units wherein the third lens unit, when counted from the front, is made to move toward the relay lens unit to effect focusing. In view of the fact that the total length left is relatively long, however, much desired reduction of the bulk and size seems to have not been achieved yet.

The Patent Application No. Sho 63-195618 discloses application of the rear-focusing zoom lens to standard systems including wide-angle coverages. Also, the number of movable lens elements in the lens unit movable for focusing is so large that if all these lens elements are moved by a single automatic focusing device, quick focusing is difficult to perform.

As the five-unit type of zoom lens, mention may be made of U.S. patent application Ser. No. 444,942 filed on Dec. 4, 1989 now U.S. Pat. No. 5,136,431.

SUMMARY OF THE INVENTION

With such problems in mind, an object of the present invention is to provide a rear-focusing zoom lens which, if used in the form of a high range telephoto system, is compact, or if applied to the auto-focus camera, takes into consideration the usefulness of the focusing lens unit so that speedy focusing can be performed.

Thus, according to the invention, in a preferred embodiment thereof, the rear-focusing zoom lens comprises a plurality of lens units, of which a front lens group (first, second and third lens units, when counted from the front) has a positive refractive power as a whole, and a rear lens group includes a lens unit having a positive refractive power and a lens unit having a negative refractive power in this order from the front (fourth and fifth lens units) and has a negative refractive power as a whole. When zooming from the wide-angle end to the telephoto end, the image magnification of the front lens group is increased. Further, all the axial separations between the lens units are made to vary. Also the axial separations between the lens units which are required for increasing the image magnification of the aforesaid rear lens group are made to vary, thus making it possible to extend the zooming range. Further, focusing is performed by varying the axial separation between the aforesaid positive lens unit and negative lens unit of the rear lens group under the condition that the magnification $\beta_4$ of the aforesaid positive lens lies in the following range:

$$|\beta_4| < 1 \tag{1}$$

BRIEF DESCRIPTION OF THE DRAWINGS

FIGS. 1, 2, 3, FIGS. 7, 8, 9, FIGS. 13, 14, 15 and FIGS. 19, 20, 21 and 22 are longitudinal section views of zoom lenses concerning the invention.

FIGS. 4(A)-1, 4(A)-2, 4(B)-1, 4(B)-2, 4(C)-1, 4(C)-2, 5(A)-1, 5(A)-2, 5(B)-1, 5(B)-2, 5(C)-1, 5(C)-2, 6(A)-1, 6(A)-2, 6(B)-2, 6(C)-1, 6(C)-2, 10(A)-1, 10(A)-2, 10(B)-1, 10(B)-2, 10(C)-1, 10(C)-2, 11(A)-1, 11(A)-2, 11(B)-1, 11(B)-2, 11(C)-1, 11(C)-2, 12(A)-1, 12(A)-2, 12(B)-1, 12(B)-2, 12(C)-1, 12(C)-2, 16(A)-1, 16(A)-2, 16(B)-1, 16(B)-2, 16(C)-1, 16(C)-2, 17(A)-1, 17(A)-2, 17(B)-1, 17(B)-2, 17(C)-1, 17(C)-2, 18(A)-1, 18(A)-2, 18(B)-1, 18(B)-2, 18(C)-1, 1(C)-2, 23(A)-1, 23(A)-2, 23(B)-1, 23(B)-2, 23(C)-1, 23(C)-2, 24(A)-1, 24(A)-2, 24(B)-1, 24(B)-2, 24(C)-1, 24(C)-2, 25(A)-1, 25(A)-1, 25(A)-2, 25(B)-1, 25(B)-2, 25(C)-1, 25(C)-2, 26(A)-1, 26(A)-2, 26(B)-1, 26(B)-2, 26(C)-1, 26(C)-2 are graphic representations of the aberrations of numerical examples 1 to 13 of the invention respectively. In the aberration curves, ones having the figure numbers with (A)-1, (B)-1 and (C)-1 affixed are obtained in the wide-angle end, a middle position and the telephoto end respectively with an object at an infinite distance, and ones having the figure numbers with (A)-2, (B)-2 and (C)-2 affixed are obtained in the wide-angle end, the middle position and the telephoto end respectively with an object at a distance of 3 meters.

d stands for the spectral d-line and g for the g-line. S.C represents the sine condition. ΔS denotes the sagittal image surface, ΔM the meridional image surface, and y the image height.

DETAILED DESCRIPTION OF THE PREFERRED EMBODIMENTS

The present invention is next described in connection with embodiments thereof by reference to the drawings.

Figure 1:
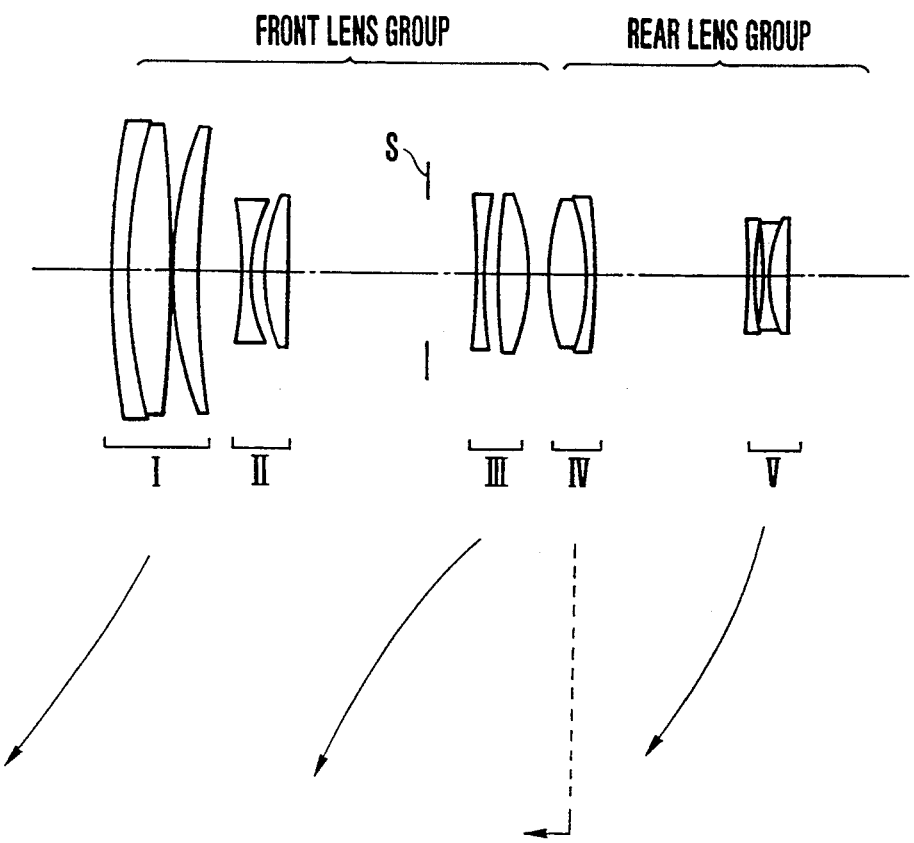
Figure 2:
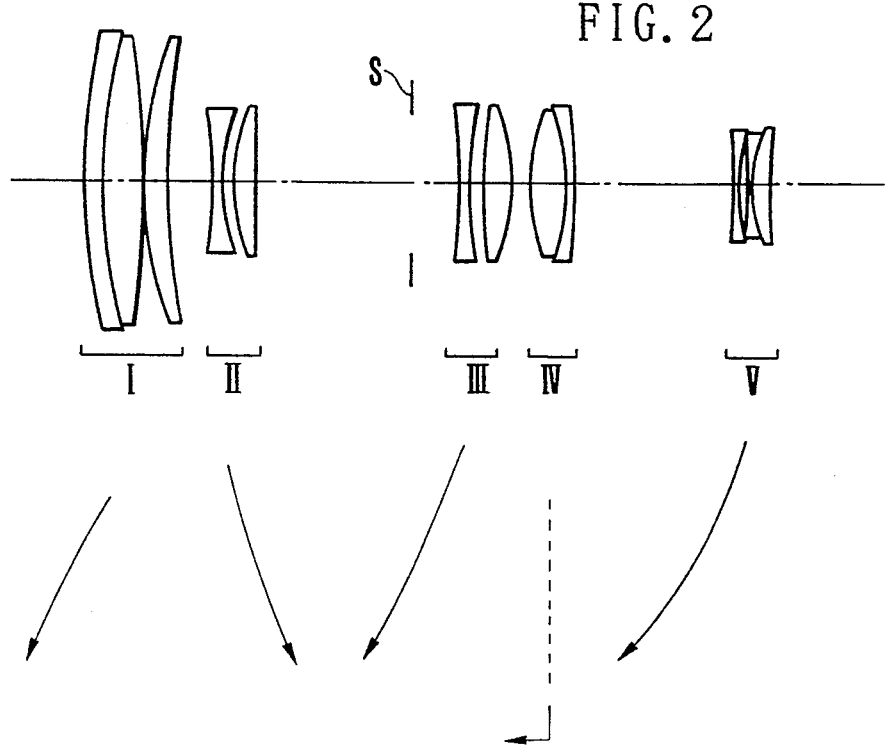
Figure 3:
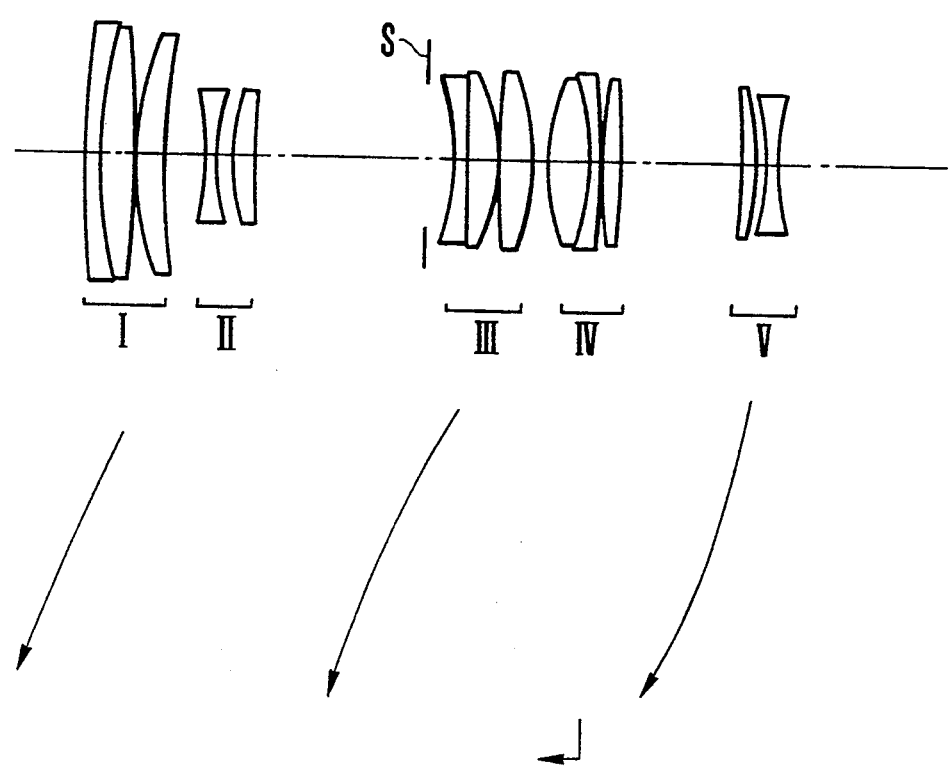
Figures 1, 4A:
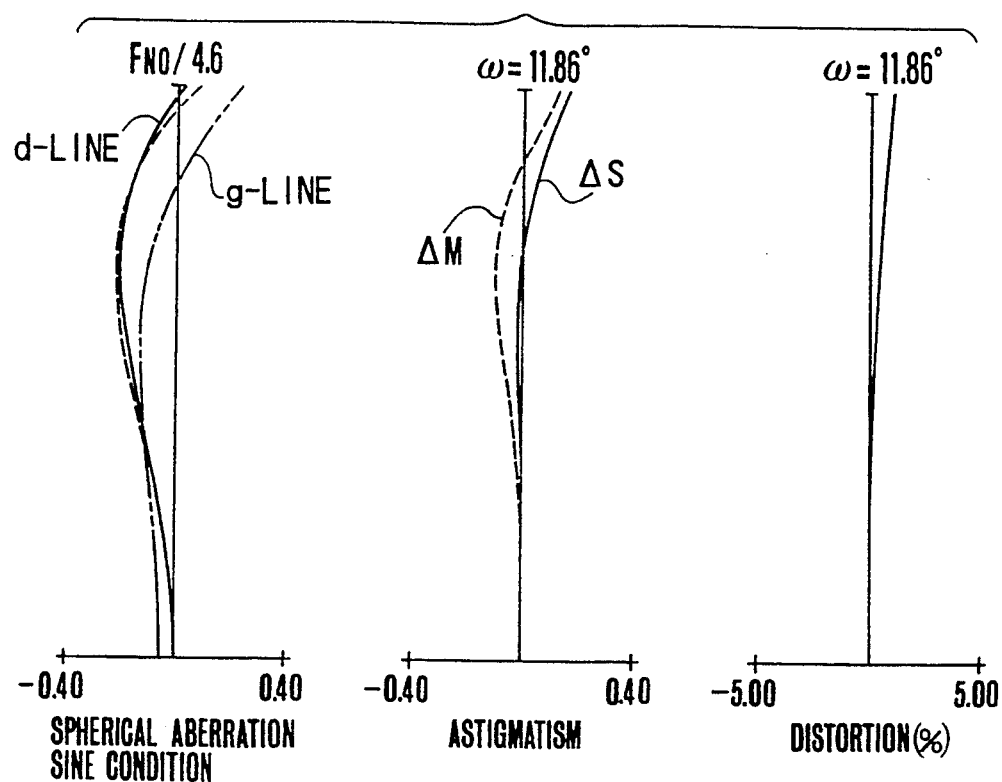
Figures 2, 4A:
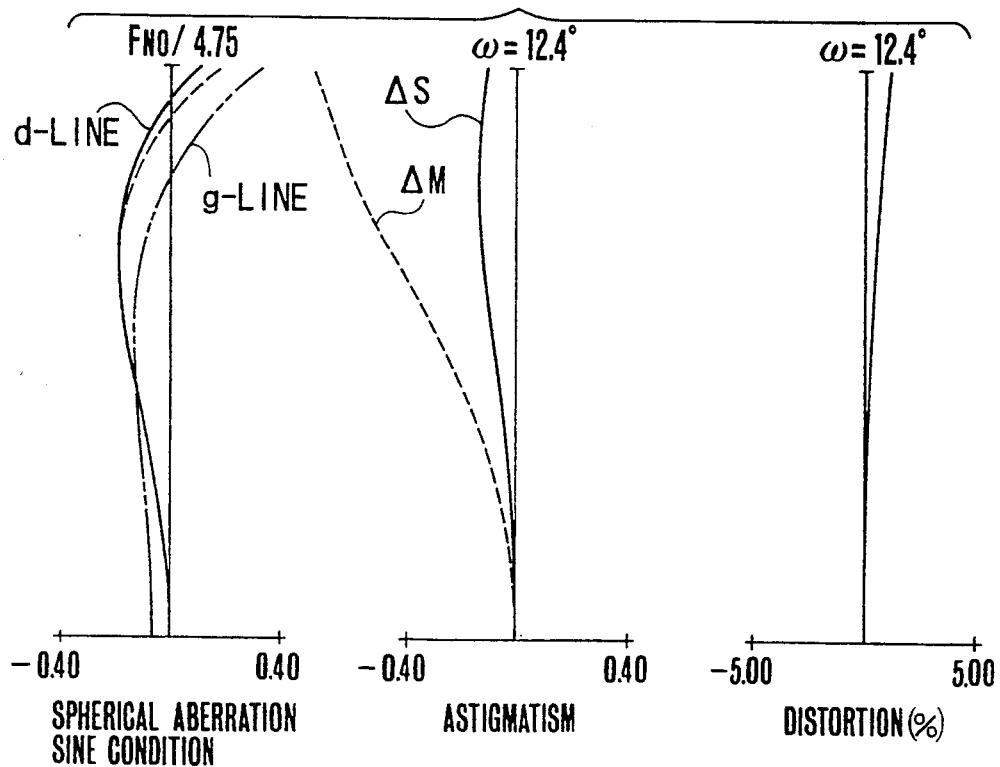
Figures 1, 4B:
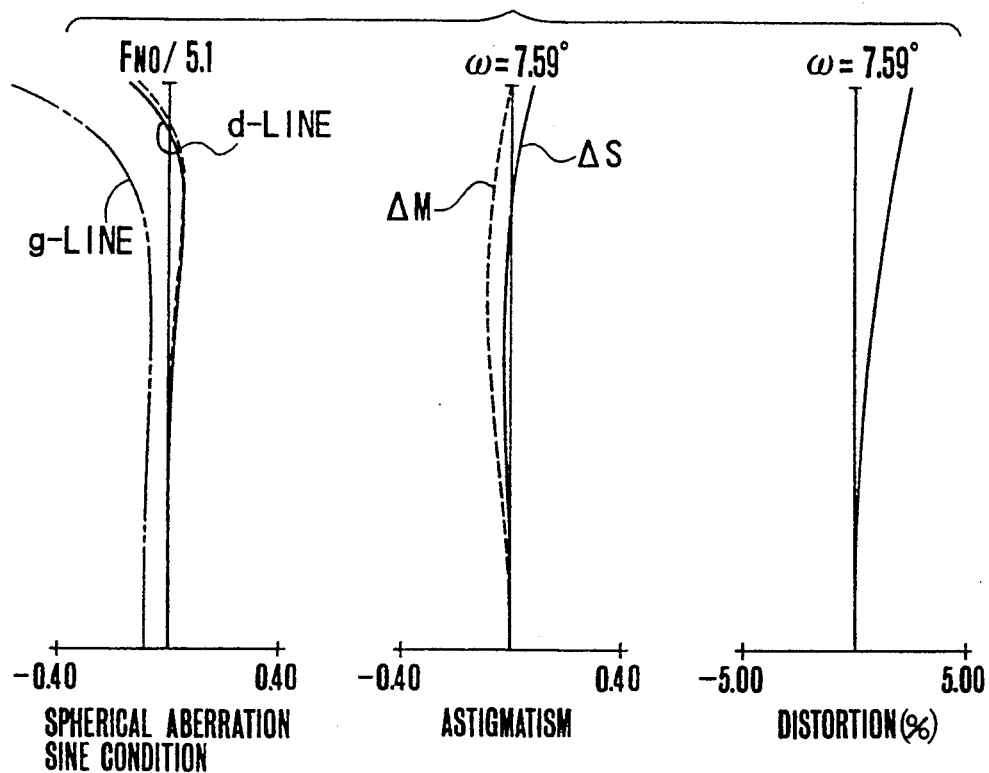
Figures 2, 4B:
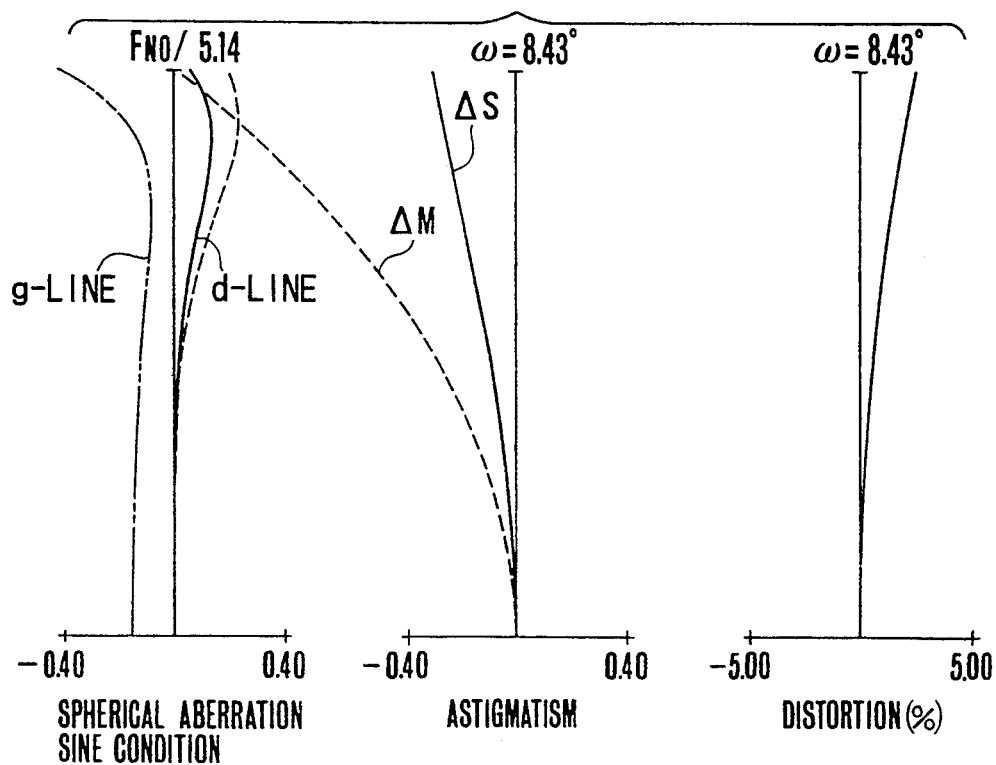
Figures 1, 4C:
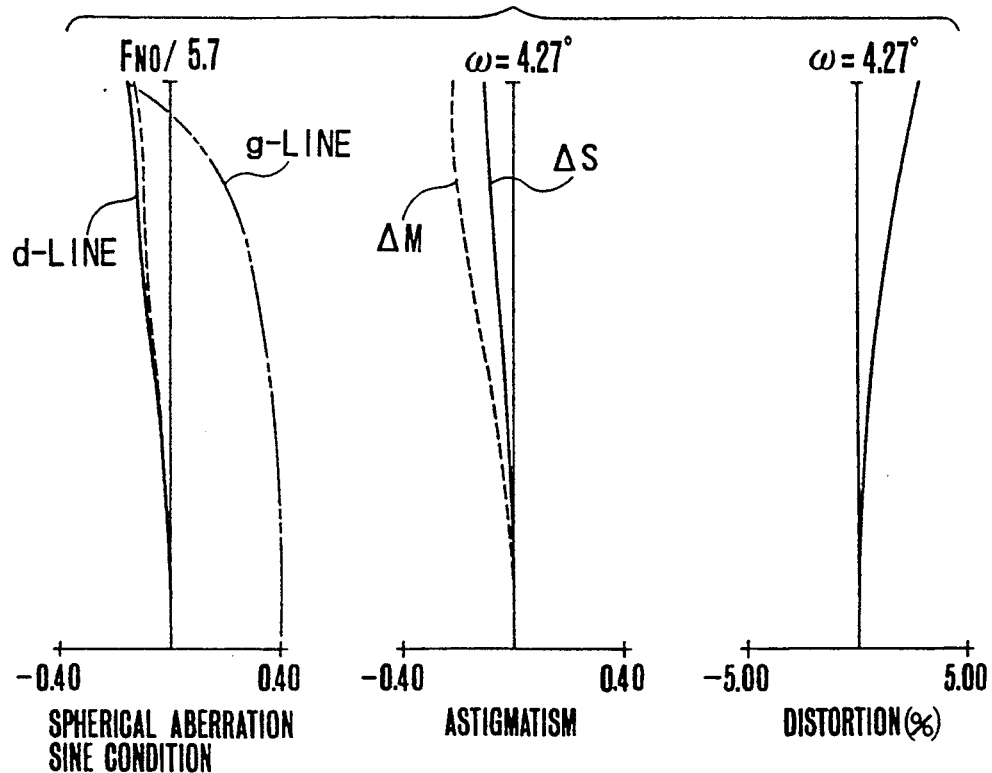
Figures 2, 4C:
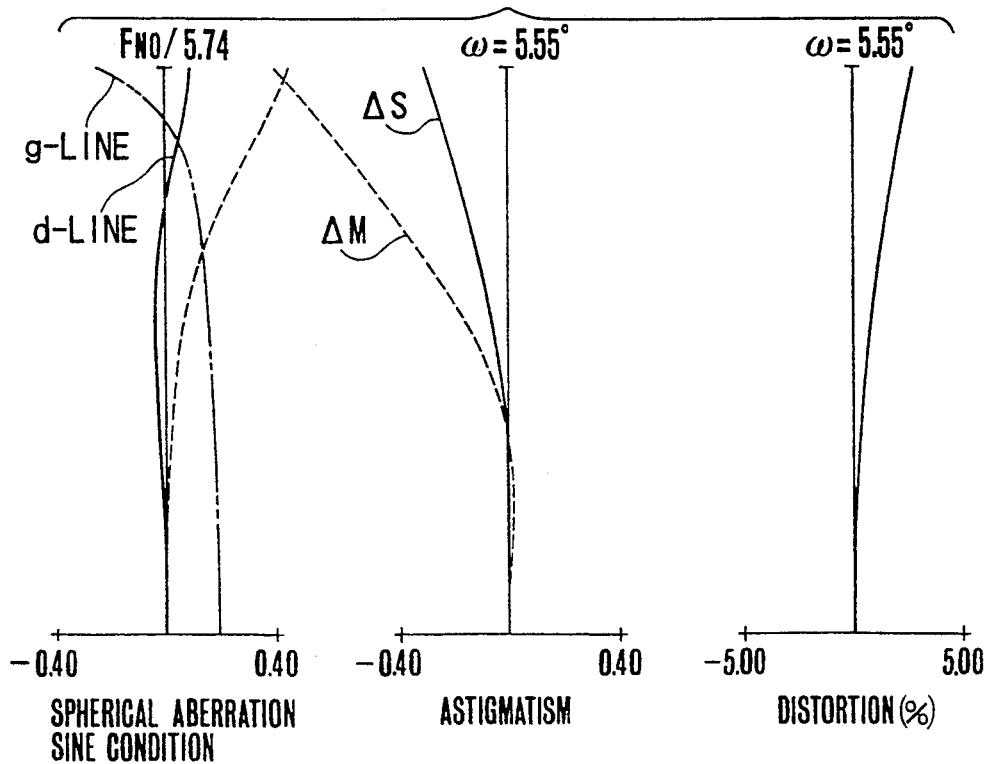
Figures 1, 5A:
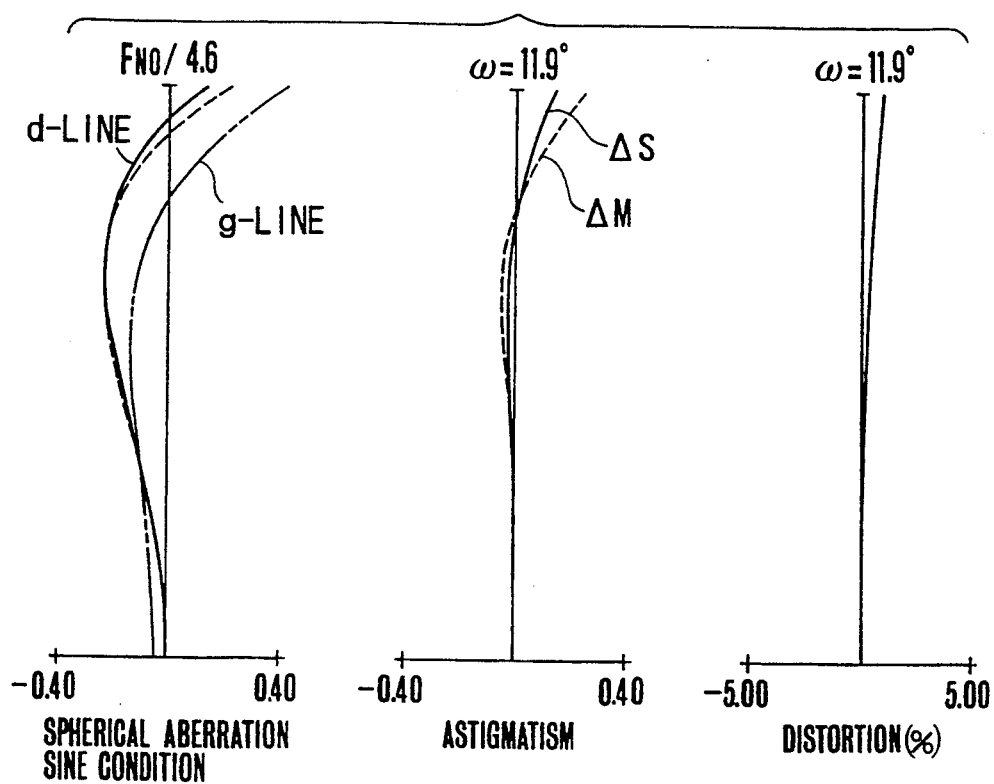
Figures 2, 5A:
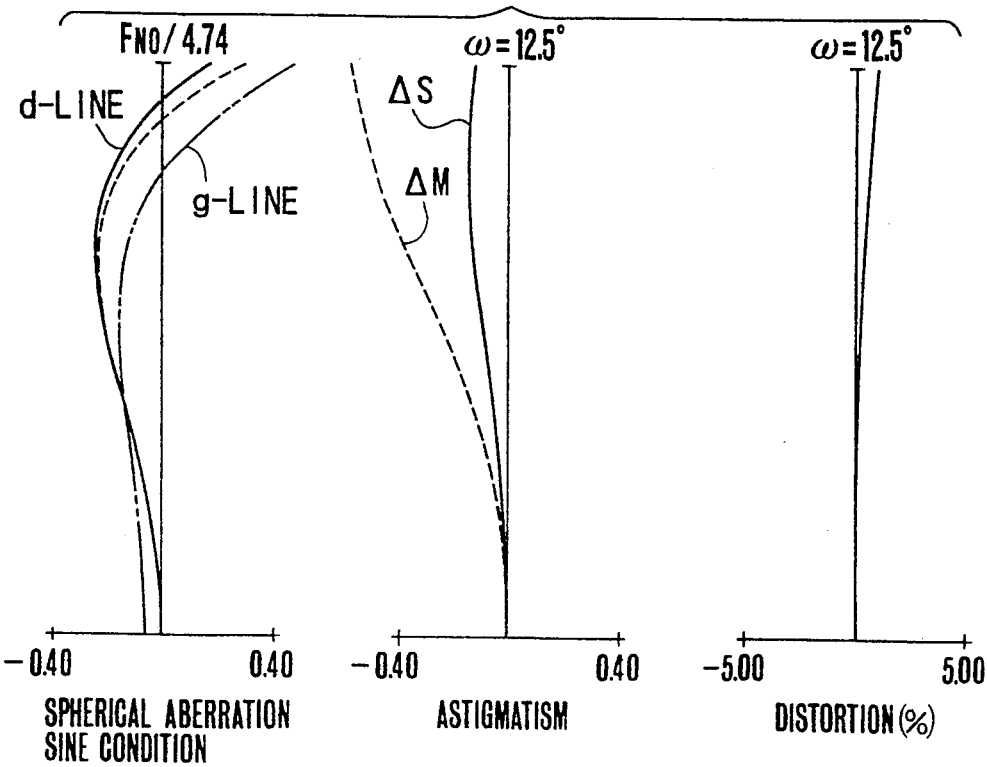
Figures 1, 5B:
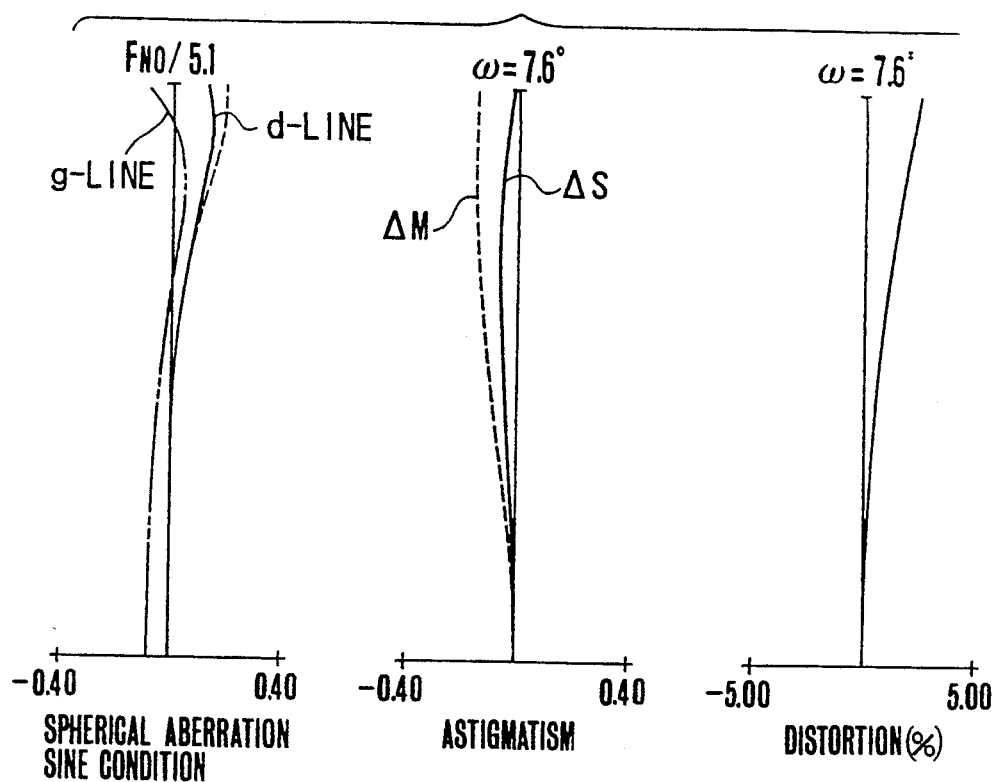
Figures 2, 5B:
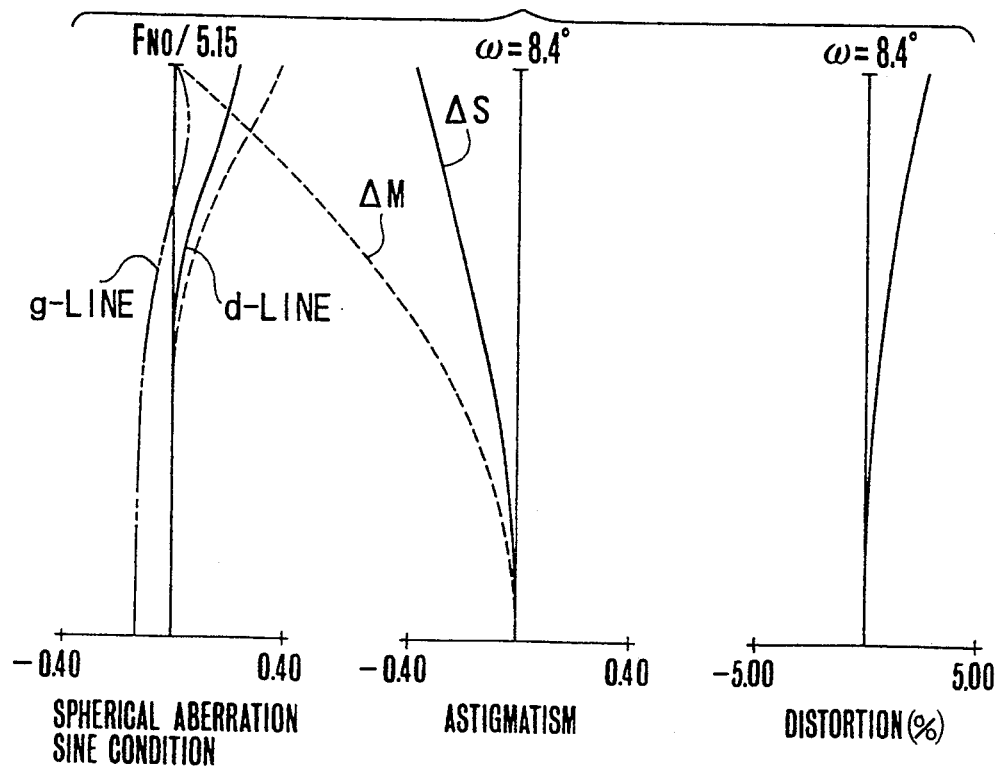
Figures 1, 5C:
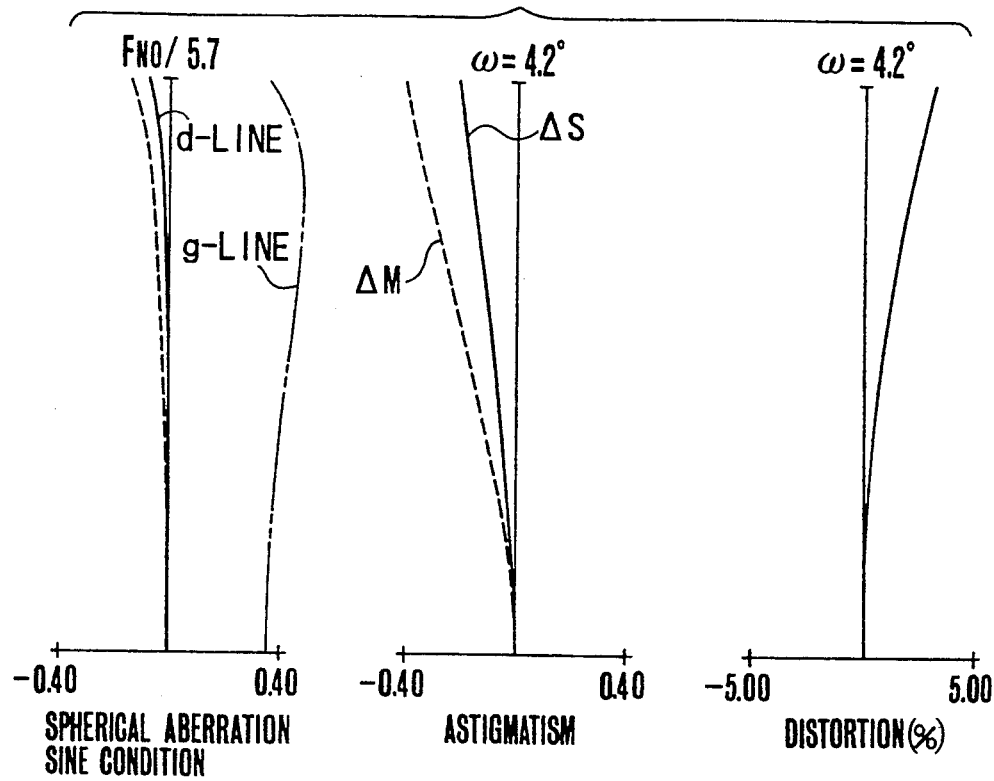
Figures 2, 5C:
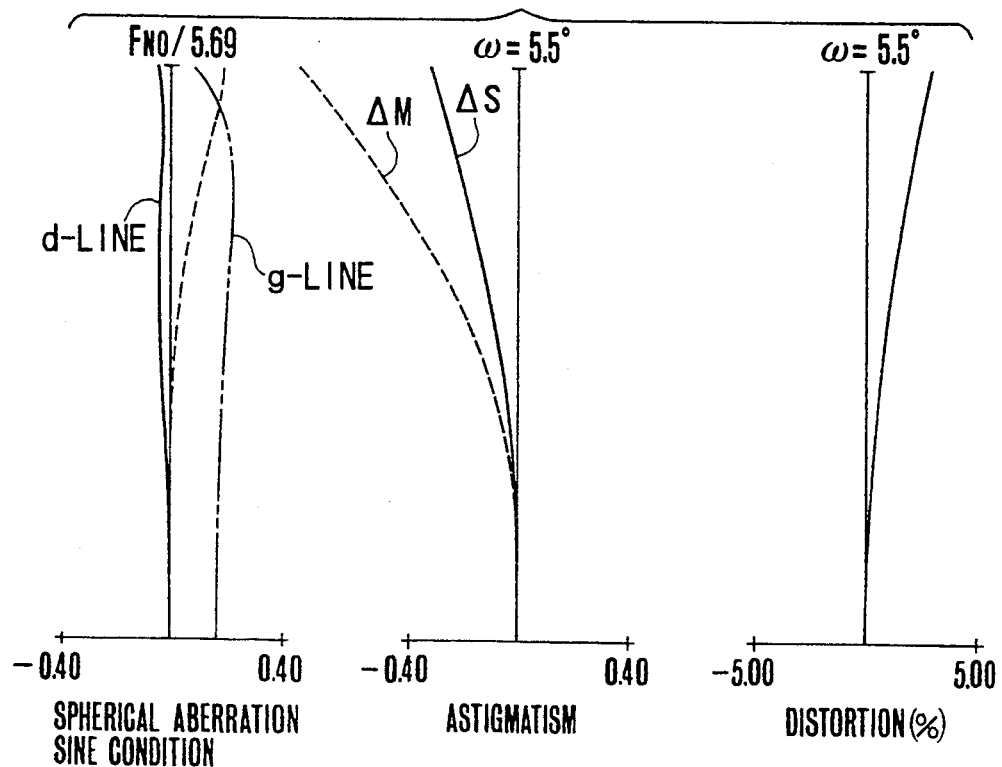
Figures 1, 6A:
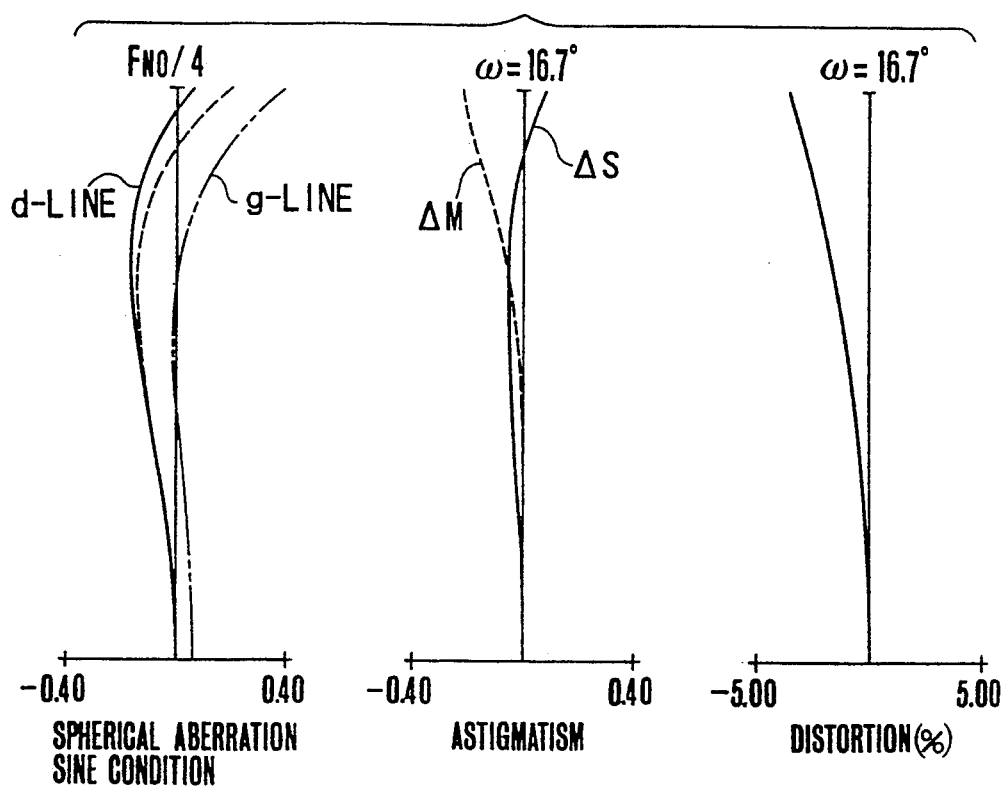
Figures 2, 6A:
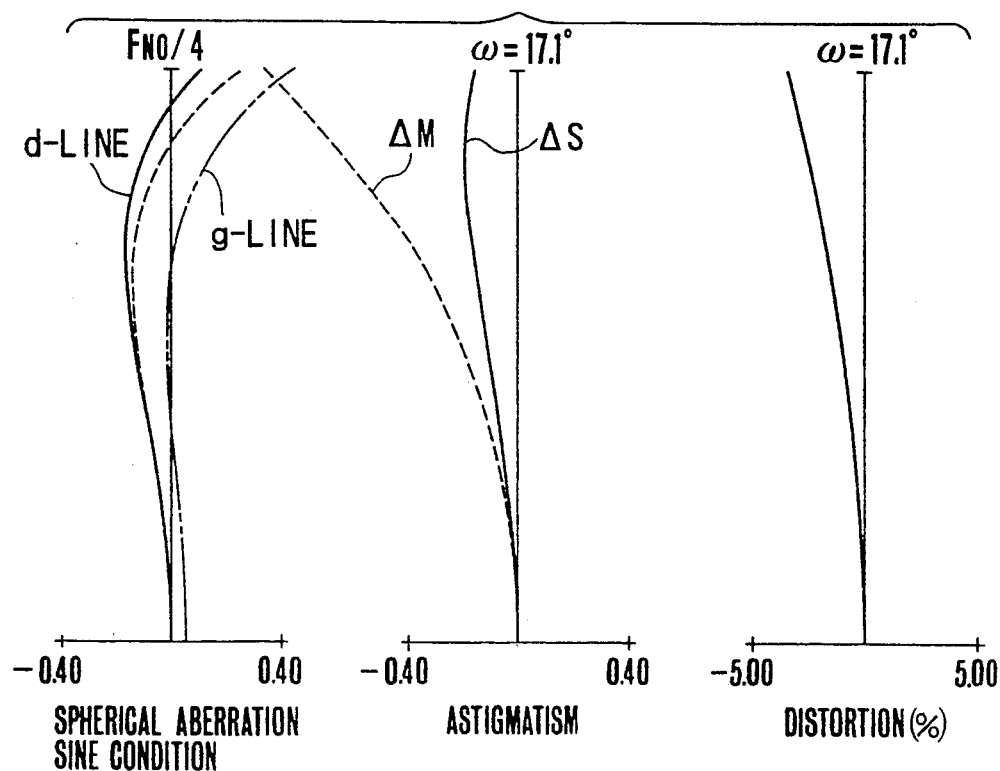
Figures 1, 6B:
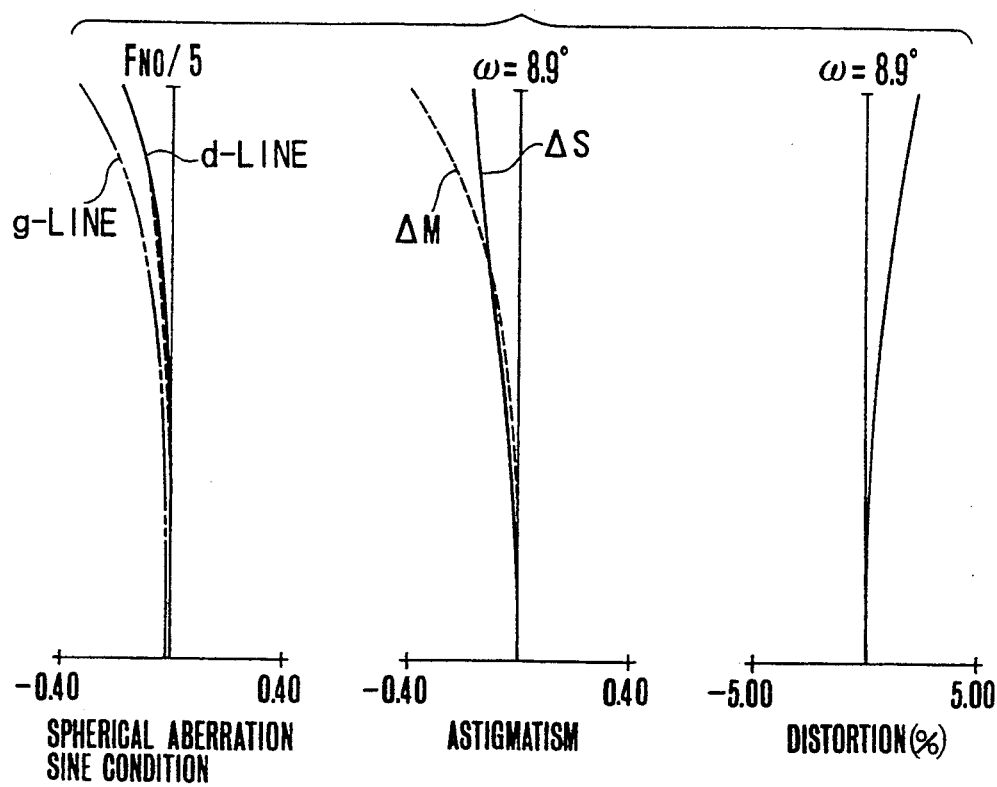
Figures 2, 6B:
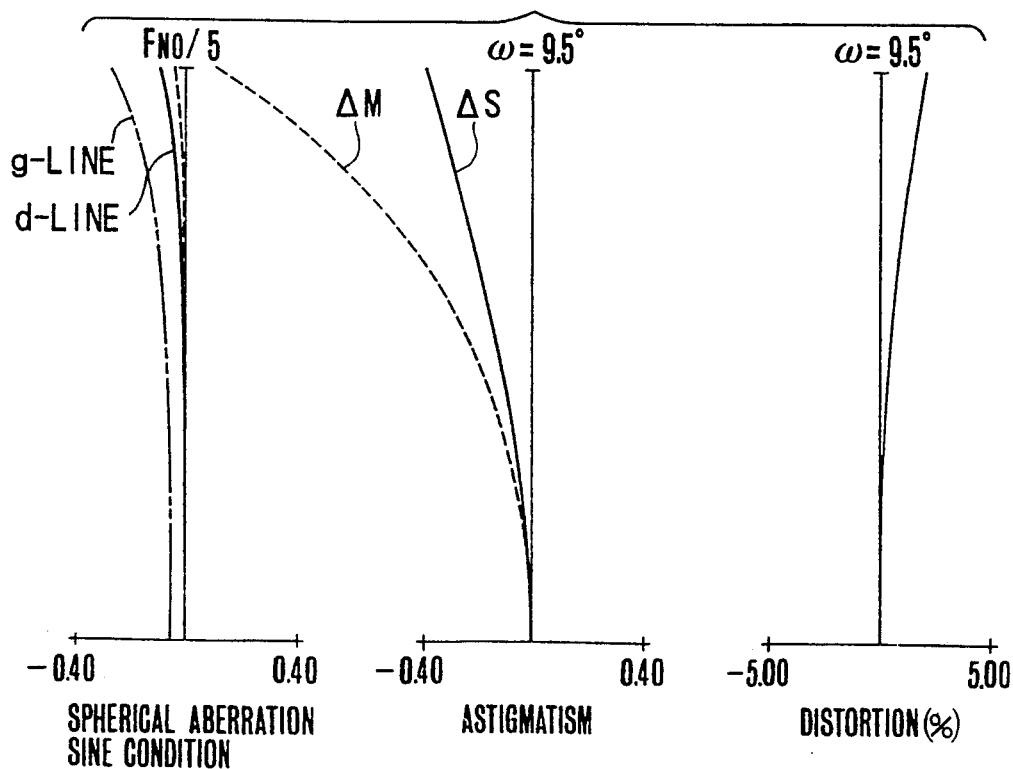
Figures 1, 6C:
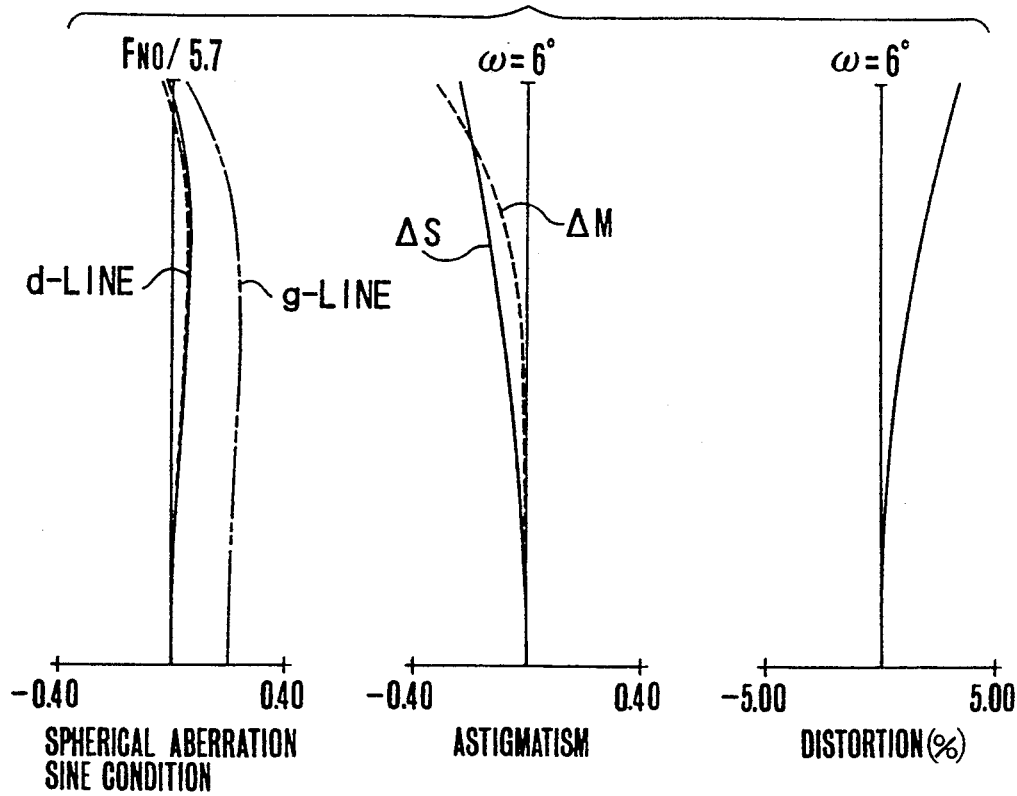
Figures 2, 6C:
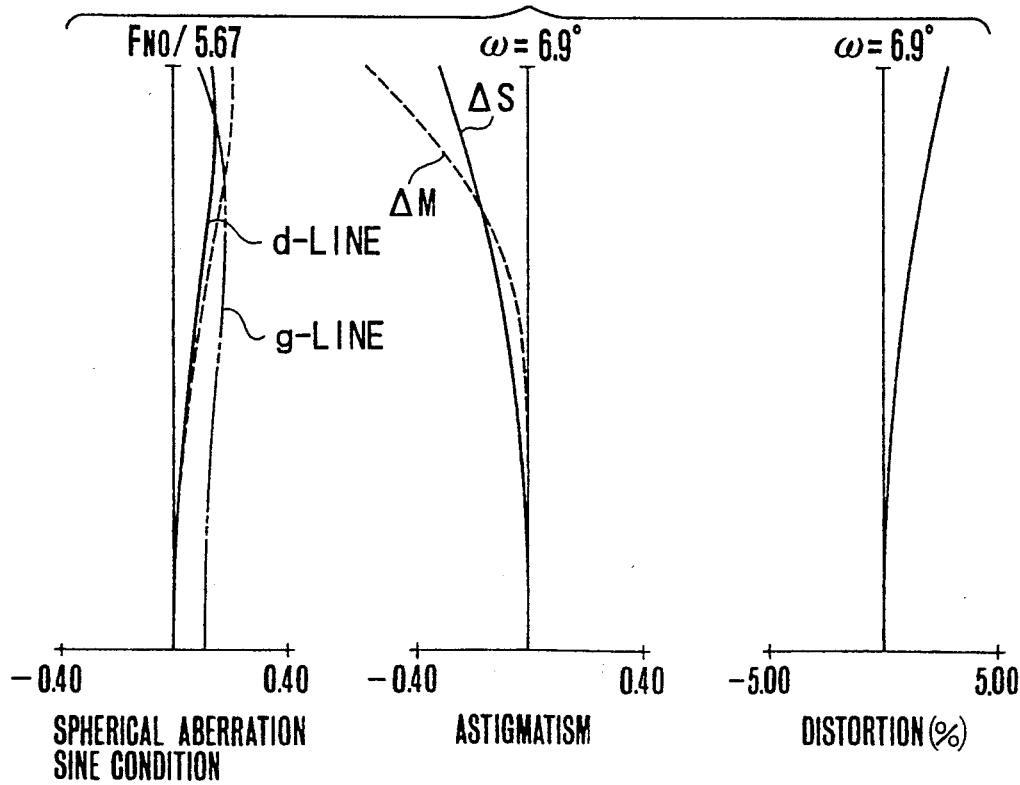

FIG. 1 to FIG. 3 in longitudinal section views show three numerical examples 1 to 3 of specific zoom lenses of the invention.

The zoom lens comprises, from front to rear, a first lens unit I having a positive refractive power, a second lens unit II having a negative refractive power, a third lens unit III having a positive refractive power, a fourth lens unit IV having a positive refractive power, and a fifth lens unit V having a negative refractive power.

Under such a refractive power arrangement, zooming from the wide-angle side to the telephoto side is performed like the motion loci shown by curve lines, where the axial separation between the first lens unit I and the second lens unit II is widened, the axial separation between the second lens unit II and the third lens unit III is narrowed, the axial separation between the third lens unit III and the fourth lens unit IV is widened, and the axial separation between the fourth lens unit IV and the fifth lens unit V is narrowed. In other words, the zoom ratio is heightened in such a way that, as zooming from the wide-angle end to the telephoto end, all the air separations between the lens units are made to vary so as to increase the lateral magnification of the entirety of the front lens group composed of the first, second and third lens units and having a positive refractive power as a whole and also the lateral magnification of the entirety of the rear lens group composed of the fourth and fifth lens units and having a negative refractive power as a whole. Further, the refractive powers of the front lens group and the rear lens group are made positive and negative respectively to get the telephoto type. By means of this, a minimization of the size is achieved.

In this specific embodiment of the invention, for focusing purposes, use is made of the fourth lens unit just behind the front lens group. In the converging light bundle emerging from the front lens group, therefore, the fourth lens unit is moved forward as the object distance decreases from infinity to a minimum, as indicated by a straight solid line. Another feature of this embodiment is that as zooming from the wide-angle end to the telephoto end, the movement of the third lens unit of the zoom lens is made forward in order to earn room for increasing the zoom ratio, and a space is formed behind the third lens unit when in the telephoto positions. By utilizing this space, an improvement of the minimization of the size of the whole photographic lens is achieved, because the fourth lens unit is brought into that space when focusing. Thus, it is made possible to extend the focusing range to sufficiently closer objects.

The present invention has set forth the inequality of condition (1) on the view that the fourth lens unit, when used as the focusing lens, moves forward with a decrease of the object distance as a prerequisite for ensuring speedy and accurate focusing control.

To this end, the present invention sets forth additional preferable conditions below.

That is, letting the total zooming movement of the fifth lens unit (last lens unit) of negative power be denoted by $M_5$ (the direction from the object side to the image side being taken as positive), its focal length by $f_5$, the longest focal length of the entire lens system by $f_T$ and the zoom ratio by Z, the conditions are described as follows:

$$M_5 < 0 \tag{2}$$

$$0.07 < |f_5|/f_T < 0.45 \tag{3}$$

$$0.095 < |M_5|/(Z \cdot |f_5|) < 0.5 \tag{4}$$

By the way, to realize rear focusing in the zoom lens, it is in the general case that at least the following prerequisites must be taken into consideration before the conditions are defined.

(a) The magnification $\beta_F$ of the focusing lens unit should not take the values of $$|\beta_F| = 1$$

at any station in the range of focal lengths.

(b) The sensitivity $ES_F$ of the focusing lens unit should have an adequate value. The prerequisite (a) means that for $|\beta_F| = 1$, even if the focusing lens unit is moved anyway, the position of the image plane does not change. Thus, focusing becomes impossible. Also, when $|\beta_F| > 1$, it is rearward that the focusing lens moves to effect focusing from infinity to the minimum object distance. When $|\beta_F| < 1$, the direction has to be reversed. Concerning the second prerequisite (b), if the sensitivity $ES_F$ is too small, as it implies that even when the focusing lens unit moves a large distance, the image plane can barely shift, the focusing time will be prolonged and the total length of the lens will increase in order to create a space long enough to ensure the full focusing range. Both results are unfavorable. Conversely when the sensitivity $ES_F$ is too large, a slight movement of the focusing lens unit will result in a large shift of the image plane, so that to control the position of the focusing lens unit is very difficult and, therefore, is not practical. Since the sensitivity $ES_F$ increases in proportion to the square of the ratio of the concurrent focal length to the shortest one, because the required amount of focusing movement for the same object distance is constant at any value of the focal length, there is a need to provide the zoom lens with an equal space for the total focusing movement from when in the wide-angle end to when in the telephoto end. This leads to a large increase in the size of the entire lens system and a reduction in the degree of freedom of design.

Here, in the fourth lens unit IV whose sensitivity is $E_4$ and whose lateral magnification is $\beta_4$ and the fifth lens unit V whose sensitivity is $E_5$, whose focal length is $f_5$ and whose lateral magnification is $\beta_5$ with the distance from the rear principal point of the fifth lens unit V to the image plane when focused on an infinitely distant object being $e_5$, the following relations are obtained:

$$E_4 = (1 - \beta_4^2) \cdot \beta_5^2 \tag{A}$$

$$\beta_5 = 1 - e_5/f_5 \tag{B}$$

Here, in the invention, the distance $e_5$ takes a positive value and the focal length $f_5$ takes a negative value. From the formula (B), therefore, it is understandable that the lateral magnification $\beta_5$ of the fifth lens unit V is always more than 1. The inequalities of condition (2) show that the fifth lens unit V has increasing distances $e_5$ from the image plane when zooming from the wide-angle end to the telephoto end. Hence, the formula (B) gives the fifth lens unit V increasing lateral magnifications $\beta_5$. From the formula (A), therefore, the sensitivity $E_4$ of the fourth lens unit increases as zooming from the wide-angle end to the telephoto end.

In other words the condition (2) means that the total focusing movement is given a moderate increase when on the wide-angle side, while it is suppressed by a moderate amount when on the telephoto side.

By setting forth condition (3) for the focal length of the fifth lens unit, the focus sensitivity $E_4$ of the fourth lens unit is given an appropriate value to make easy performance of control in adjusting the lens position particularly when in application to automatic focusing, and further to make it possible to carry out speedy automatic focusing.

In other words, when the focal length of the fifth lens unit is too short as exceeding the lower limit of condition (3), the lateral magnification $\beta_5$ of the fifth lens unit becomes much too large as is apparent from the formula (B). Also from the formula (A), the focusing sensitivity $E_4$ of the fourth lens unit becomes large. Therefore, although the total focusing movement decreases, it is difficult to control the lens position by automatic focusing.

Meanwhile, when the focal length of the fifth lens unit is too long as exceeding the upper limit of condition (3), the focusing sensitivity $E_4$ conversely becomes much too small as is apparent from the formulas (A) and (B). Although the accuracy of control of the lens position increases, it becomes necessary to increase the space for securing the prescribed focusing range when in the wide-angle end. This leads to a large increase in the total length of the lens. Another disadvantage arising from the increase of the total focusing movement is that automatic focusing lacks quickness.

The inequalities of condition (4) give a proper range for the focusing sensitivity or the sensitivity $E_4$ of the fourth lens unit. When the lower limit of the condition (4) is exceeded, or the movement of the fifth lens unit is small compared with the product of the zoom ratio and the focal length of the fifth lens unit, the focusing sensitivity of the fourth lens unit becomes so small that particularly when on the telephoto side, the total focusing movement increases much too largely, causing the size of the lens system to increase and the focusing speed to slow down. There are likewise disadvantages.

Meanwhile, when the movement of the fifth lens unit is too large as exceeding the upper limit, the total focusing movement becomes much too small. In this event too, the ability to control the lens position is lowered.

Further, in the invention, it is desired to satisfy the following conditions:

$$0.5 < |f_5|/e_{5W} < 1.4 \tag{5}$$

$$0.35 < \beta_{4T}/(\beta_{4W} \cdot Z) < 0.95 \tag{6}$$

where $e_{5W}$: the distance from the rear principal point of the fifth lens unit to the image plane in the wide-angle end;

$\beta_{4W}$: the lateral magnification of the fourth lens unit in the wide-angle end;

$\beta_{4T}$: the lateral magnification of the fourth lens unit in the telephoto end.

It should be noted that the lateral magnification used herein is measured when focusing is performed on an object at infinity.

The inequalities of condition (5) have an aim to make proper the sensitivity of the fourth lens unit in the wide-angle end. The value of the distance $e_{5W}$ is determined almost depending on the back focal distance. Therefore, when the focal length of the fifth lens unit is longer than the upper limit of the condition (5), the lateral magnification of the fifth lens unit becomes small. Hence, a small sensitivity of the fourth lens unit results. This leads to the necessity of taking a wide space for focusing purposes in the wide-angle end. So, the total length of the lens is caused to increase largely. When the focal length of the fifth lens unit is shorter than the lower limit of the condition (5), the lateral magnification of the fifth lens unit becomes large. Therefore the sensitivity of the fourth lens unit becomes large. However, in the aberration correction, it is not favorable because pincushion type distortion increases.

The inequalities of condition (6) give a proper range for the ratio of the sensitivities for the telephoto end and wide-angle end of the fourth lens unit. When the upper limit is exceeded, the ratio of the sensitivities for the telephoto end and wide-angle end of the fourth lens unit becomes small. In other words, the difference between the amounts of focusing movement for the same object in the wide-angle end and the telephoto end becomes too large. When the lower limit of the condition (6) is exceeded, the ratio of the sensitivities for the wide-angle end and telephoto end becomes too large. This leads either to the necessity of taking a wide focus space in the wide angle end, or increasing the difficulty of mechanical control because the sensitivity becomes too large in the telephoto end. Neither of these is favorable.

Next, the zoom lens comprising five units of the present embodiment is made to satisfy the following conditions:

$$0.5 f_T/f_W < \Delta e_{34}/D_W < 0.15 f_T/f_W \tag{7}$$

$$-3.5 < f_{12W}/f_W < -1.3 \tag{8}$$

$$0.05 < f_5/f_{12W} < 0.6 \tag{9}$$

$$0.35 < f_3/f_4 < 2.5 \tag{10}$$

where $f_W$ and $f_T$ are the shortest and longest focal lengths of the entire lens system respectively, fi is the focal length of the i-th lens unit, $f_{12W}$ is the combined focal length of the first lens unit and the second lens unit in the wide-angle end, $\Delta e_{34}$ is the amount of change of the interval between the principal points of the third lens unit and the fourth lens unit in the telephoto end with respect to that in the wide-angle end, and $D_W$ is the distance from the frontmost lens surface to the rearmost lens surface of the entire lens system in the wide-angle end.

Particularly in the present embodiment, the refractive powers of all the lens units and their paraxial arrangement are so determined as to achieve a minimization of the bulk and size of the whole lens system in such a manner that the whole lens system does not become much too strong in the inverted telephoto type, or gets a relatively weak inverted telephoto type, which prevents the back focal distance from becoming unnecessarily long.

The technical significance of each of the above-described conditions is explained below.

The inequalities of condition (7) are to prescribe the amount of variation of the interval between the principal points of the third lens unit and fourth lens unit in relation to the total length of the lens in the wide-angle end with variation of the focal length from the wide-angle end to the telephoto end. When the interval between the principal points of the third lens unit and the fourth lens unit in the telephoto end is too large as exceeding the upper limit of the condition (7), there arises the necessity of increasing the space for their movements to secure the prescribed zooming range so that they do not interfere with each other in the wide-angle end. As a result, the total length of the lens in the wide-angle end is increased objectionably.

When the interval between the principal points of the third lens unit and the fourth lens unit in telephoto end is too small as exceeding the lower limit of the condition (7), the zoom strokes of the first lens unit and the fifth lens unit must be increased largely in order to obtain the desired zoom ratio while still permitting the optical total length to be shortened in the wide-angle end, too.

The inequalities of condition (8) are to prescribe the ratio of the focal length of the fifth lens unit to the combined focal length of the first lens unit and the second lens unit in the wide-angle end. When the negative refractive power of the fifth lens unit is too weak as exceeding the upper limit of the condition (8), distortional aberration is in a direction to decrease, but there arises the necessity of making wide the separation between the fourth lens unit and the fifth lens unit in the wide-angle end in order to obtain the predetermined zoom ratio. Further, the back focal distance, too, in the wide-angle end becomes longer than necessary. Therefore, it becomes difficult to achieve a minimization of the bulk and size of the whole lens system.

When the negative refractive power of the fifth lens is too strong as exceeding the lower limit of the condition (8), pincushion type distortion increases and the Petzval sum increases in the negative direction. Therefore, the image surface characteristic becomes difficult to correct, which is undesirable.

The inequalities of condition (9) are to prescribe the ratio of the combined focal length of the first lens unit and the second lens unit in the wide-angle end to the shortest focal length of the entire system and have an aim to make optimum the back focal distance to thereby achieve an advance in the compactness of the whole lens system while still suppressing the variation of aberrations with zooming.

When the combined negative refractive power of the first lens unit and the second lens unit is too weak as exceeding the upper limit of the condition (9), this is advantageous for minimizing the outer diameters of the third lens unit and those that follow, and, in the case where the diaphragm is arranged on the image side of the second lens unit, for shortening the outer diameter of the lens barrel owing to the minimization of the diameter of the diaphragm, but it is difficult to secure the necessary back focal distance, while still maintaining an advance in the compactness of the entire lens system to be achieved. Also, there is need to strengthen the negative refractive power of the fifth lens unit. As a result, distortional aberration of pincushion type increases largely.

When the combined negative refractive power of the first lens unit and the second lens unit is too strong as exceeding the lower limit of the condition (9), the back focal distance is so long as to increase the size of the entire lens system and to increase the variation of various aberrations, particularly spherical aberration and field curvature. Also, the diaphragm diameter for securing the necessary F-number, too, increases, causing the outer diameter of the lens barrel to increase, which is not desirable.

The inequalities of condition (10) are to prescribe the ratio of the focal length of the third lens unit to the focal length of the fourth lens unit. When the positive refractive power of the third lens unit is too weak as exceeding the upper limit of the condition (10), it becomes difficult to achieve a minimization of the bulk and size of the lens system because there is need to take a large separation between the fourth lens unit and the fifth lens unit in the wide-angle end in order to obtain the predetermined zoom ratio. Also, to preserve the compactness of the lens system, the refractive power of the second lens unit or the fifth lens unit must be strengthened. This results in an increase of the difficulty of correcting various aberrations.

When the refractive power of the third lens unit is too strong as exceeding the lower limit of the condition (10), the third lens unit produces large aberrations, particularly spherical aberration, which are difficult to correct in good balance by the design of the other lens units.

Three numerical examples of zoom lenses of the invention are shown below. In the numerical examples 1 to 3, Ri is the radius of curvature of the i-th lens surface, when counted from the front, Di is the i-th axial thickness or air separation, when counted from the front, and Ni and $\nu$i are respectively the refractive index and Abbe number of the glass of the i-th lens element, when counted from the front.

The values of the factors in the above-described conditions (2) to (10) for the numerical examples 1 to 3 are listed in Table-1 below.

TABLE 1

| Condition No. | Factor | Lower Limit | Upper Limit | Example 1 | Example 2 | Example 3 |
|---|---|---|---|---|---|---|
| (2) | $M_5$ | — | 0 | −25 | −25.05 | −16.31 |
| (3) | $|f_5|/f_T$ | 0.07 | 0.45 | 0.12176 | 0.1261 | 0.2200 |
| (4) | $|M_5|/(z \cdot |f_5|)$ | 0.095 | 0.5 | 0.25142 | 0.2388 | 0.1272 |
| (7) | $\Delta e_{34}/D_W/(f_T/f_W)$ | 0.05 | 0.15 | 0.06674 | 0.0558 | 0.0678 |
| (9) | $f_5/f_{12W}$ | 0.05 | 0.6 | 0.15743 | 0.1439 | 0.4135 |
| (10) | $f_3/f_4$ | 0.35 | 2.5 | 1.118 | 1.363 | 1.156 |
| (8) | $f_{12W}/f_W$ | −3.5 | −1.3 | −2.178 | −2.496 | −1.514 |
| (5) | $|f_5|/e_{5W}$ | 0.5 | 1.4 | 0.781 | 0.8144 | 0.9760 |
| (6) | $\beta_{4T}/(\beta_{4W} \cdot Z)$ | 0.35 | 0.95 | 0.6086 | 0.6568 | 0.5784 |

Numerical Example 1
F = 103–290   FNo = 1:4.6–5.7   2ω = 23.8 − 8.6

R1 = 151.419    D1 = 2.70       N1 = 1.80518   $\nu$1 = 25.4
R2 = 85.522     D2 = 7.20       N2 = 1.48749   $\nu$2 = 70.2
R3 = −219.368   D3 = 0.20
R4 = 61.836     D4 = 4.80       N3 = 1.48749   $\nu$3 = 70.2
R5 = 167.012    D5 = Variable
R6 = −85.347    D6 = 1.40       N4 = 1.83481   $\nu$4 = 42.7
R7 = 29.329     D7 = 2.42
R8 = 35.612     D8 = 3.60       N5 = 1.78472   $\nu$5 = 25.7
R9 = 2177.654   D9 = Vari- -continued Numerical Example 1
F = 103-290  FNo = 1:4.6-5.7  2ω = 23.8 − 8.6

| | | | |
|---|---|---|---|
| R10 = Stop | D10 = 8.50 | | |
| R11 = −252.784 | D11 = 1.60 | N6 = 1.84666 | ν6 = 23.9 |
| R12 = 87.928 | D12 = 2.60 | | |
| R13 = 96.615 | D13 = 5.30 | N7 = 1.61772 | ν7 = 49.8 |
| R14 = −37.882 | D14 = Variable | | |
| R15 = 39.984 | D15 = 6.50 | N8 = 1.48749 | ν8 = 70.2 |
| R16 = −38.235 | D16 = 1.40 | N9 = 1.83400 | ν9 = 37.2 |
| R17 = −92.140 | D17 = Variable | | |
| R18 = −514.962 | D18 = 1.20 | N10 = 1.83481 | ν10 = 42.7 |
| R19 = 53.917 | D19 = 1.30 | | |
| R20 = −148.709 | D20 = 1.10 | N11 = 1.83481 | ν11 = 42.7 |
| R21 = 22.894 | D21 = 3.20 | N12 = 1.76182 | ν12 = 26.5 |
| R22 = 384.995 | | | |

| Lens Separations During Zooming | | | |
|---|---|---|---|
| Focal Length | 103.00 | 162.45 | 290.02 |
| D5 | 7.58 | 30.12 | 53.58 |
| D9 | 25.70 | 14.31 | 3.43 |
| D14 | 3.62 | 15.01 | 25.89 |
| D17 | 26.58 | 18.43 | 1.58 |

Numerical Example 2
F = 102-292  FNo = 1:4.6-5.7  2ω = 23.8 − 8.4

| | | | |
|---|---|---|---|
| R1 = 156.793 | D1 = 2.60 | N1 = 1.80518 | ν1 = 25.4 |
| R2 = 88.242 | D2 = 7.20 | N2 = 1.48749 | ν2 = 70.2 |
| R3 = −210.753 | D3 = 0.20 | | |
| R4 = 63.077 | D4 = 4.80 | N3 = 1.48749 | ν3 = 70.2 |
| R5 = 166.860 | D5 = Variable | | |
| R6 = −92.826 | D6 = 1.40 | N4 = 1.83481 | ν4 = 42.7 |
| R7 = 29.604 | D7 = 2.40 | | |
| R8 = 35.140 | D8 = 3.80 | N5 = 1.78472 | ν5 = 25.7 |
| R9 = 859.732 | D9 = Variable | | |
| R10 = Stop | D10 = 8.50 | | |
| R11 = −179.282 | D11 = 1.80 | N6 = 1.84666 | ν6 = 23.9 |
| R12 = 89.259 | D12 = 2.50 | | |
| R13 = 105.962 | D13 = 5.30 | N7 = 1.62374 | ν7 = 47.1 |
| R14 = −37.805 | D14 = Variable | | |
| R15 = 38.427 | D15 = 6.50 | N8 = 1.48749 | ν8 = 70.2 |
| R16 = −38.480 | D16 = 1.40 | N9 = 1.83400 | ν9 = 37.2 |
| R17 = −89.953 | D17 = Variable | | |
| R18 = −534.328 | D18 = 1.20 | N10 = 1.83481 | ν10 = 42.7 |
| R19 = 50.749 | D19 = 1.30 | | |
| R20 = −231.829 | D20 = 1.10 | N11 = 1.83481 | ν11 = 42.7 |
| R21 = 22.982 | D21 = 3.20 | N12 = 1.76182 | ν12 = 26.5 |
| R22 = 384.995 | | | |

| Lens Separations During Zooming | | | |
|---|---|---|---|
| Focal Length | 102.50 | 162.54 | 292.04 |
| D5 | 8.26 | 31.98 | 56.66 |
| D9 | 28.24 | 16.14 | 6.44 |
| D14 | 3.10 | 14.02 | 22.49 |
| D17 | 27.03 | 18.86 | 1.98 |

Numerical Example 3
F = 72-205  FNo = 1:4-5.7  2ω = 33.4 − 12

| | | | |
|---|---|---|---|
| R1 = 156.592 | D1 = 2.50 | N1 = 1.80518 | ν1 = 25.4 |
| R2 = 81.673 | D2 = 5.50 | N2 = 1.51633 | ν2 = 64.1 |
| R3 = −180.309 | D3 = 0.20 | | |

-continued

Numerical Example 3
F = 72-205  FNo = 1:4-5.7  2ω = 33.4 − 12

| | | | |
|---|---|---|---|
| R4 = 59.077 | D4 = 3.80 | N3 = 1.48749 | ν3 = 70.2 |
| R5 = 116.654 | D5 = Variable | | |
| R6 = −63.522 | D6 = 1.60 | N4 = 1.80400 | ν4 = 46.6 |
| R7 = 29.983 | D7 = 2.50 | | |
| R8 = 35.776 | D8 = 3.50 | N5 = 1.84666 | ν5 = 23.9 |
| R9 = 160.174 | D9 = Variable | | |
| R10 = Stop | D10 = 5.00 | | |
| R11 = −36.727 | D11 = 1.80 | N6 = 1.83400 | ν6 = 37.2 |
| R12 = −333.474 | D12 = 0.50 | | |
| R13 = −296.400 | D13 = 4.50 | N7 = 1.48749 | ν7 = 70.2 |
| R14 = −30.837 | D14 = 0.20 | | |
| R15 = 195.329 | D15 = 5.00 | N8 = 1.51112 | ν8 = 60.5 |
| R16 = −40.915 | D16 = Variable | | |
| R17 = 40.212 | D17 = 6.30 | N9 = 1.48749 | ν9 = 70.2 |
| R18 = −40.212 | D18 = 1.60 | N10 = 1.83400 | ν10 = 37.2 |
| R19 = −284.938 | D19 = 0.20 | | |
| R20 = 108.141 | D20 = 3.00 | N11 = 1.51633 | ν11 = 64.1 |
| R21 = −165.797 | D21 = Variable | | |
| R22 = −219.549 | D22 = 2.50 | N12 = 1.80518 | ν12 = 25.4 |
| R23 = −48.294 | D23 = 1.20 | | |
| R24 = −46.114 | D24 = 1.80 | N13 = 1.77250 | ν13 = 49.6 |
| R25 = 41.025 | | | |

| Lens Separations During Zooming | | | |
|---|---|---|---|
| Focal Length | 72.00 | 138.37 | 204.90 |
| D5 | 6.41 | 38.57 | 54.41 |
| D9 | 26.79 | 11.71 | 5.94 |
| D16 | 2.97 | 18.05 | 23.82 |
| D21 | 18.63 | 11.23 | 2.31 |

Figure 7:
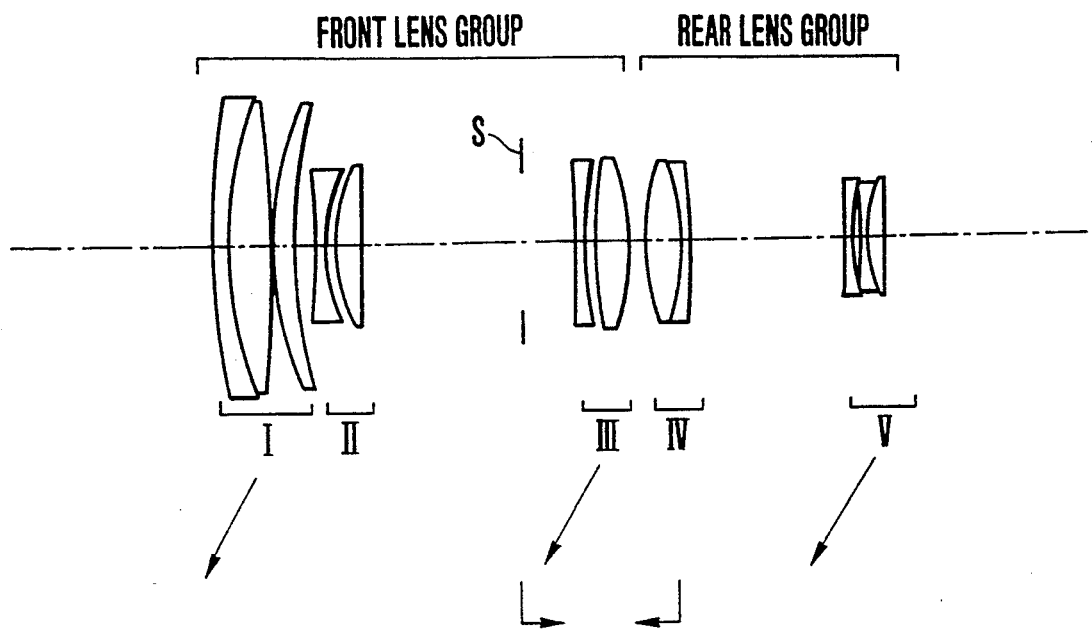
Figure 8:
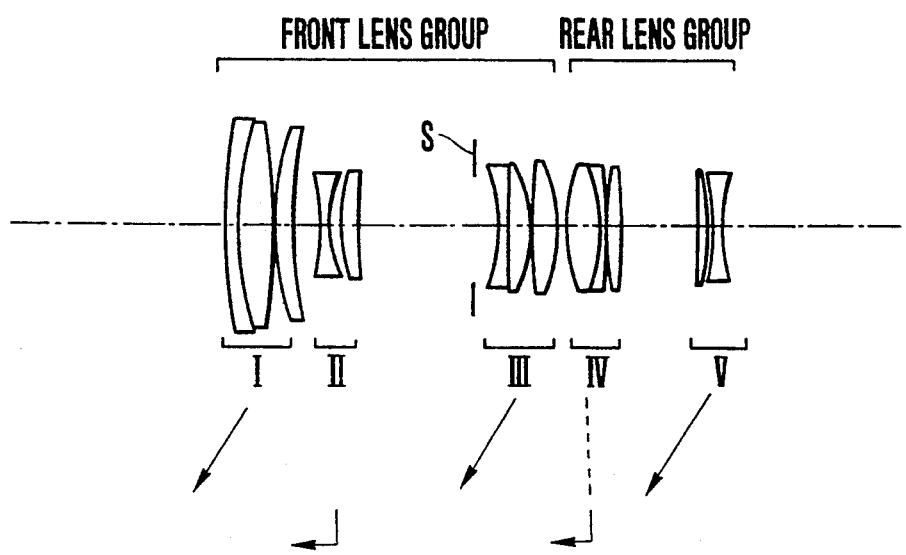
Figures 1, 10A:
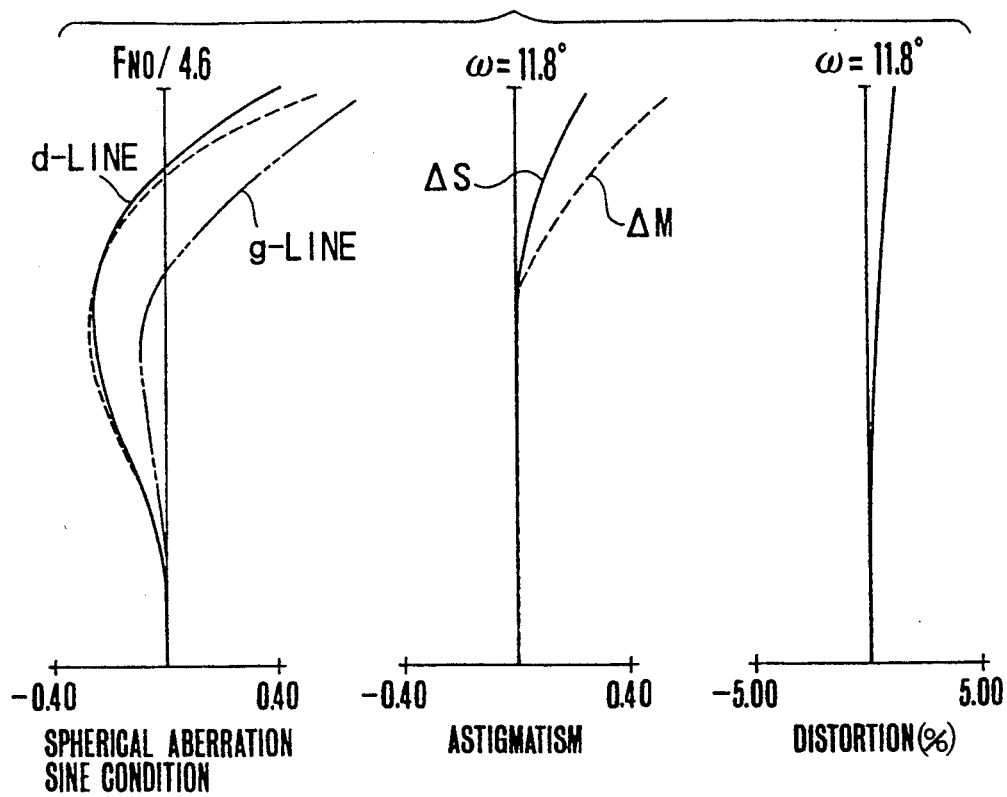
Figures 2, 10A:
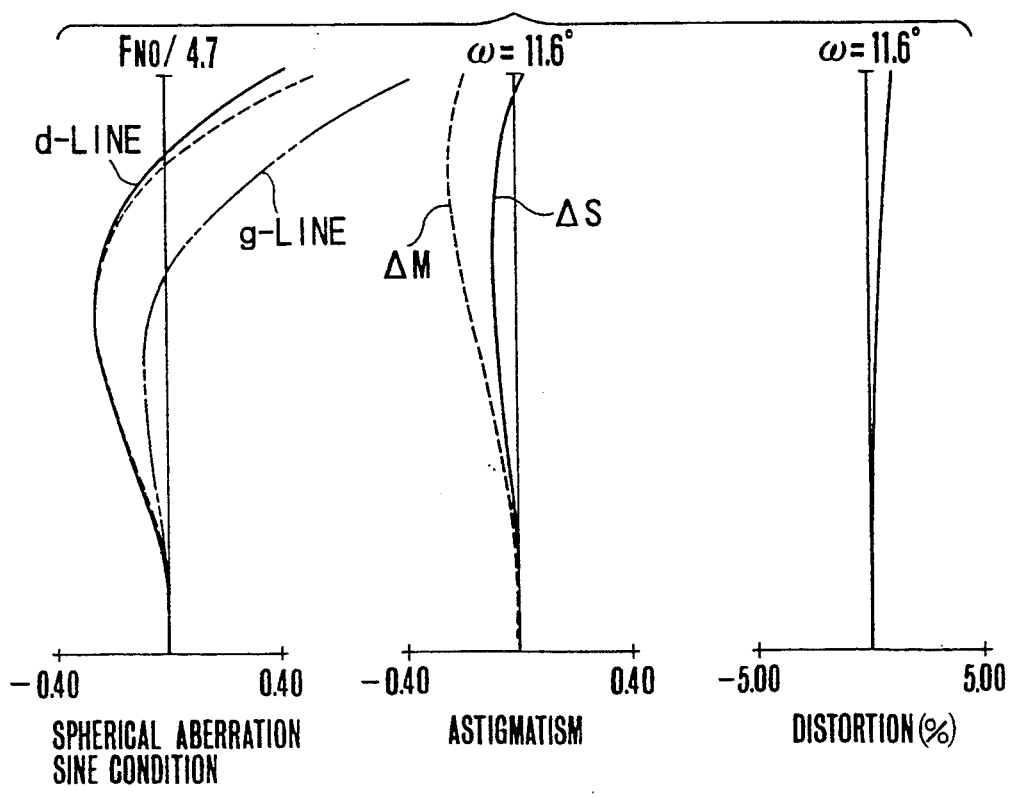
Figures 1, 10B:
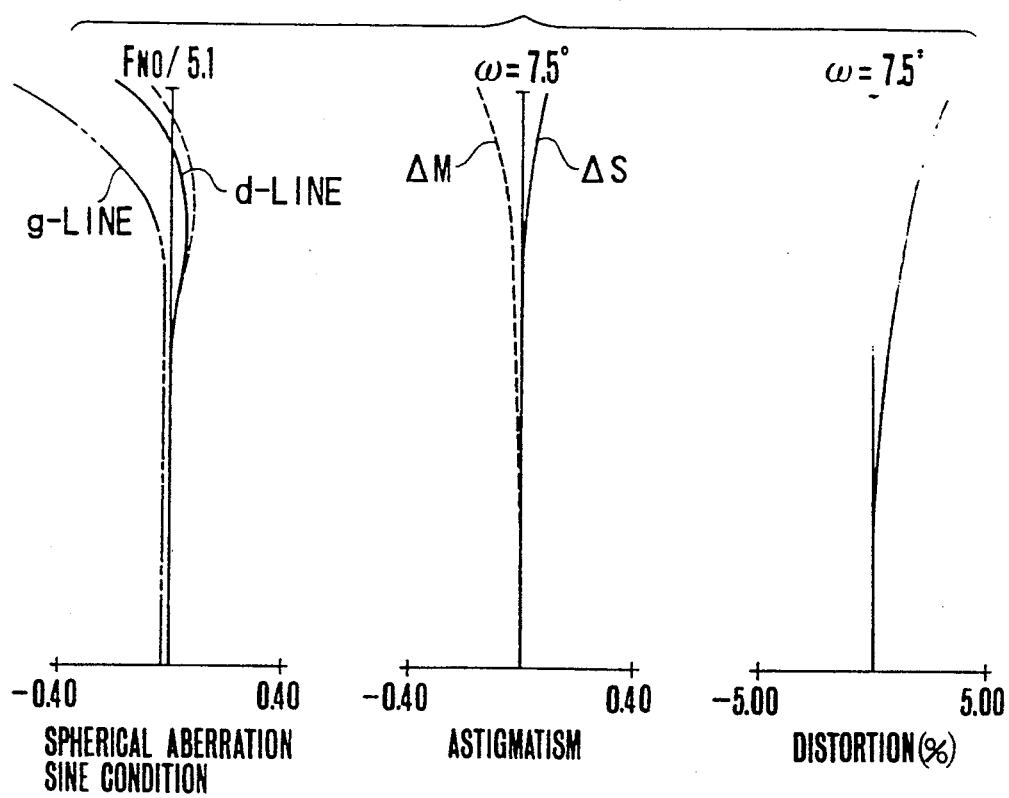
Figures 2, 10B:
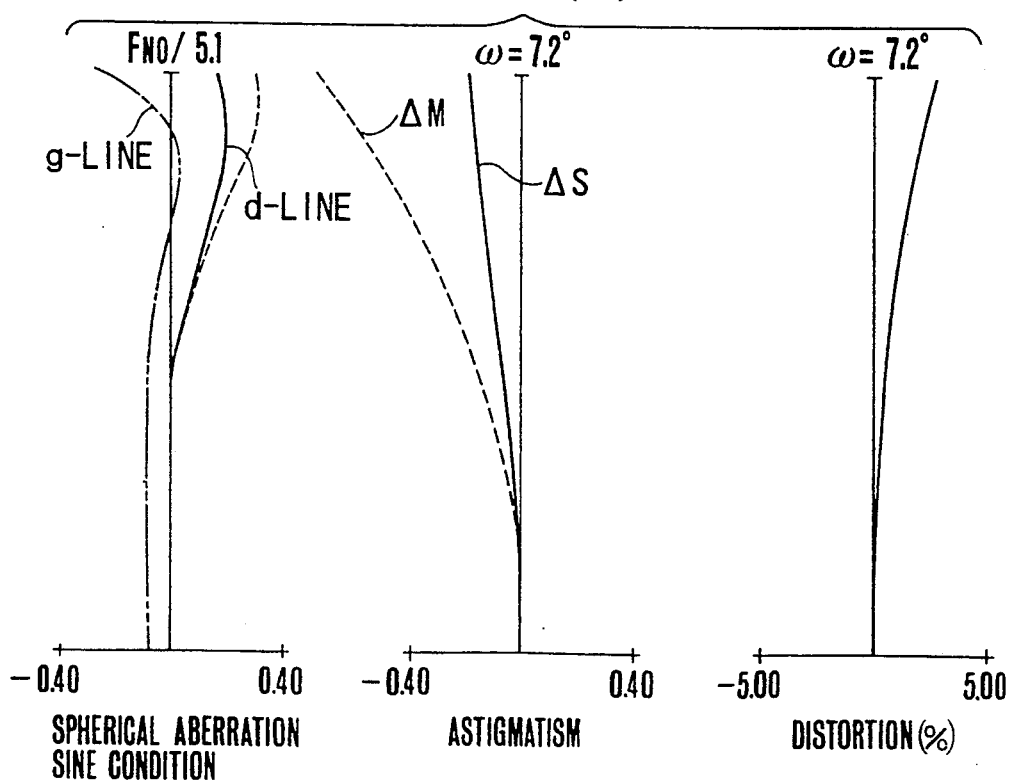
Figures 1, 10C:
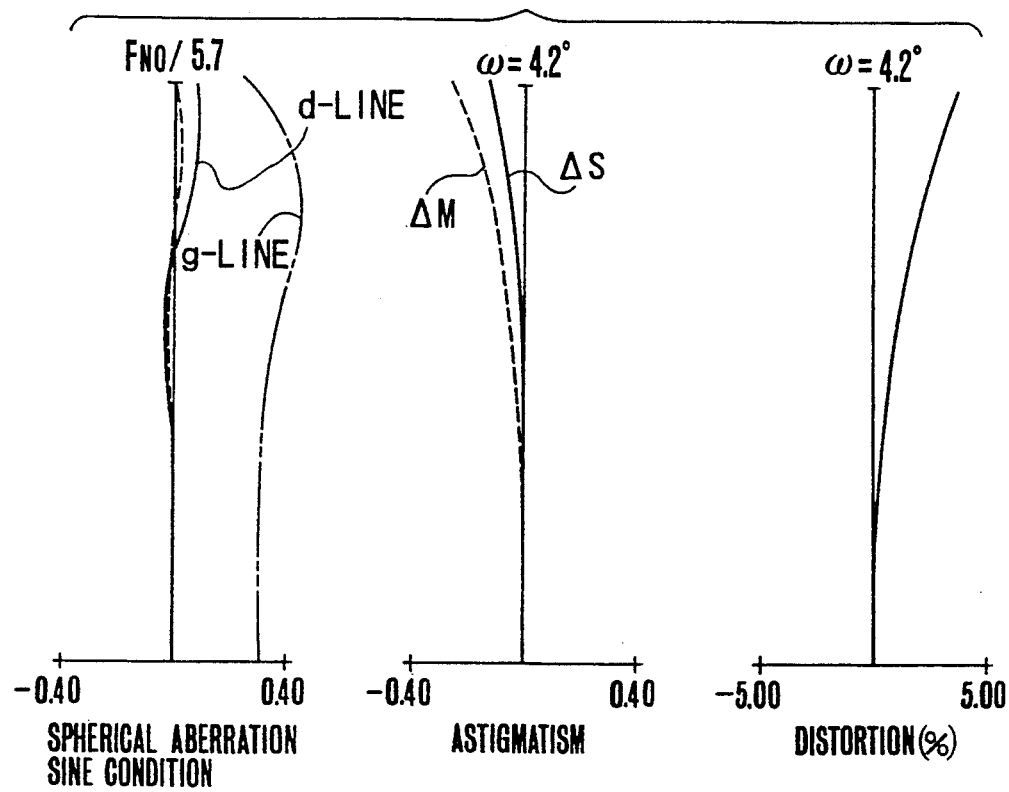
Figures 2, 10C:
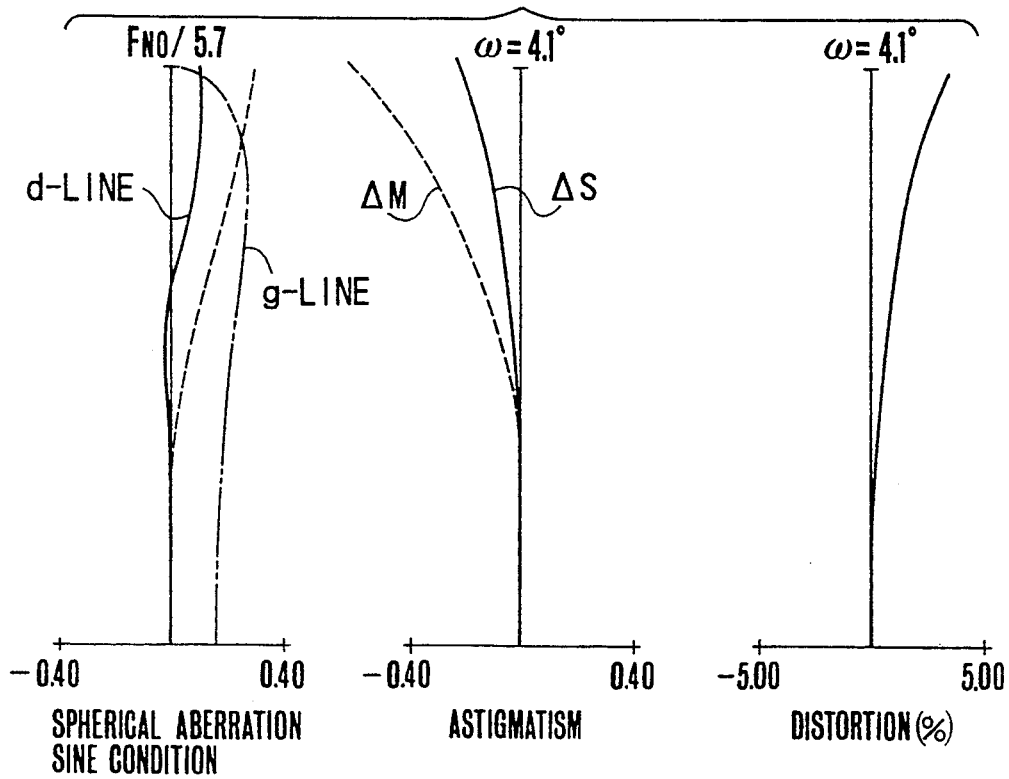
Figures 1, 11A:
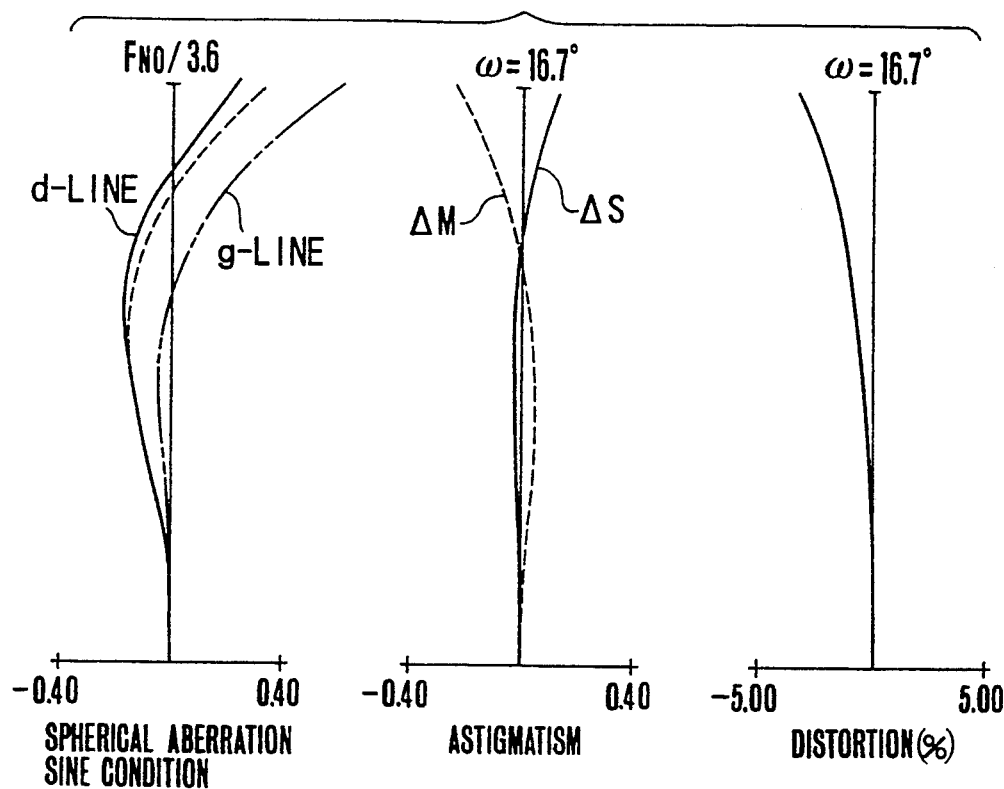
Figures 2, 11A:
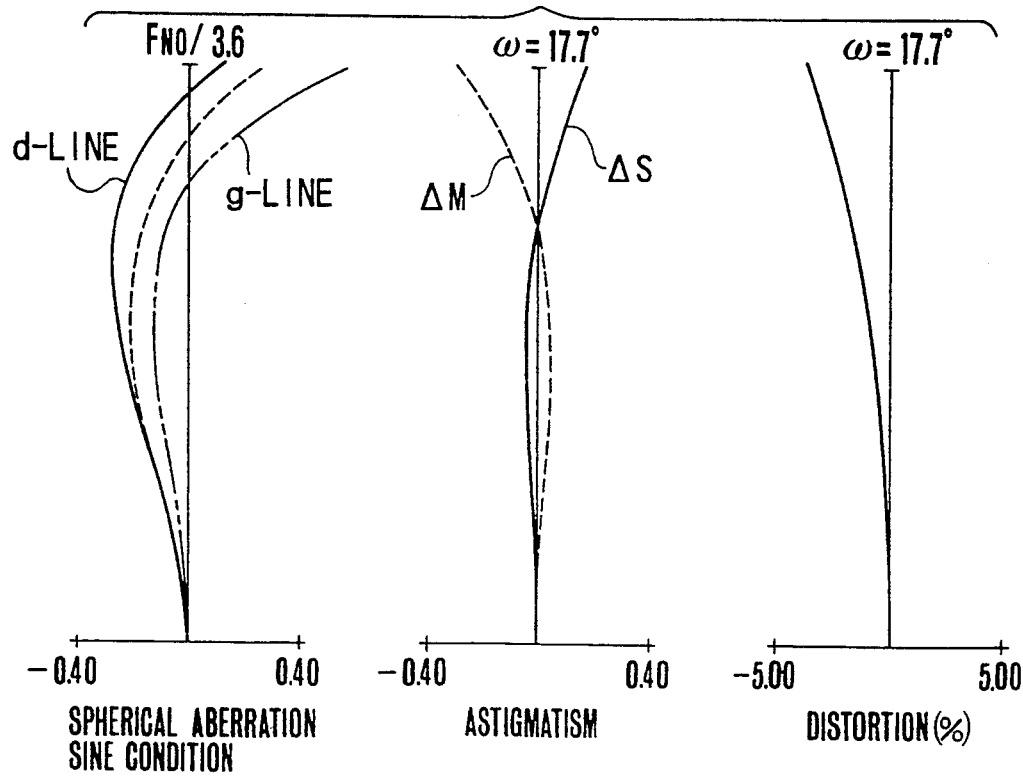
Figures 1, 11B:
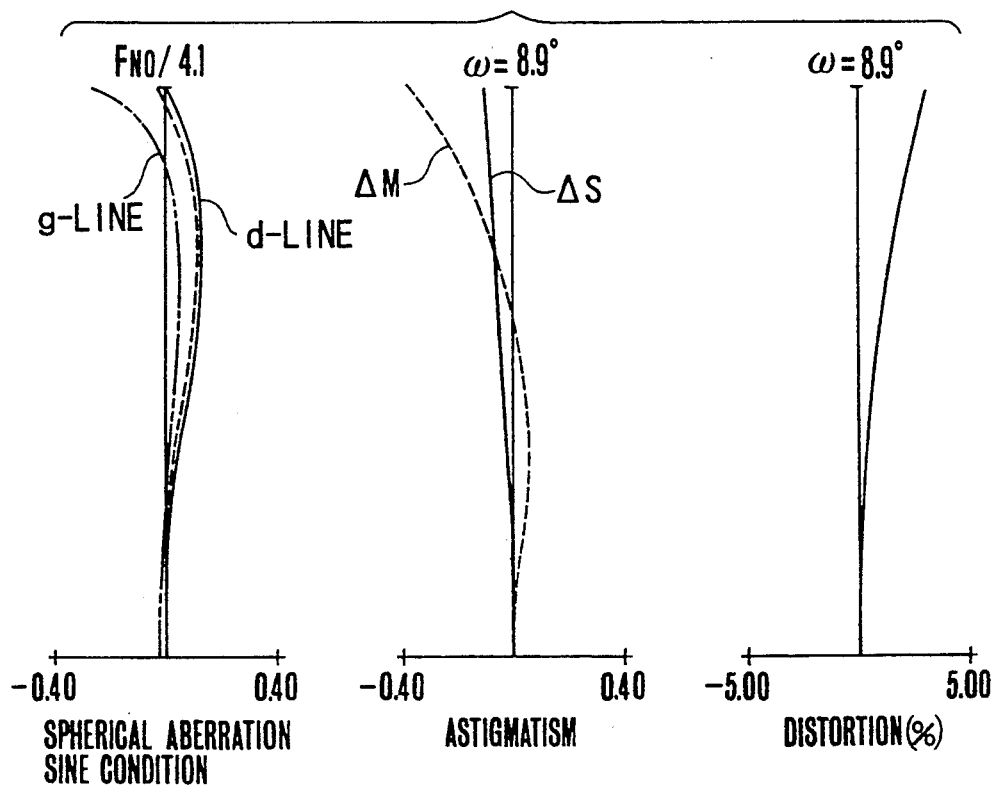
Figures 2, 11B:
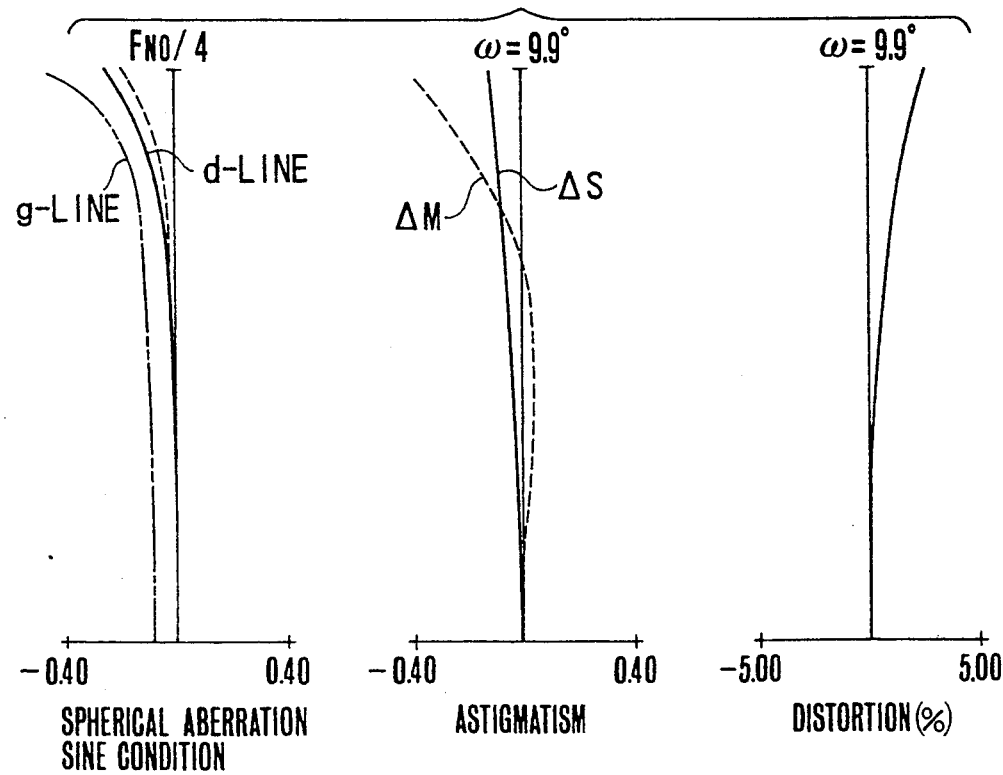
Figures 1, 11C:
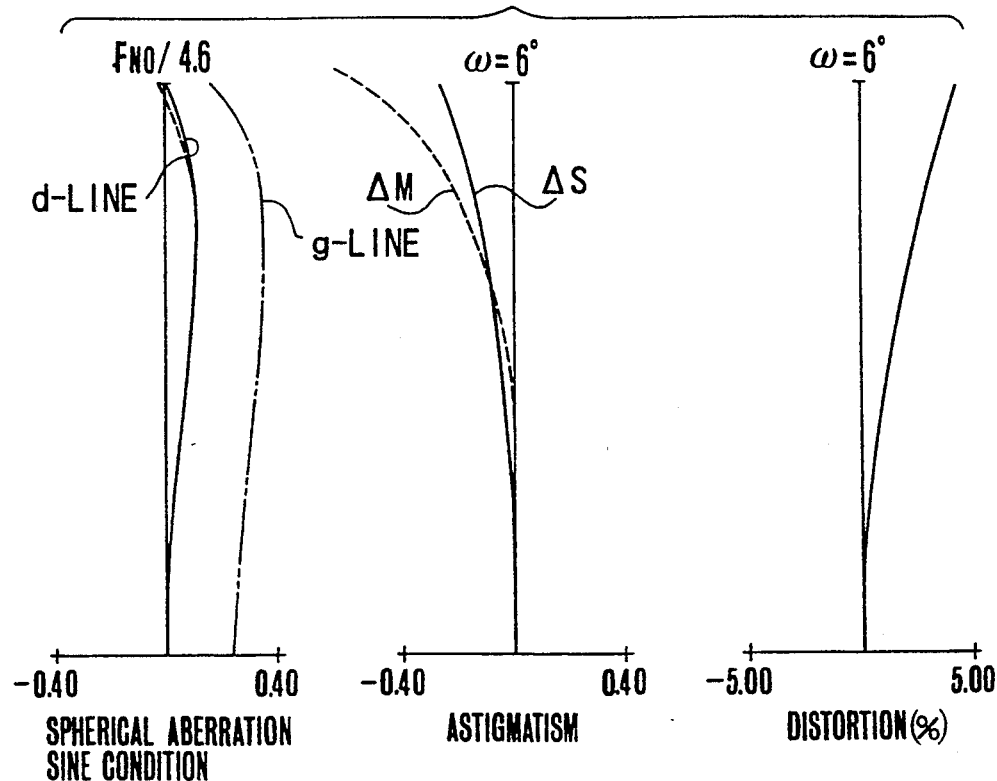
Figures 2, 11C:
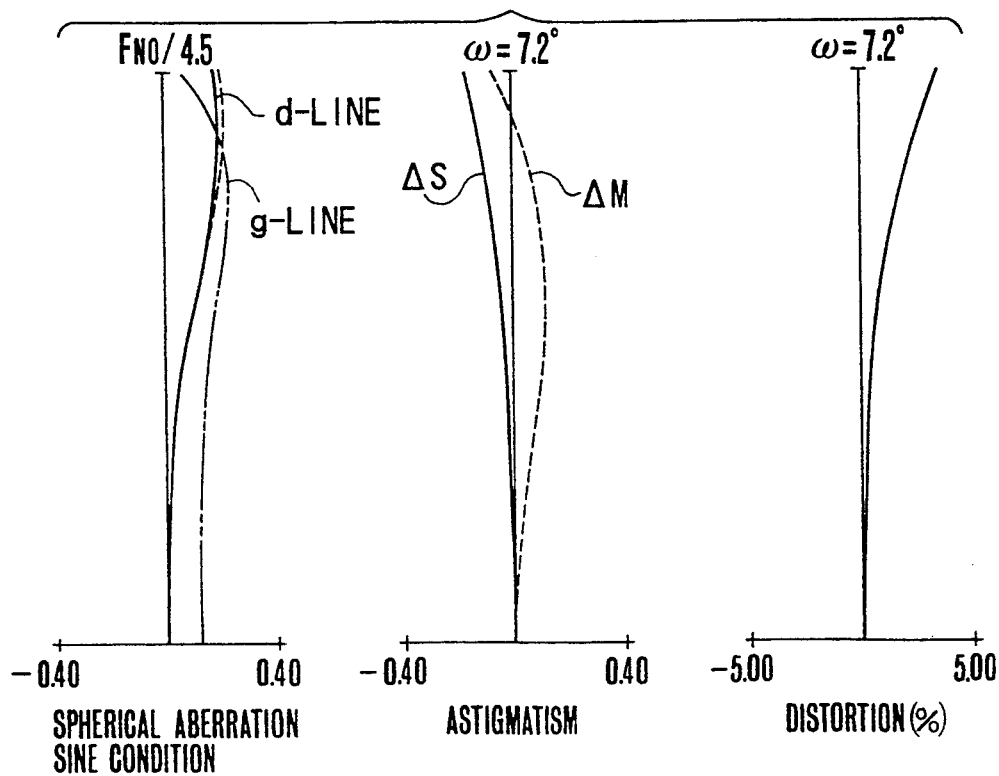
Figures 1, 12A:
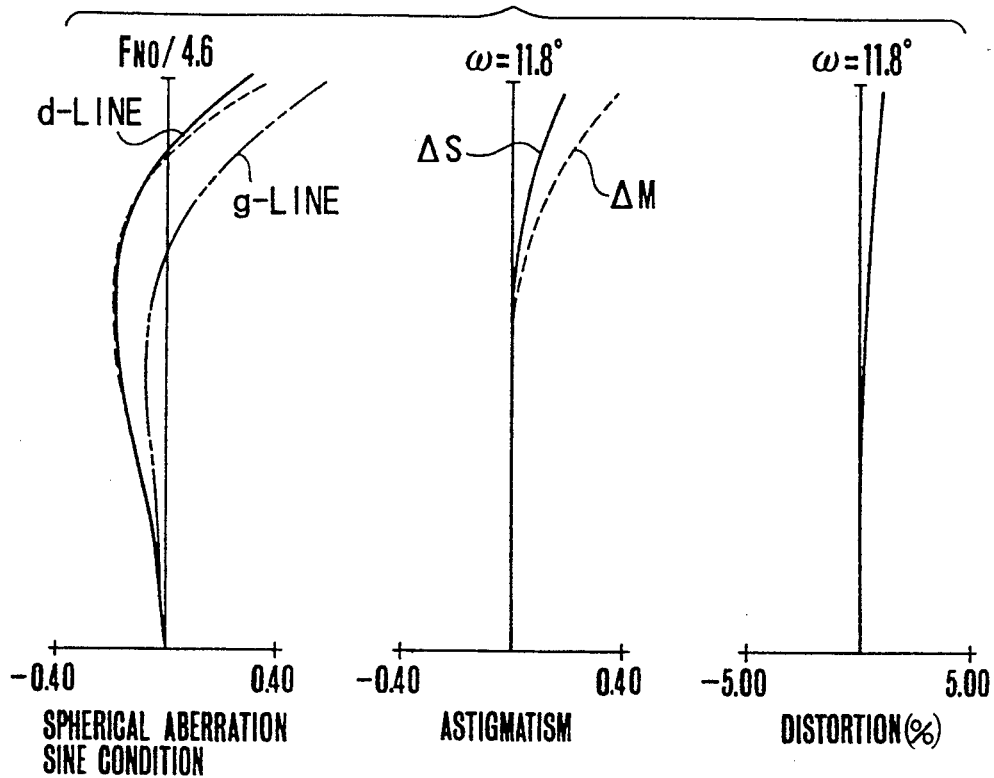
Figures 2, 12A:
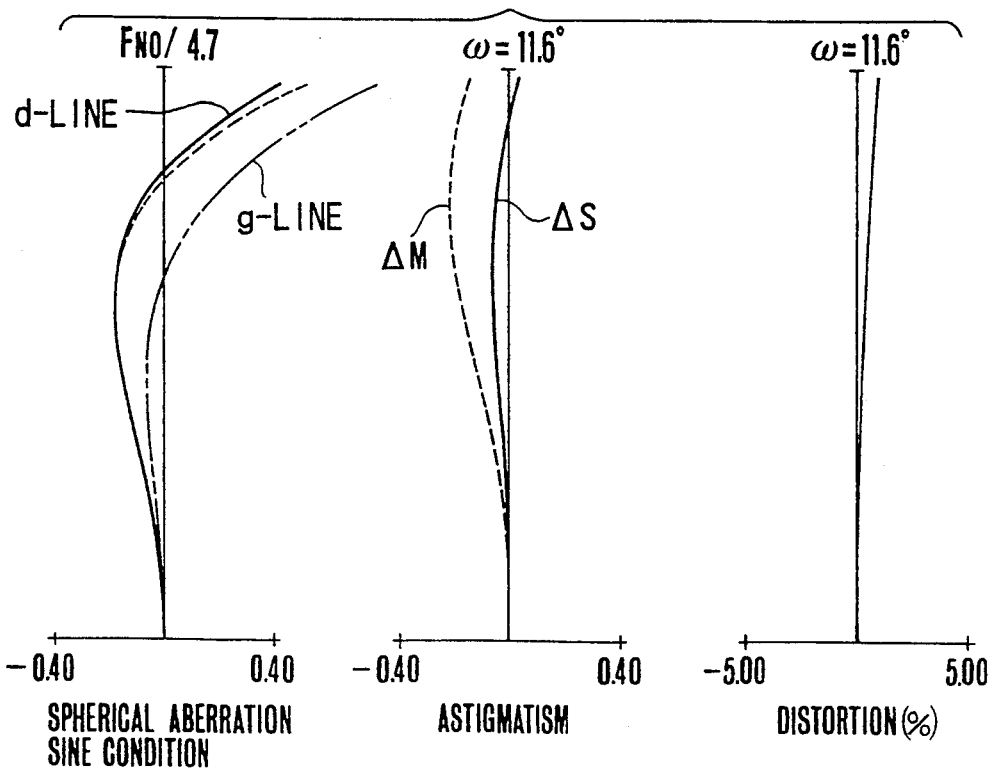
Figures 1, 12B:
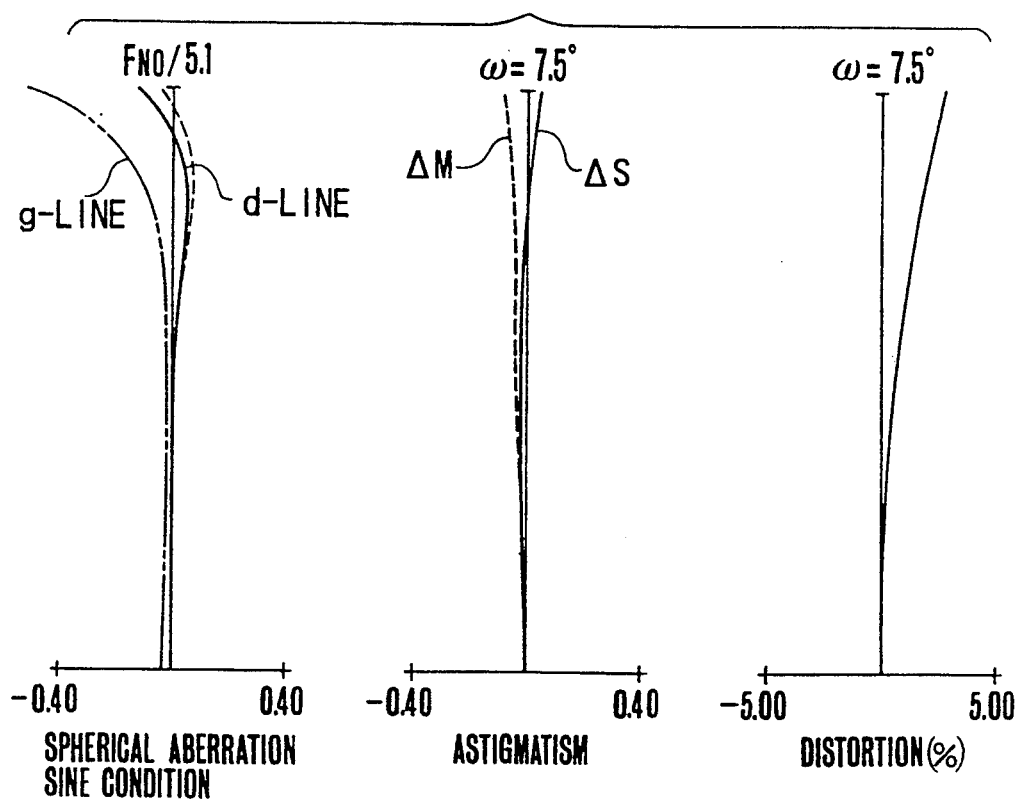
Figures 2, 12B:
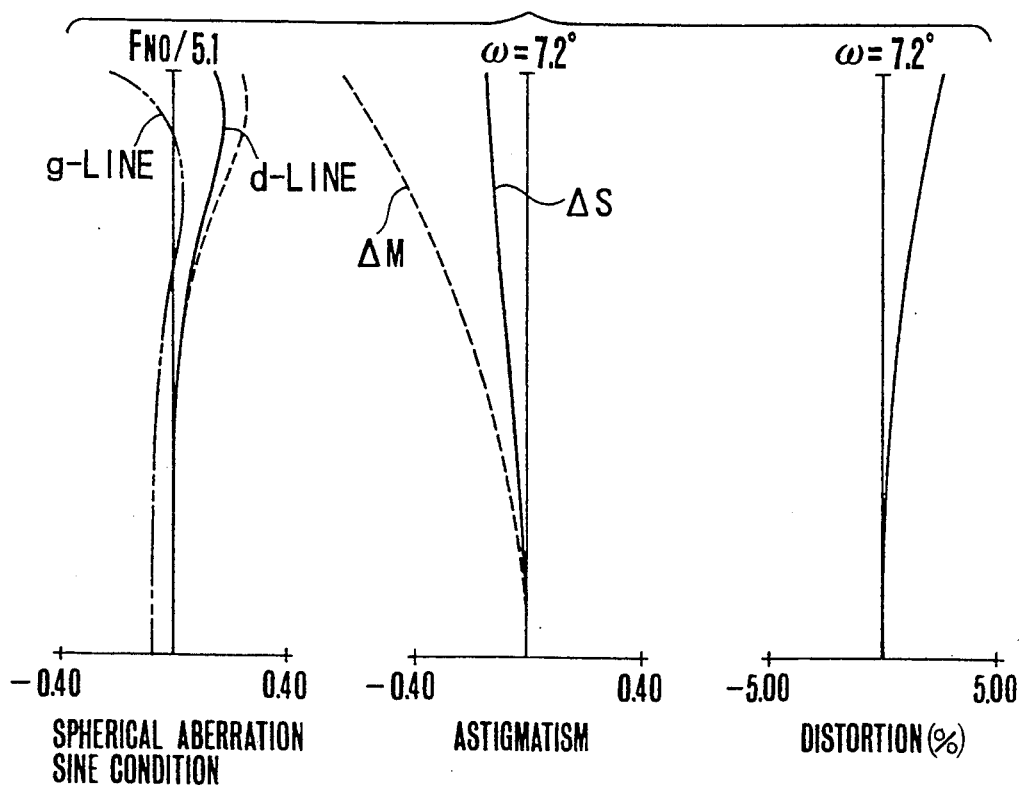
Figures 1, 12C:
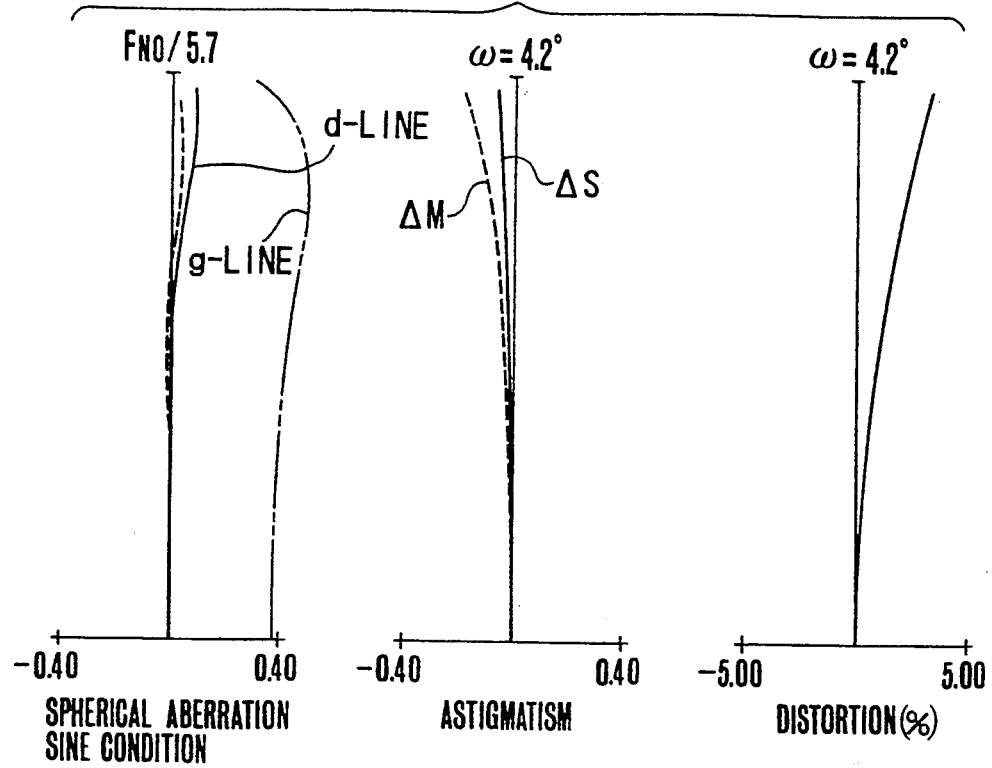
Figures 2, 12C:
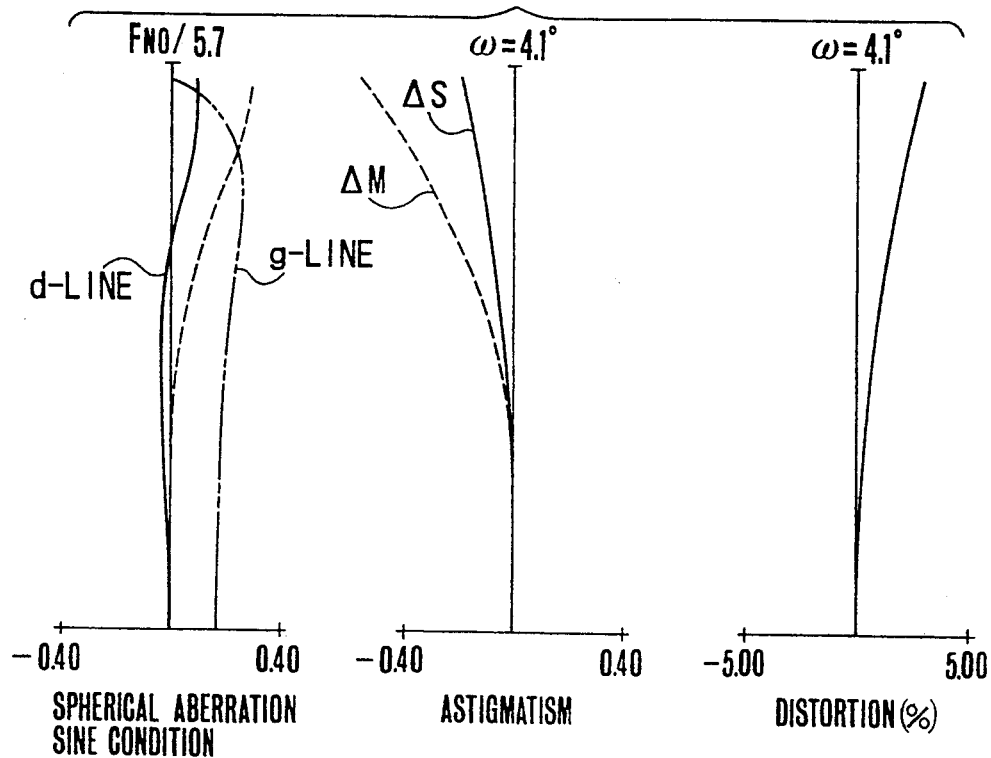

In the next embodiment, as shown in FIGS. 7 to 9, the focusing provision is made not only in the fourth lens unit IV just after the emergence of a converging light bundle from the front lens group and, for the purpose of maintaining good stability of optical performance, but also in the second or third lens unit II or III. The directions of focusing movement of these two lens units are indicated by arrows of parallel solid lines to the optical axis. Even in this embodiment, zooming is performed by moving the three lens units as indicated by inclined solid lines. Again, the above-described conditions (1) to (10) apply to this embodiment. Three numerical examples 4 to 6 of zoom lenses are shown below.

Numerical Example 4
F = 103-293  FNo = 1:4.5-5.7  2ω = 23.7 − 8.4

| | | | |
|---|---|---|---|
| R1 = 142.724 | D1 = 2.70 | N1 = 1.80518 | ν1 = 25.4 |
| R2 = 82.302 | D2 = 7.20 | N2 = 1.48749 | ν2 = 70.2 |
| R3 = −177.453 | D3 = 0.20 | | |
| R4 = 59.809 | D4 = 4.40 | N3 = 1.48749 | ν3 = 70.2 |
| R5 = 124.275 | D5 = Variable | | |
| R6 = −85.060 | D6 = 1.40 | N4 = 1.83481 | ν4 = 42.7 |
| R7 = 30.673 | D7 = 2.06 | | |
| R8 = 35.510 | D8 = 3.60 | N5 = 1.80518 | ν5 = 25.4 |
| R9 = 448.950 | D9 = Variable | | |
| R10 = Stop | D10 = 8.50 | | |
| R11 = −404.542 | D11 = 1.60 | N6 = 1.84666 | ν6 = 23.9 |
| R12 = 92.960 | D12 = 2.60 | | |
| R13 = 108.027 | D13 = 5.30 | N7 = 1.62230 | ν7 = 53.2 |
| R14 = −41.619 | D14 = Variable | | |
| R15 = 39.067 | D15 = 6.50 | N8 = 1.48749 | ν8 = 70.2 |
| R16 = −41.803 | D16 = 1.40 | N9 = 1.83400 | ν9 = 37.2 |
| R17 = −103.789 | D17 = Variable | | |

-continued

Numerical Example 4
F = 103-293   FNo = 1:4.5-5.7   2ω = 23.7 − 8.4

| | | | |
|---|---|---|---|
| R18 = −582.258 | D18 = 1.10 | N10 = 1.83481 | ν10 = 42.7 |
| R19 = 43.221 | D19 = 1.15 | | |
| R20 = −209.081 | D20 = 1.10 | N11 = 1.83481 | ν11 = 42.7 |
| R21 = 23.941 | D21 = 2.90 | N12 = 1.76182 | ν12 = 26.5 |
| R22 = −831.900 | | | |

Lens Separations During Zooming

| Focal Length | 103.00 | 165.12 | 292.96 |
|---|---|---|---|
| D5 | 3.65 | 27.42 | 52.15 |
| D9 | 29.28 | 16.39 | 7.69 |
| D14 | 3.03 | 15.92 | 24.62 |
| D17 | 27.35 | 19.10 | 2.35 |

Numerical Example 5
F = 72-205   FNo = 1:3.6-4.6   2ω = 33.4 − 12

| | | | |
|---|---|---|---|
| R1 = 150.746 | D1 = 2.70 | N1 = 1.80518 | ν1 = 25.4 |
| R2 = 80.776 | D2 = 8.00 | N2 = 1.51633 | ν2 = 64.1 |
| R3 = −181.801 | D3 = 0.20 | | |
| R4 = 58.737 | D4 = 5.00 | N3 = 1.48749 | ν3 = 70.2 |
| R5 = 106.831 | D5 = Variable | | |
| R6 = −71.701 | D6 = 2.00 | N4 = 1.80400 | ν4 = 46.6 |
| R7 = 29.328 | D7 = 2.50 | | |
| R8 = 35.322 | D8 = 3.80 | N5 = 1.84666 | ν5 = 23.9 |
| R9 = 149.997 | D9 = Variable | | |
| R10 = Stop | D10 = 5.00 | | |
| R11 = −35.700 | D11 = 1.80 | N6 = 1.83400 | ν6 = 37.2 |
| R12 = −595.193 | D12 = 0.50 | | |
| R13 = −318.232 | D13 = 5.00 | N7 = 1.48749 | ν7 = 70.2 |
| R14 = −30.632 | D14 = 0.20 | | |
| R15 = 171.816 | D15 = 5.50 | N8 = 1.51112 | ν8 = 60.5 |
| R16 = −40.947 | D16 = Variable | | |
| R17 = 42.424 | D17 = 7.30 | N9 = 1.48749 | ν9 = 70.2 |
| R18 = −42.424 | D18 = 1.60 | N10 = 1.83400 | ν10 = 37.2 |
| R19 = −252.465 | D19 = 0.20 | | |
| R20 = 89.590 | D20 = 3.00 | N11 = 1.51633 | ν11 = 64.1 |
| R21 = −248.663 | D21 = Variable | | |
| R22 = −273.030 | D22 = 2.50 | N12 = 1.80518 | ν12 = 25.4 |
| R23 = −52.740 | D23 = 1.20 | | |
| R24 = −51.122 | D24 = 1.80 | N13 = 1.77250 | ν13 = 49.6 |
| R25 = 39.659 | | | |

Lens Separations During Zooming

| Focal Length | 72.00 | 137.86 | 204.85 |
|---|---|---|---|
| D5 | 6.27 | 38.43 | 54.27 |
| D9 | 28.41 | 13.38 | 7.63 |
| D16 | 2.94 | 17.97 | 23.72 |
| D21 | 18.50 | 11.01 | 2.16 |

Numerical Example 6
F = 103-293   FNo = 1:4.6-5.7   2ω = 23.7 − 8.4

| | | | |
|---|---|---|---|
| R1 = 142.724 | D1 = 2.70 | N1 = 1.80518 | ν1 = 25.4 |
| R2 = 82.302 | D2 = 7.20 | N2 = 1.48749 | ν2 = 70.2 |
| R3 = −177.453 | D3 = 0.20 | | |
| R4 = 59.809 | D4 = 4.40 | N3 = 1.48749 | ν3 = 70.2 |
| R5 = 124.275 | D5 = Variable | | |
| R6 = −85.060 | D6 = 1.40 | N4 = 1.83481 | ν4 = 42.7 |
| R7 = 30.673 | D7 = 2.06 | | |
| R8 = 35.510 | D8 = 3.60 | N5 = 1.80518 | ν5 = 25.4 |
| R9 = 448.950 | D9 = Variable | | |

-continued

Numerical Example 6
F = 103-293   FNo = 1:4.6-5.7   2ω = 23.7 − 8.4

| | | | |
|---|---|---|---|
| R10 = Stop | D10 = 8.50 | | |
| R11 = −404.542 | D11 = 1.60 | N6 = 1.84666 | ν6 = 23.9 |
| R12 = 92.960 | D12 = 2.60 | | |
| R13 = 108.027 | D13 = 5.30 | N7 = 1.62230 | ν7 = 53.2 |
| R14 = −41.619 | D14 = Variable | | |
| R15 = 39.067 | D15 = 6.50 | N8 = 1.48749 | ν8 = 70.2 |
| R16 = −41.803 | D16 = 1.40 | N9 = 1.83400 | ν9 = 37.2 |
| R17 = −103.789 | D17 = Variable | | |
| R18 = −582.258 | D18 = 1.10 | N10 = 1.83481 | ν10 = 42.7 |
| R19 = 43.221 | D19 = 1.15 | | |
| R20 = −209.081 | D20 = 1.10 | N11 = 1.83481 | ν11 = 42.7 |
| R21 = 23.941 | D21 = 2.90 | N12 = 1.76182 | ν12 = 26.5 |
| R22 = −831.900 | | | |

Lens Separations During Zooming

| Focal Length | 103.00 | 165.12 | 292.96 |
|---|---|---|---|
| D5 | 3.65 | 27.42 | 52.15 |
| D9 | 29.28 | 16.39 | 7.69 |
| D14 | 3.03 | 15.92 | 24.62 |
| D17 | 27.35 | 19.10 | 2.35 |

Figure 13:
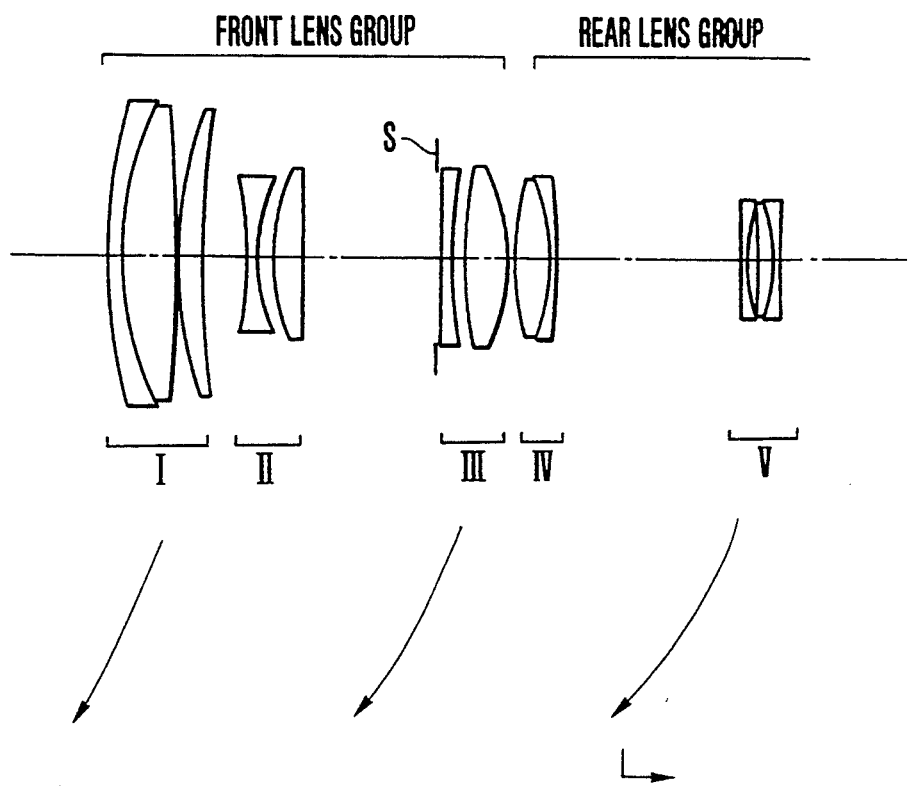
Figure 14:
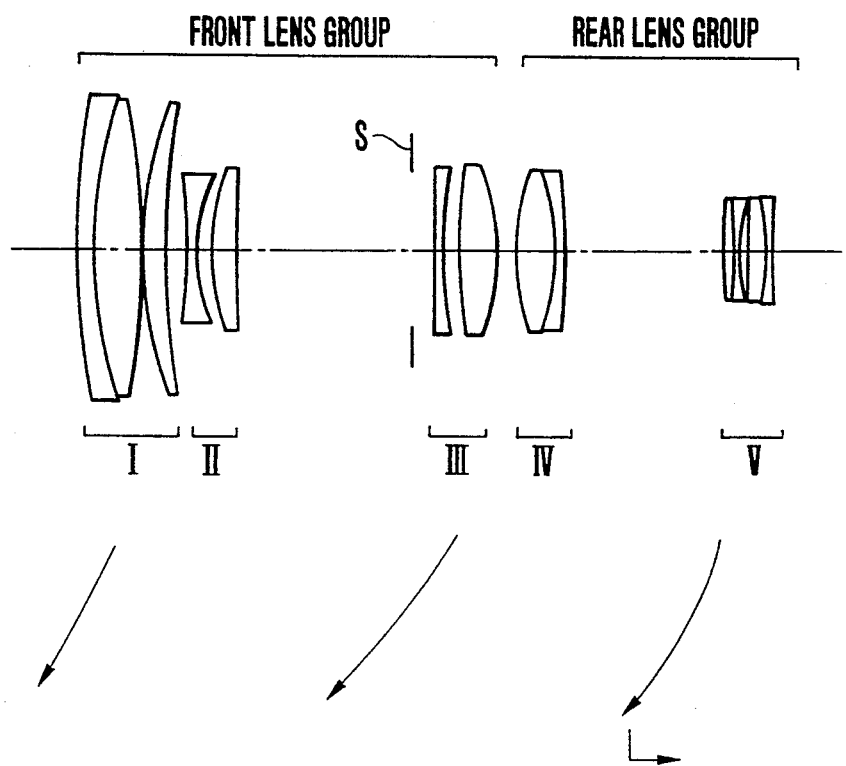
Figure 15:
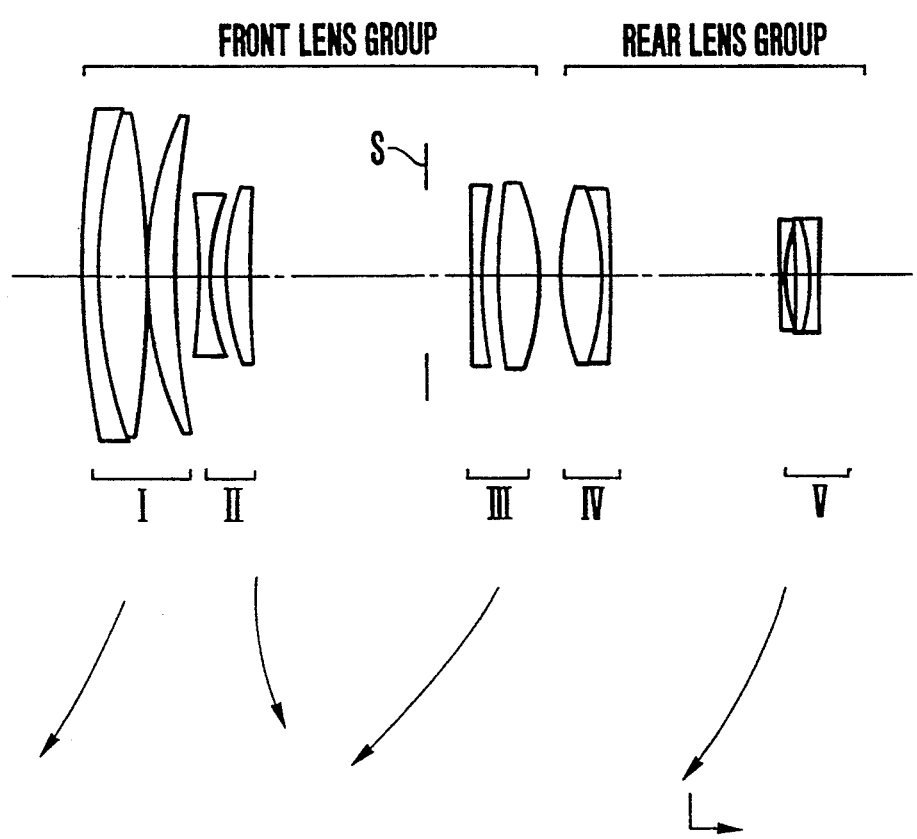
Figures 1, 16A:
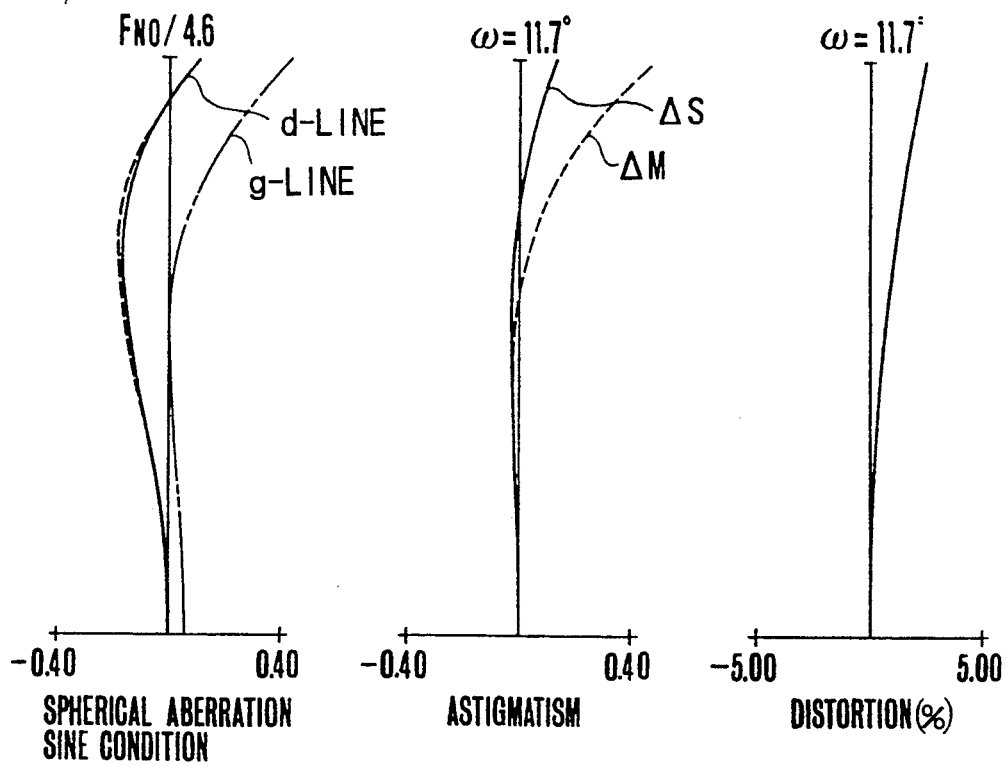
Figures 2, 16A:
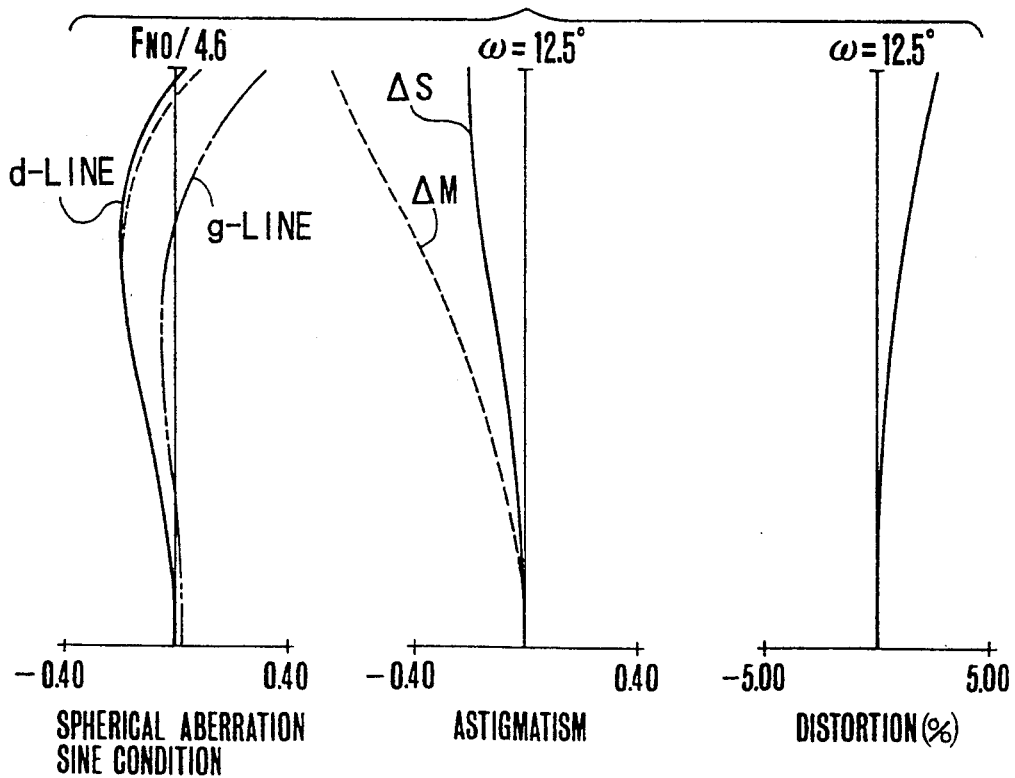
Figures 1, 16B:
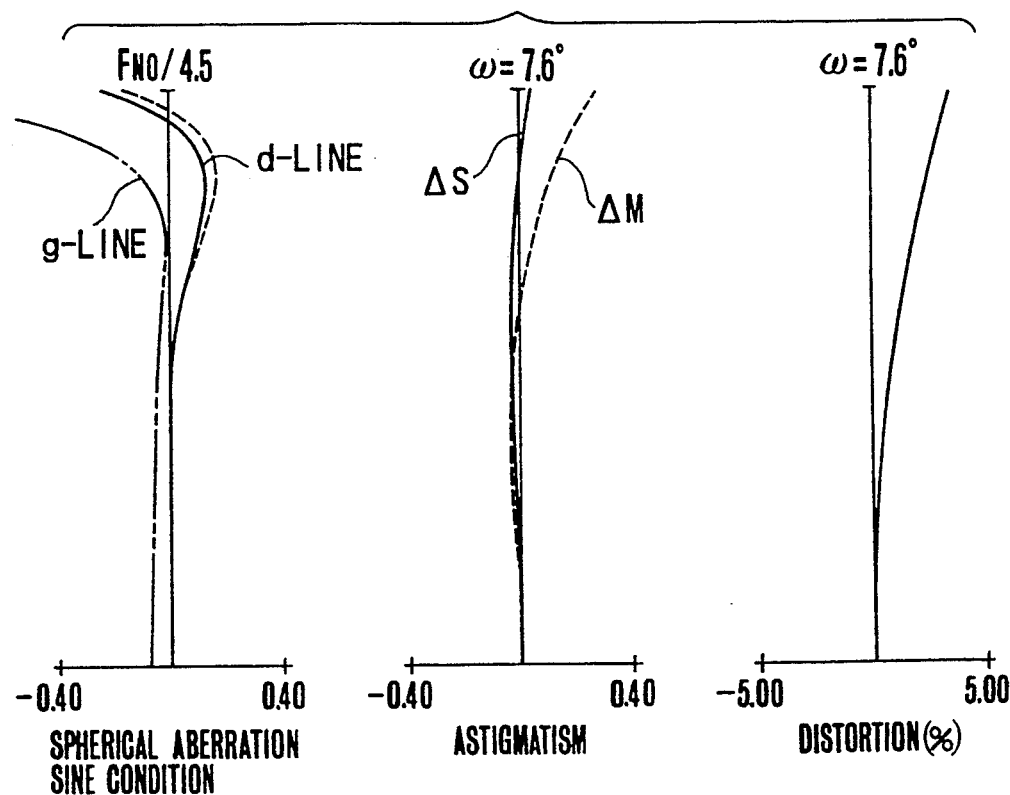
Figures 2, 16B:
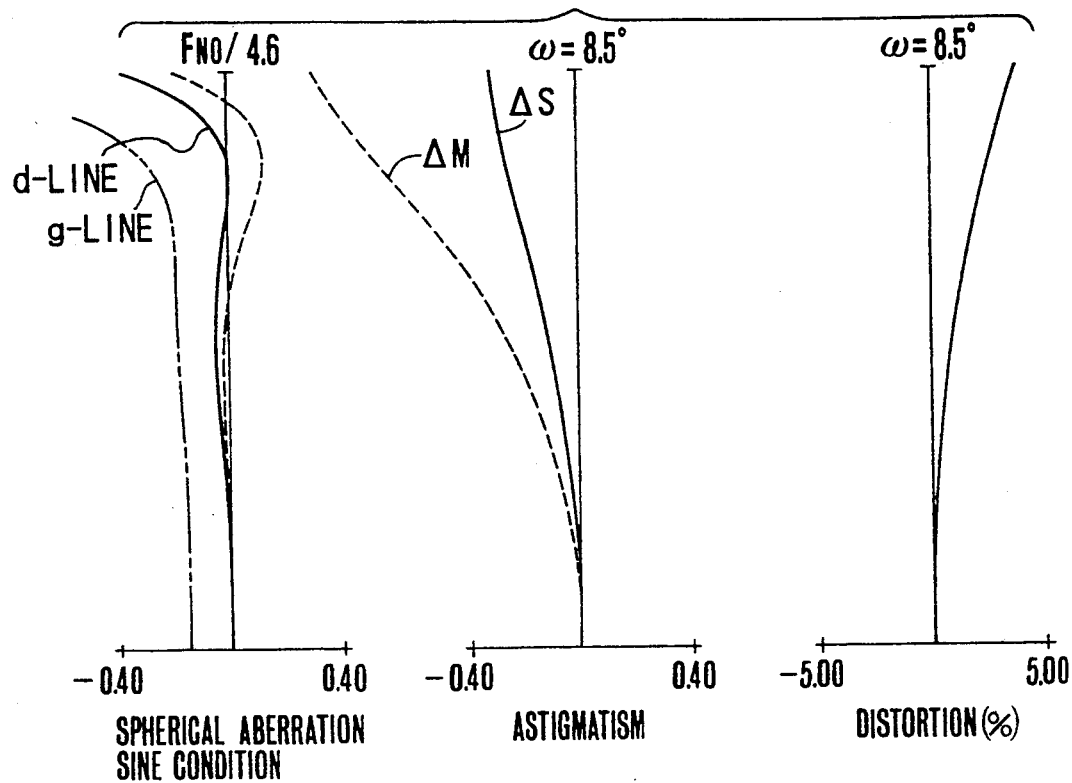
Figures 1, 16C:
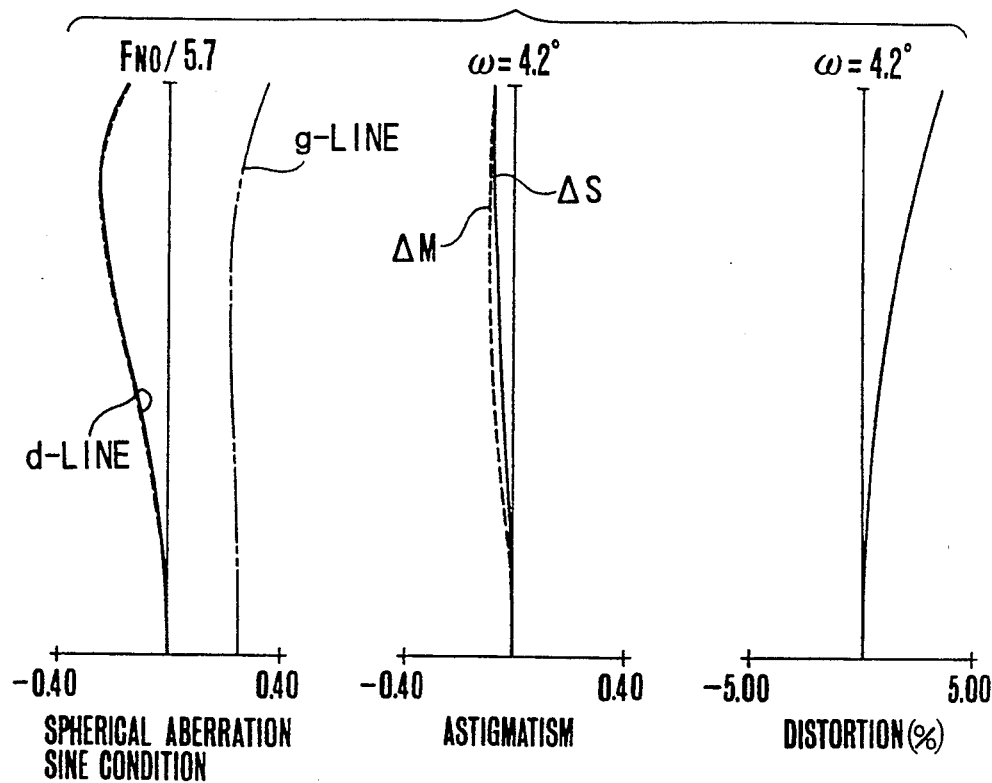
Figures 2, 16C:
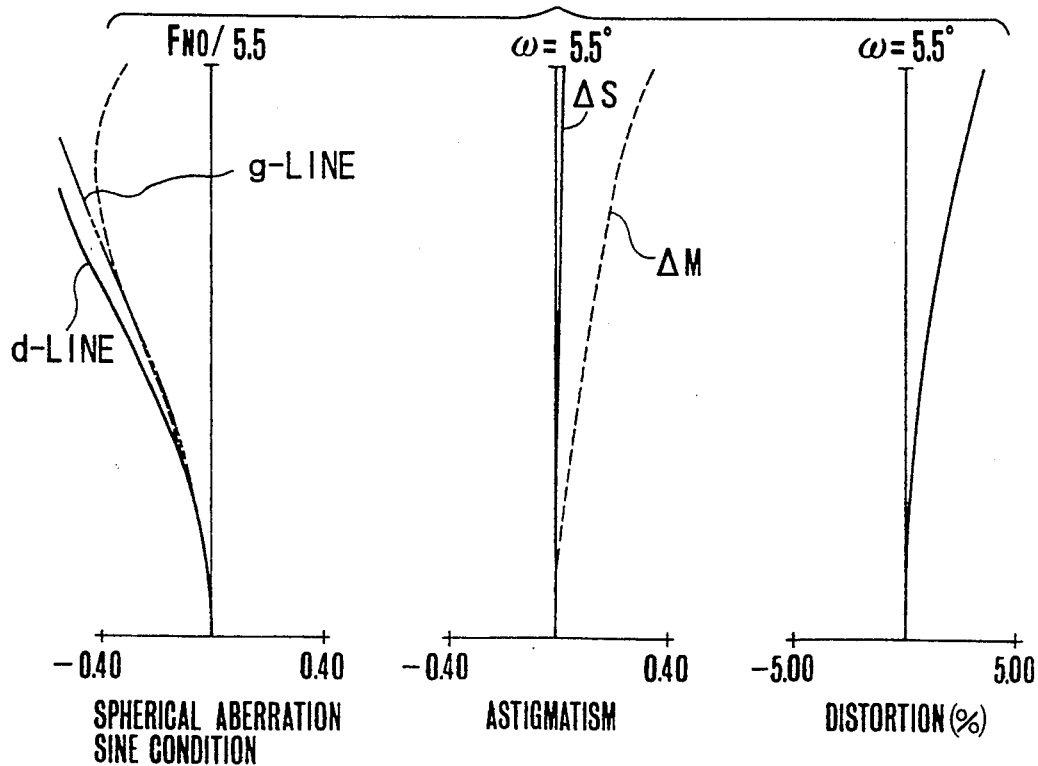
Figures 1, 17A:
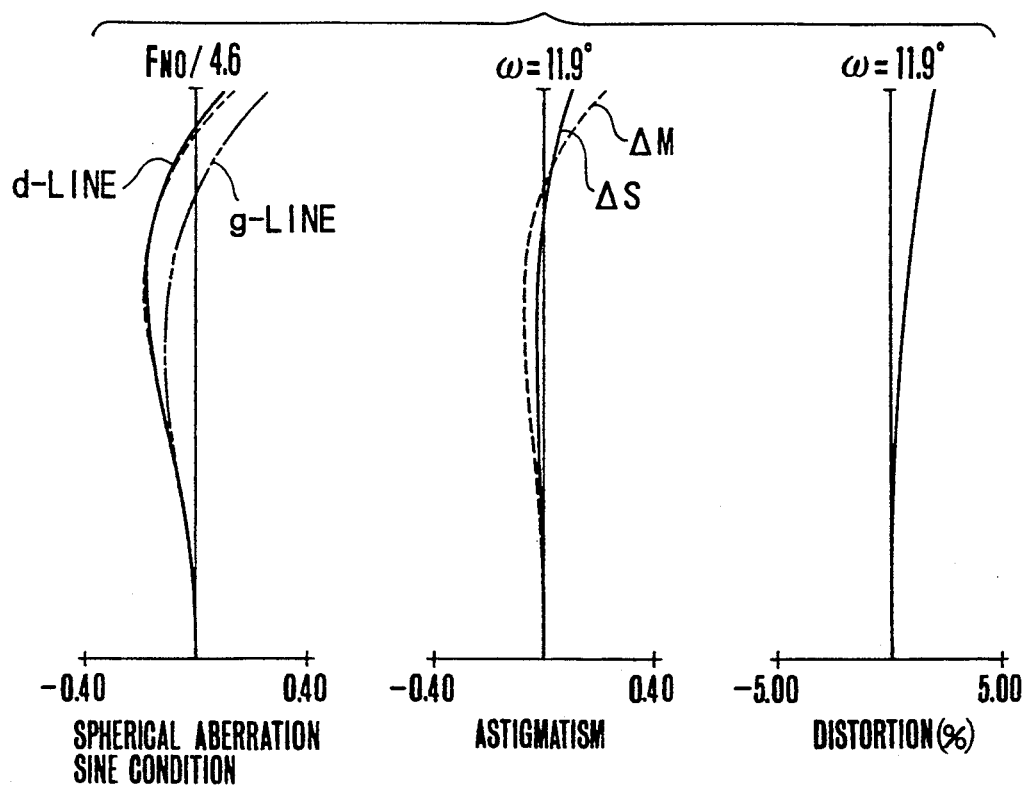
Figures 2, 17A:
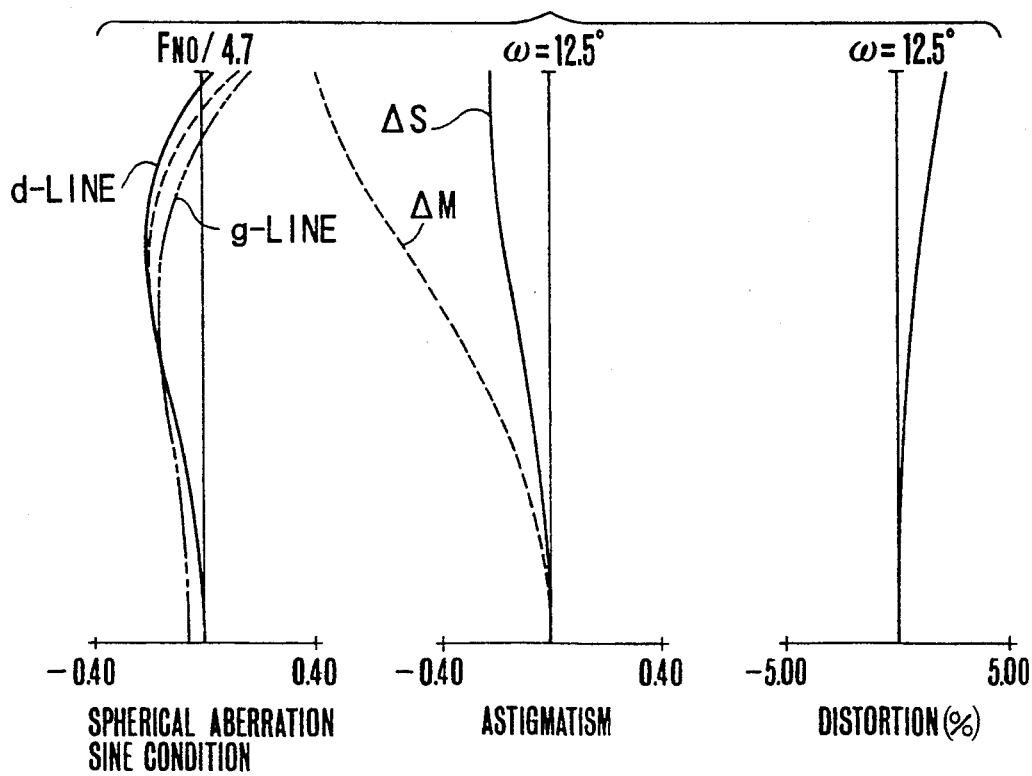
Figures 1, 17B:
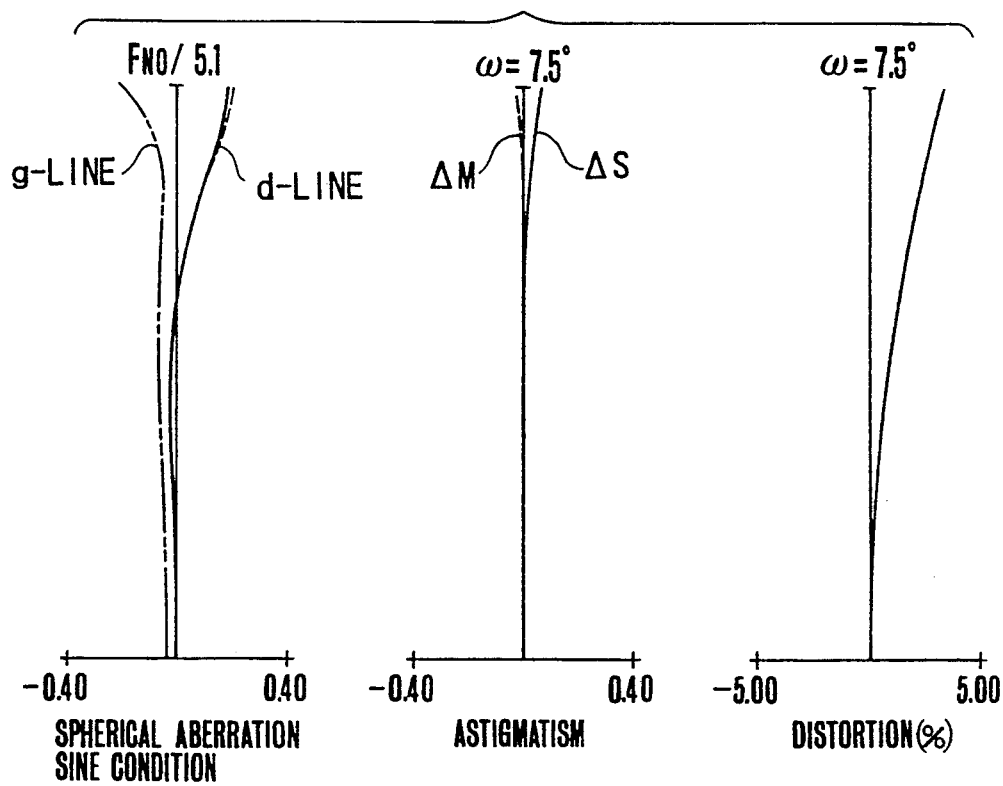
Figures 2, 17B:
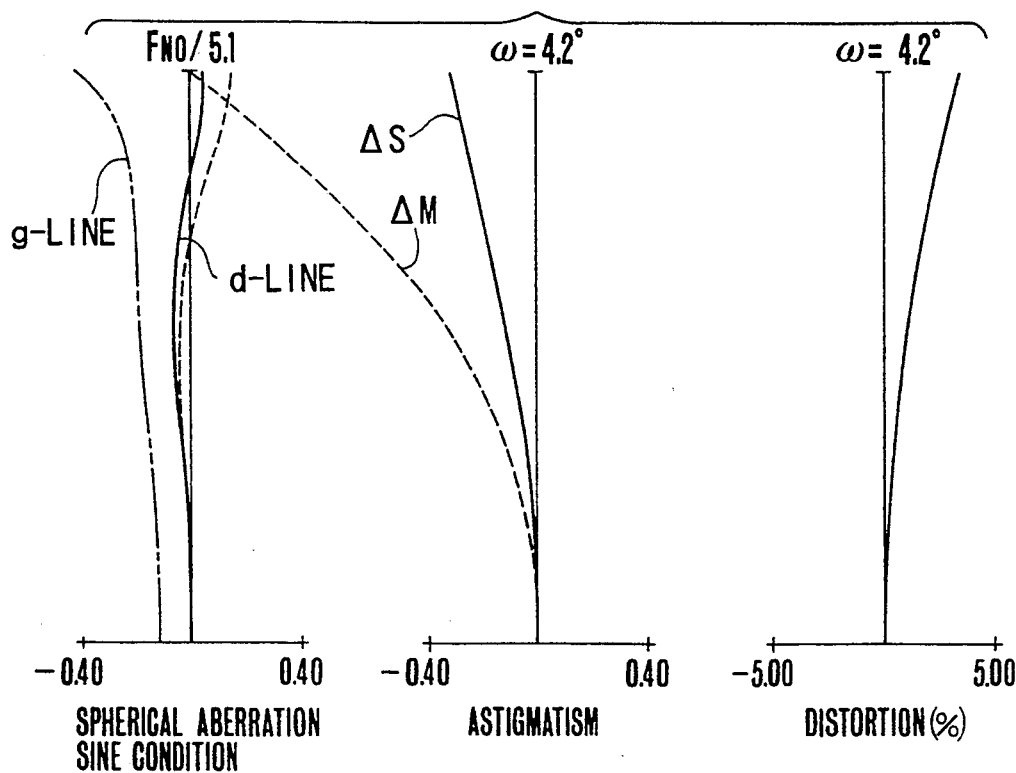
Figures 1, 17C:
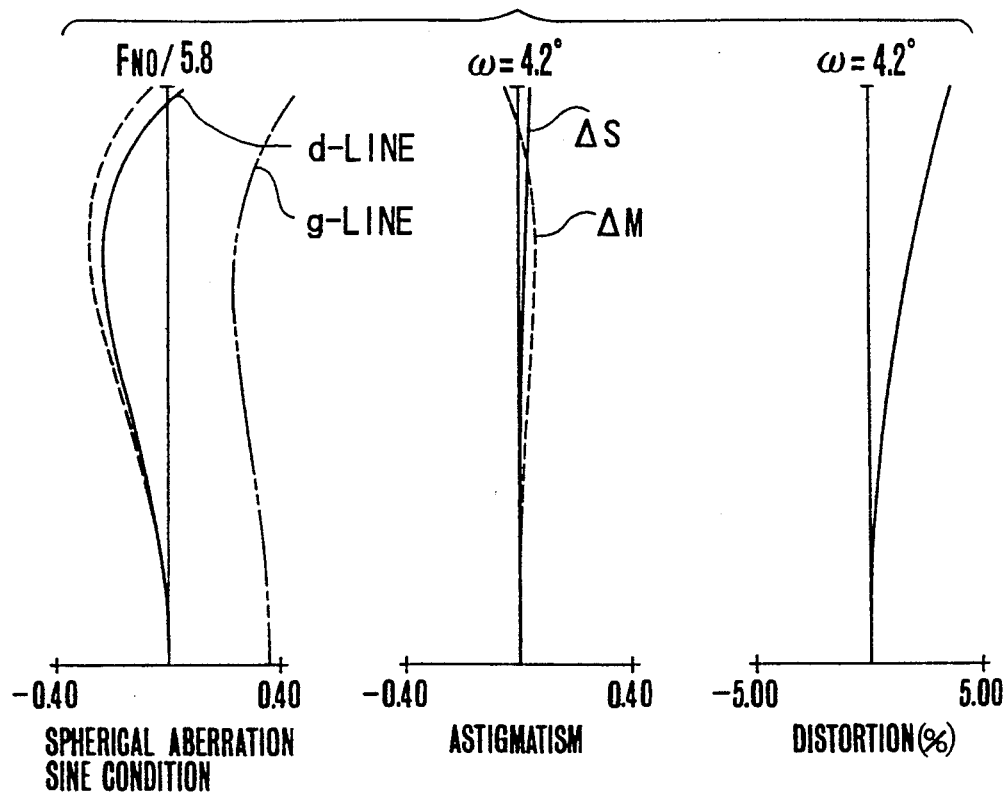
Figures 2, 17C:
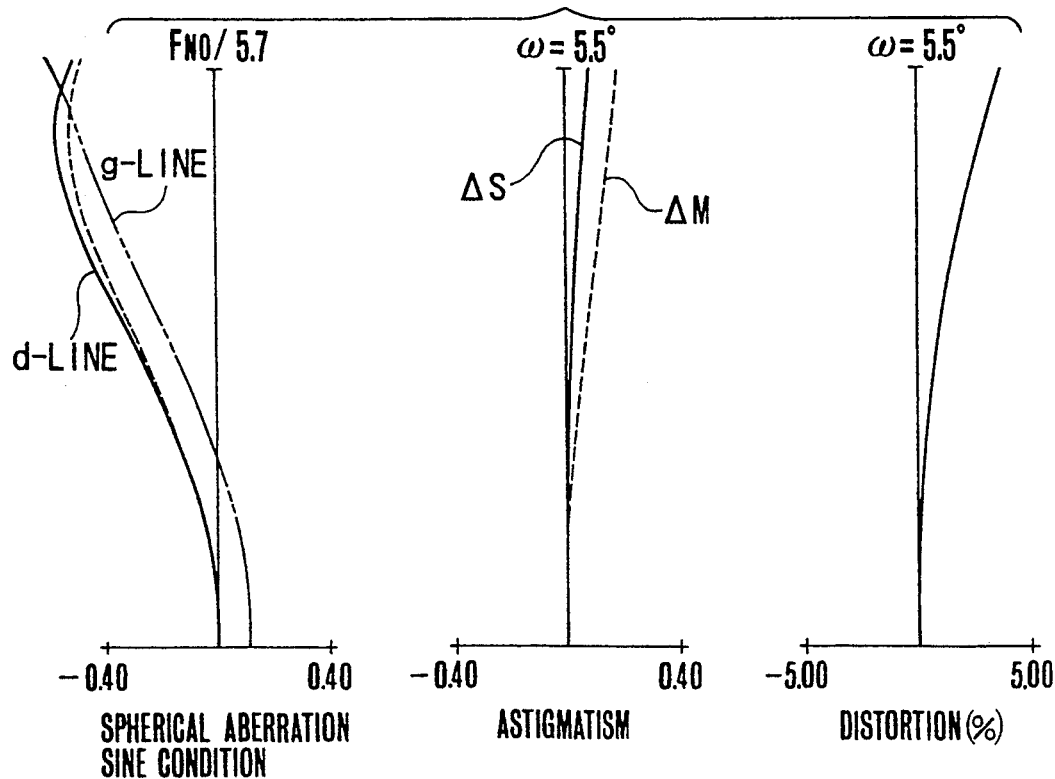
Figures 1, 18A:
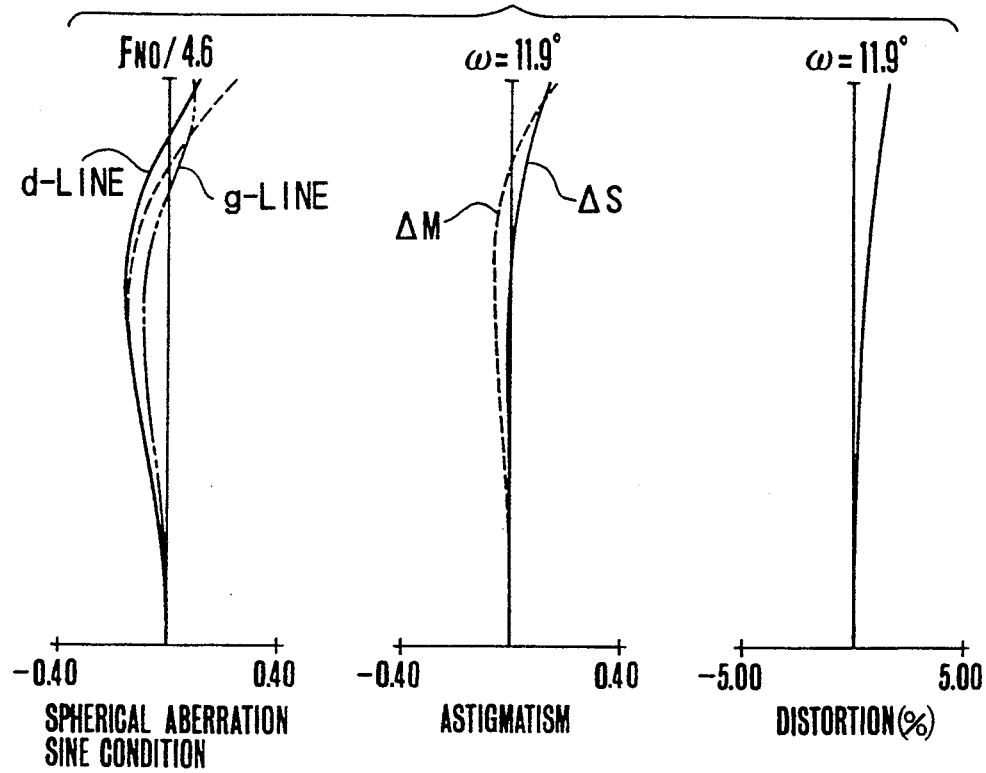
Figures 2, 18A:
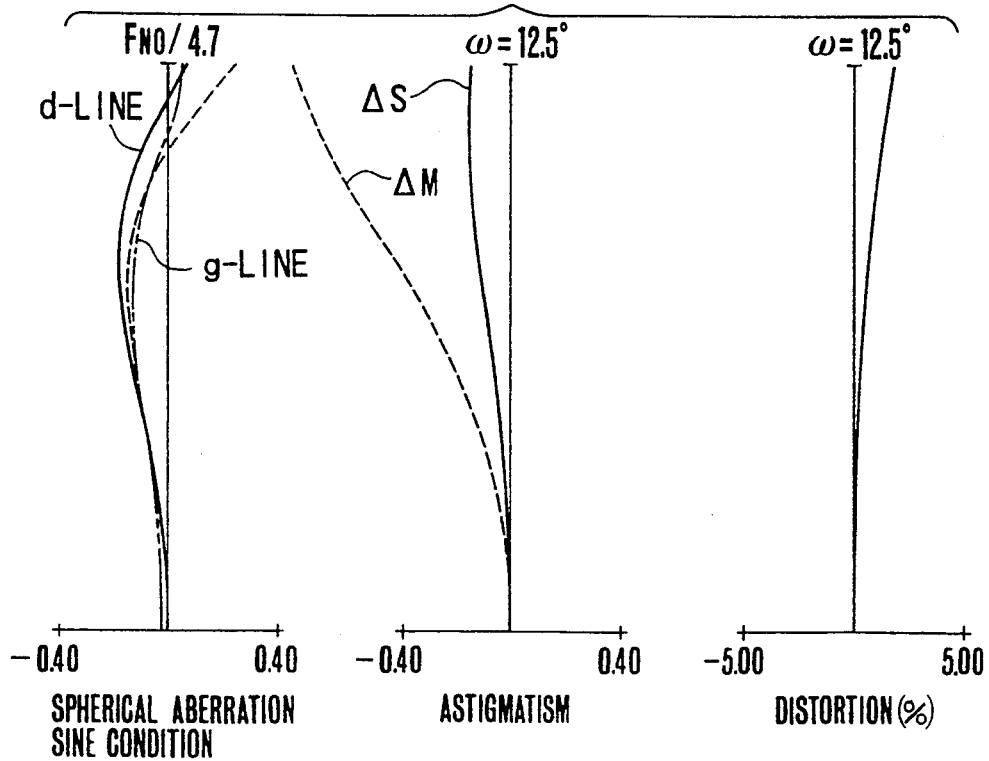
Figures 1, 18B:
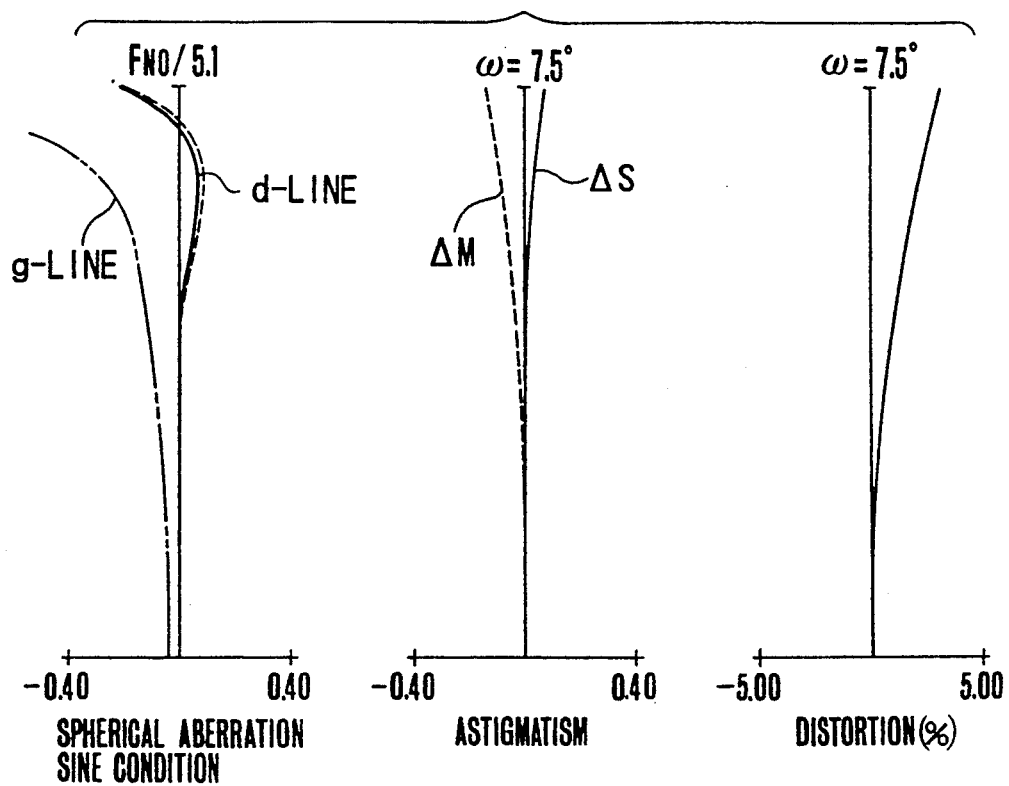
Figures 2, 18B:
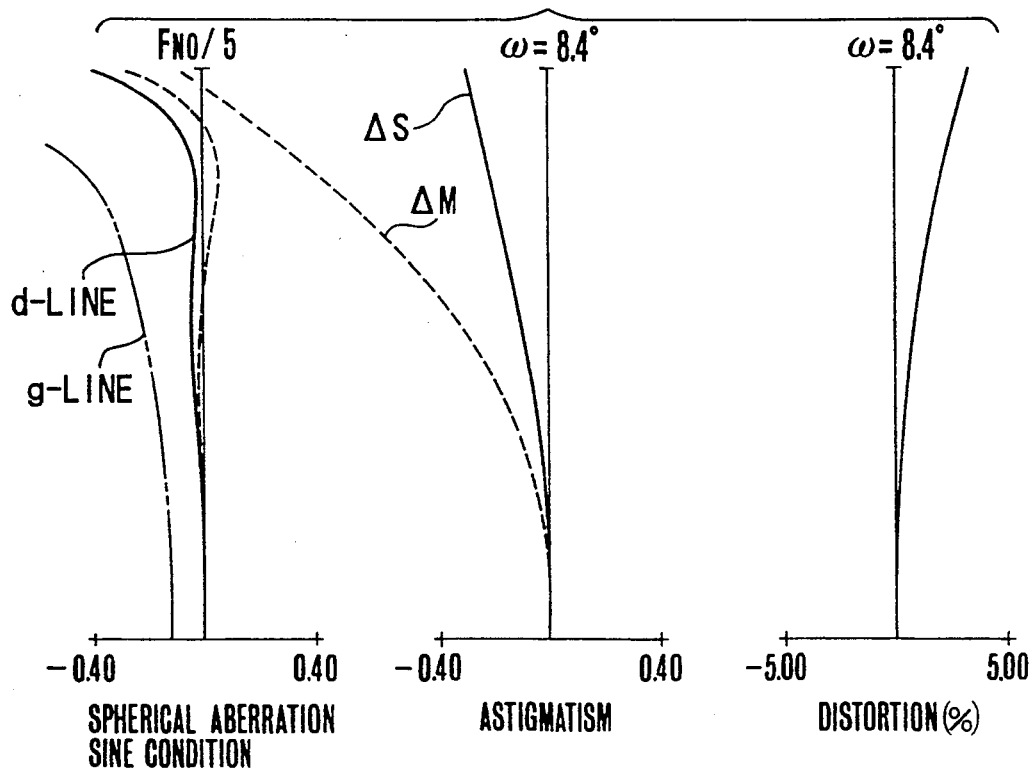
Figures 1, 18C:
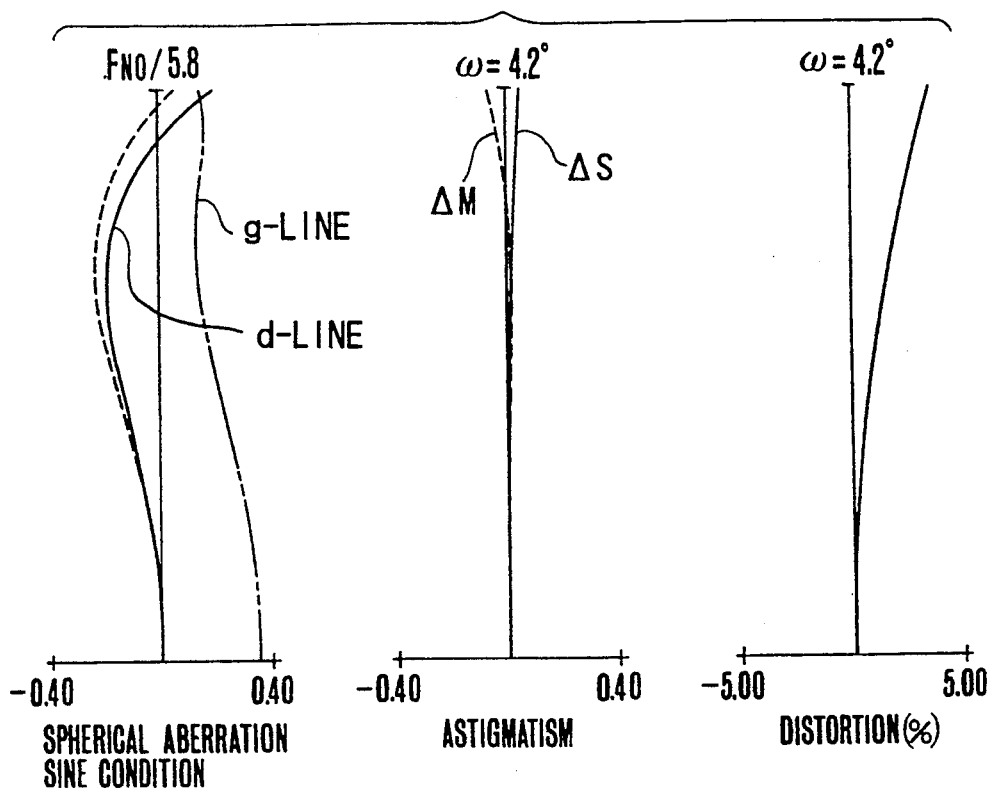
Figures 2, 18C:
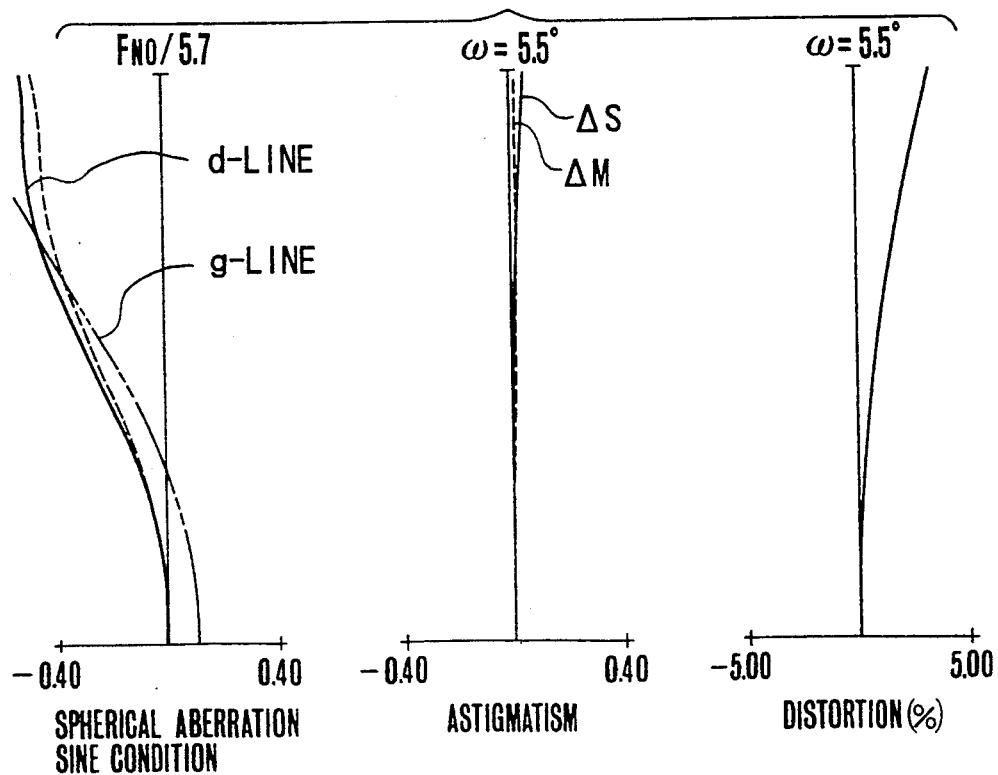
Figure 19:
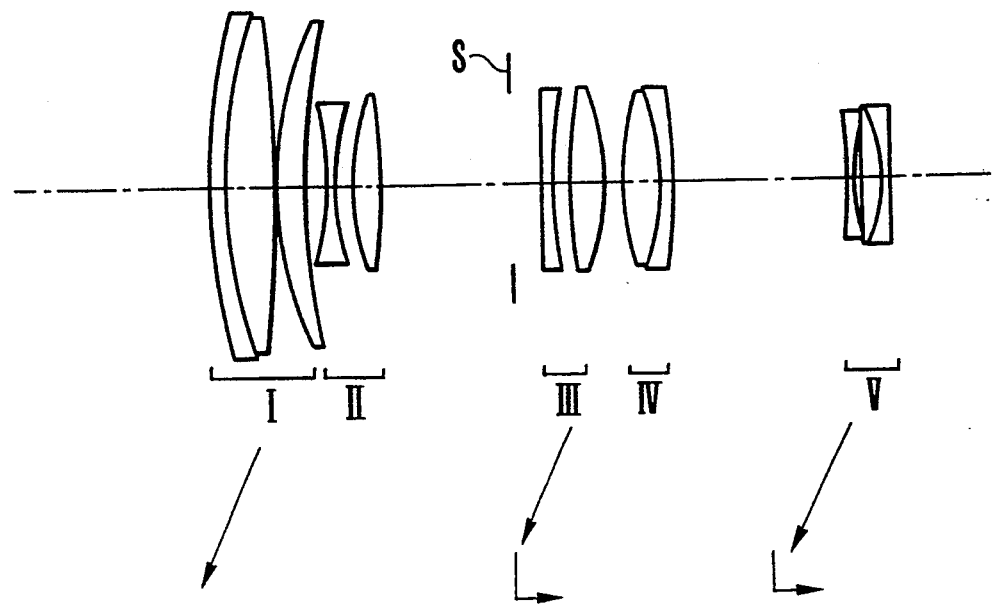
Figure 20:
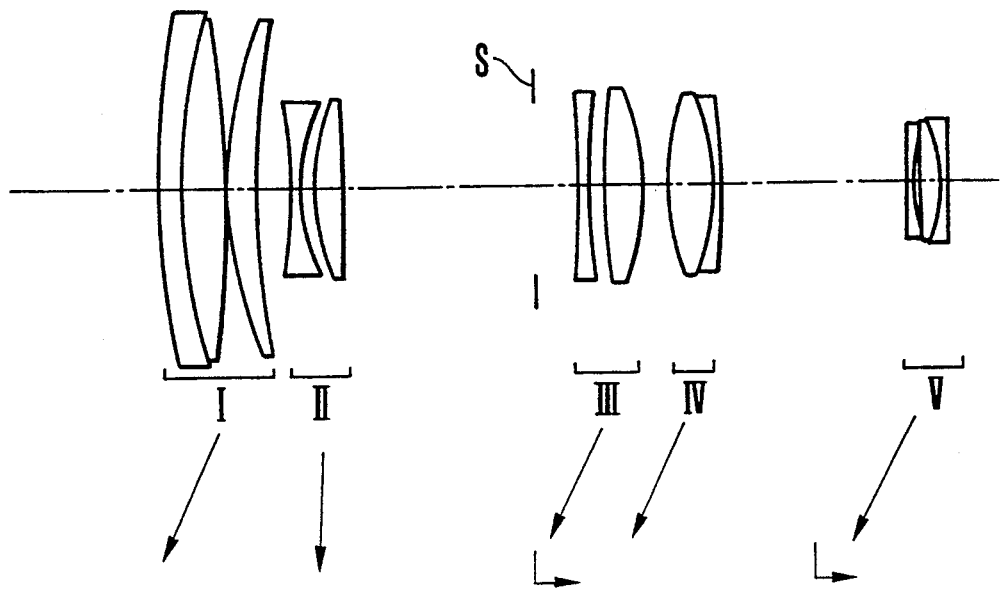
Figure 21:
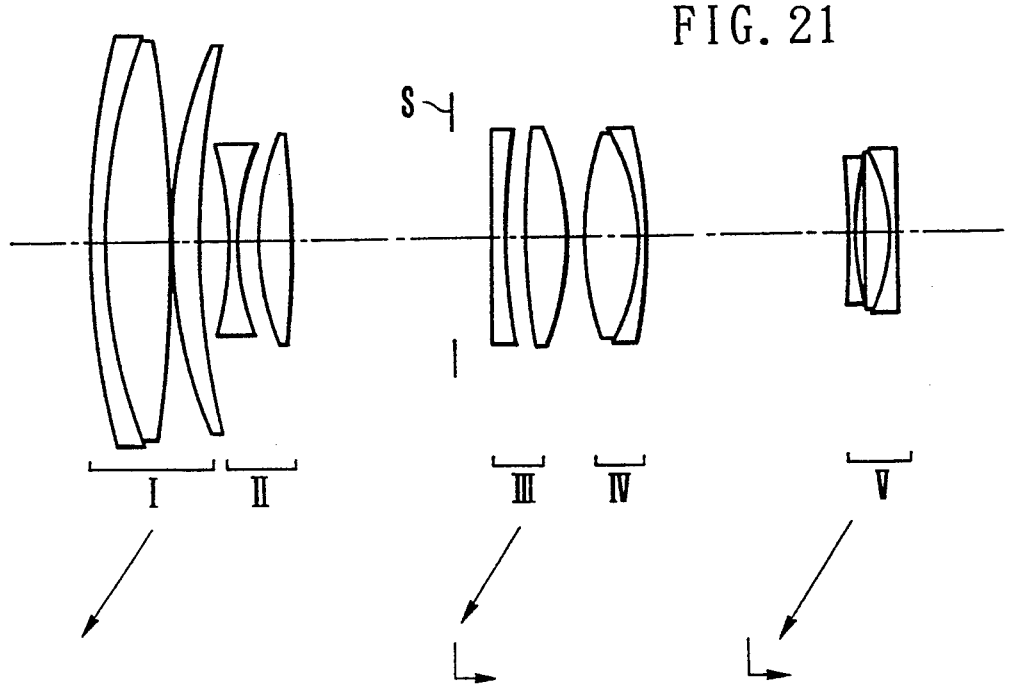
Figure 22:
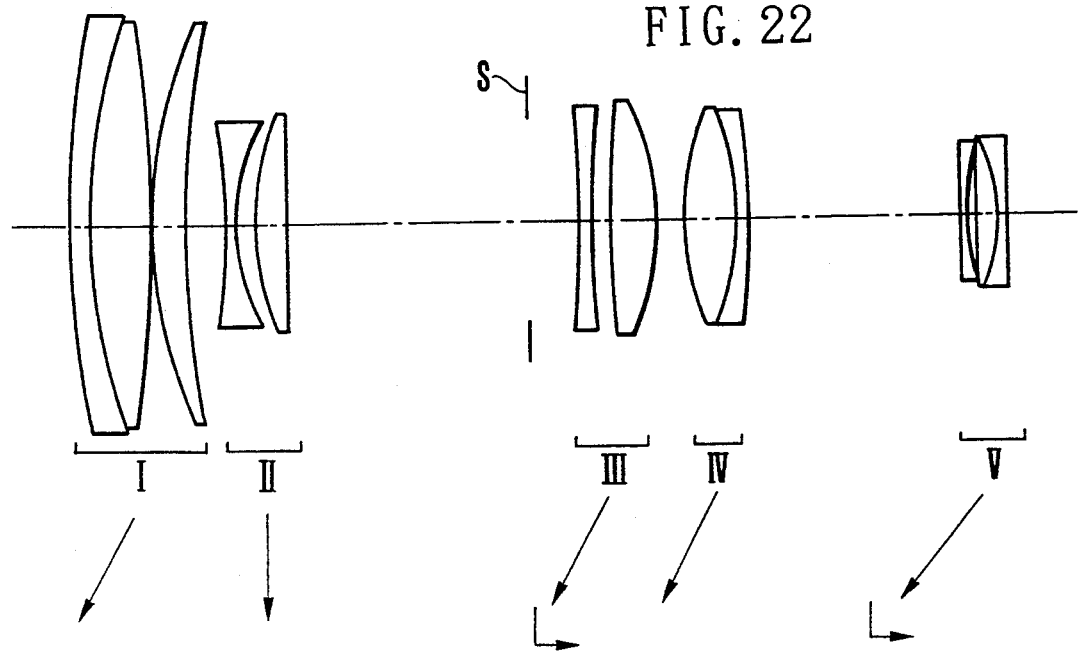
Figures 1, 23A:
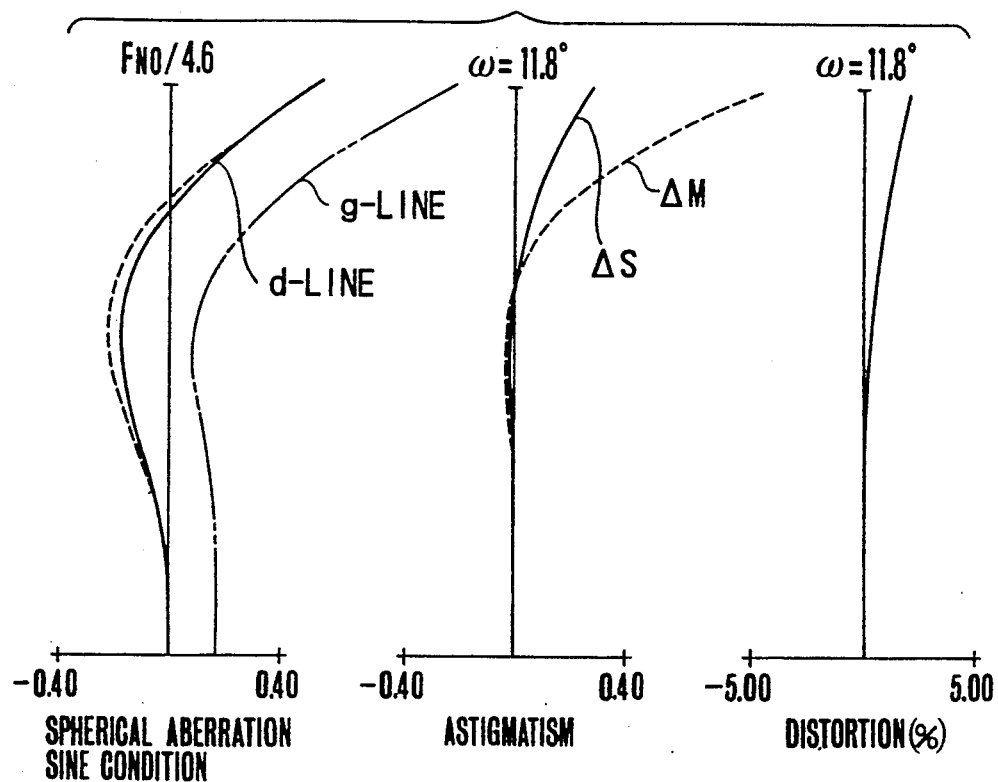
Figures 2, 23A:
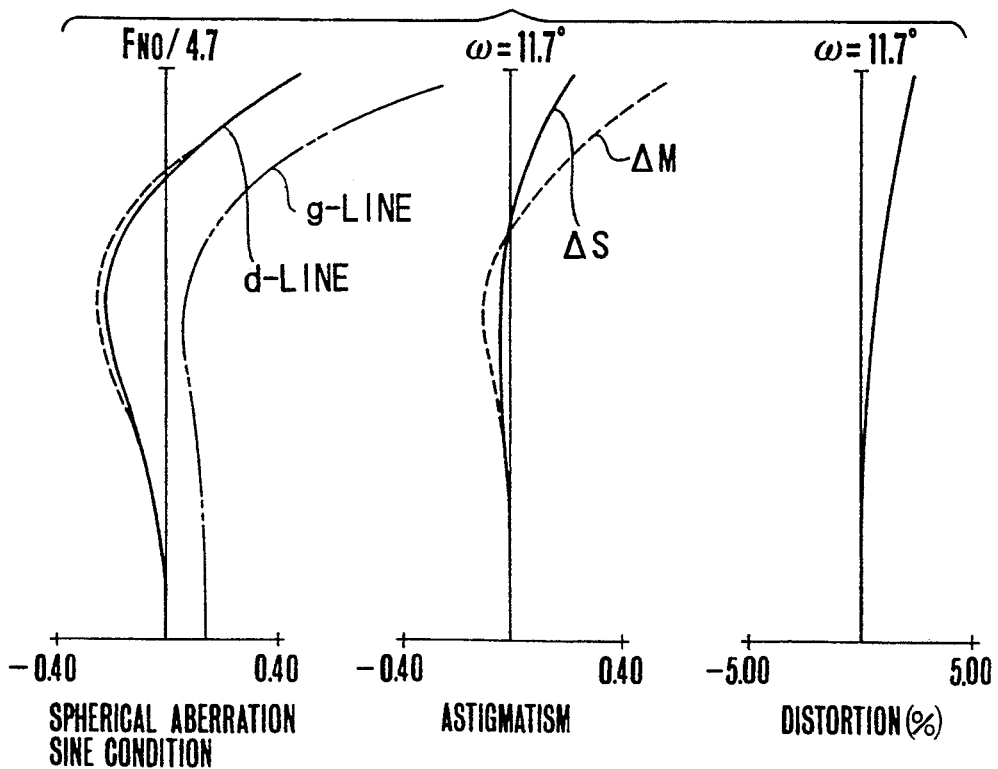
Figures 1, 23B:
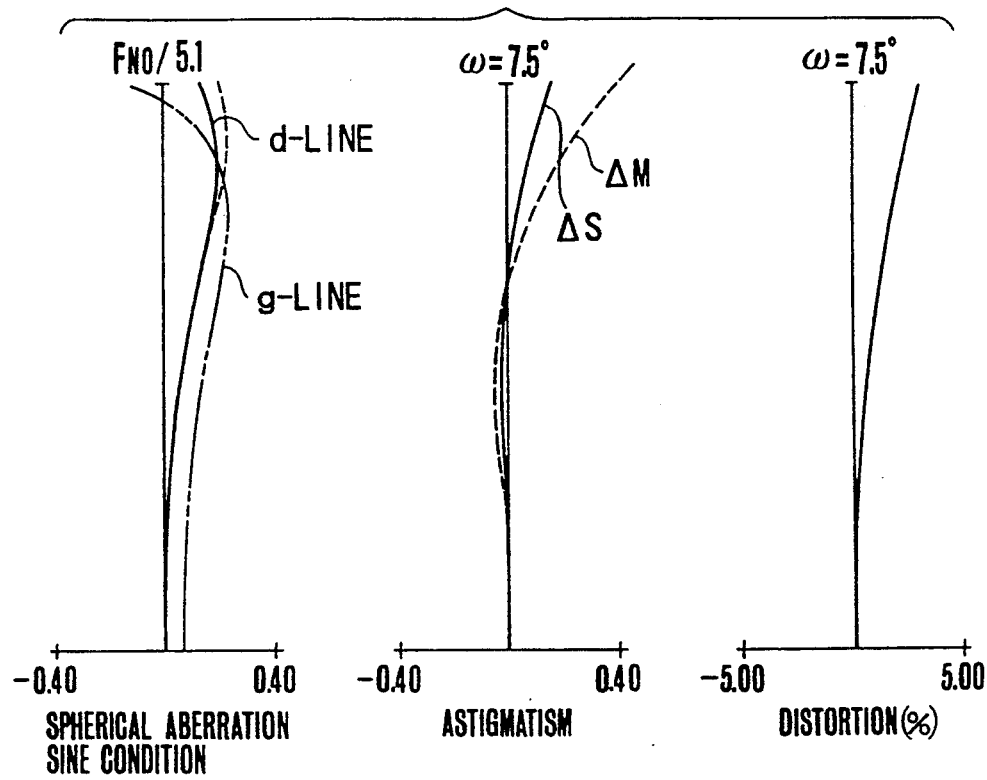
Figures 2, 23B:
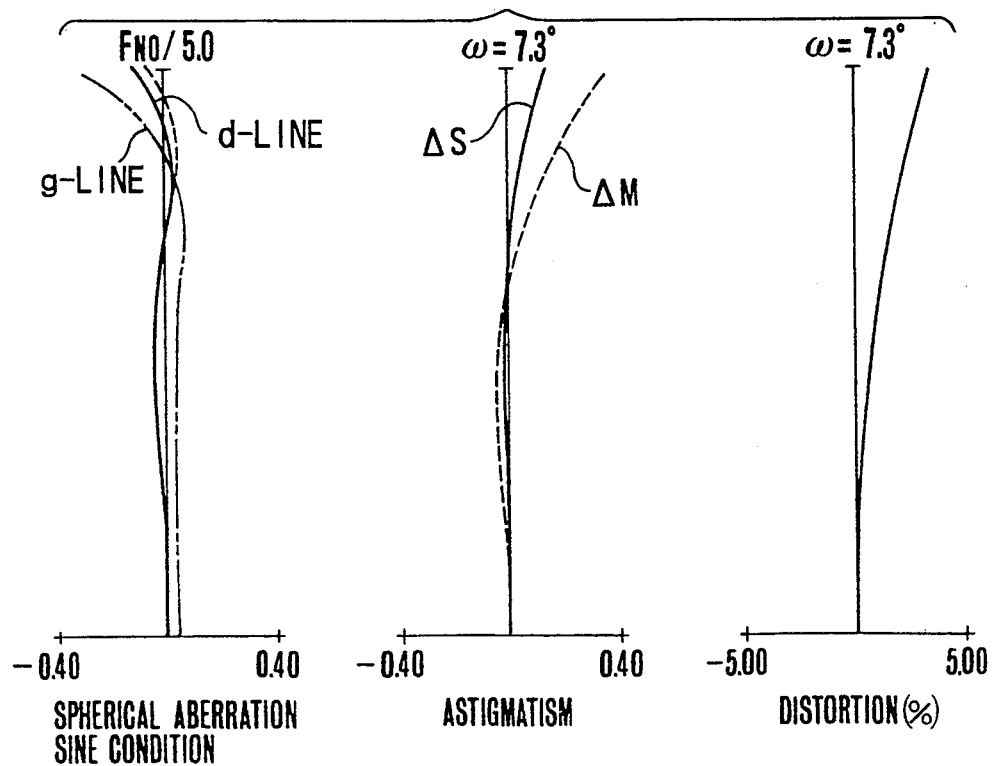
Figures 1, 23C:
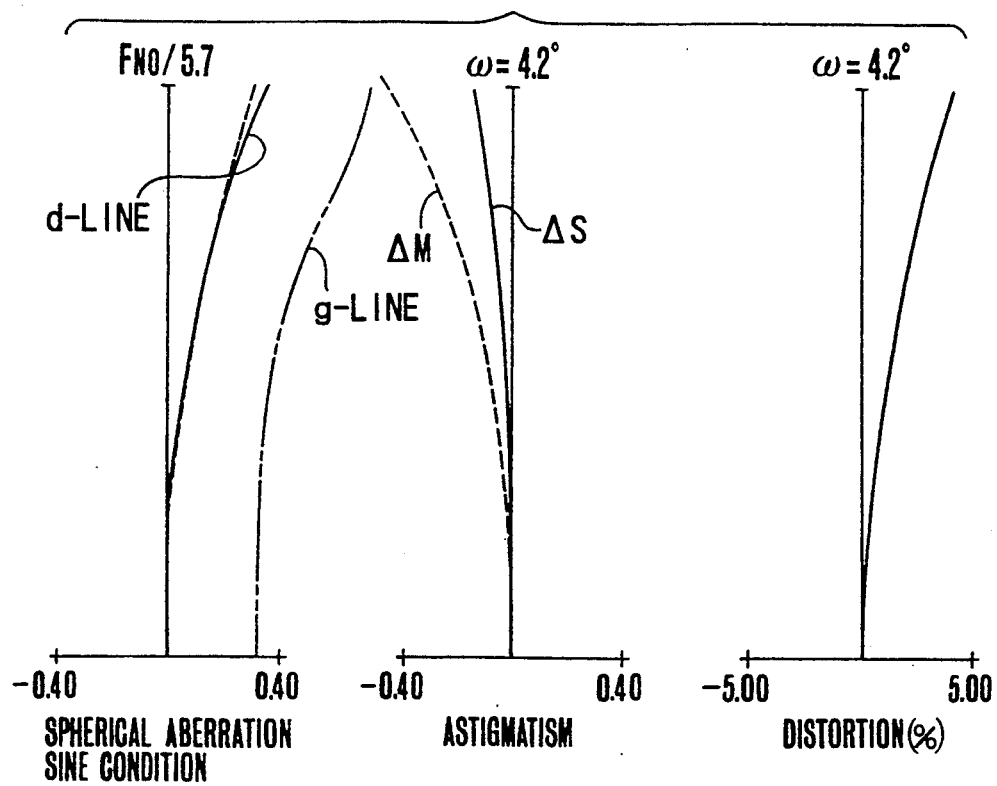
Figures 2, 23C:
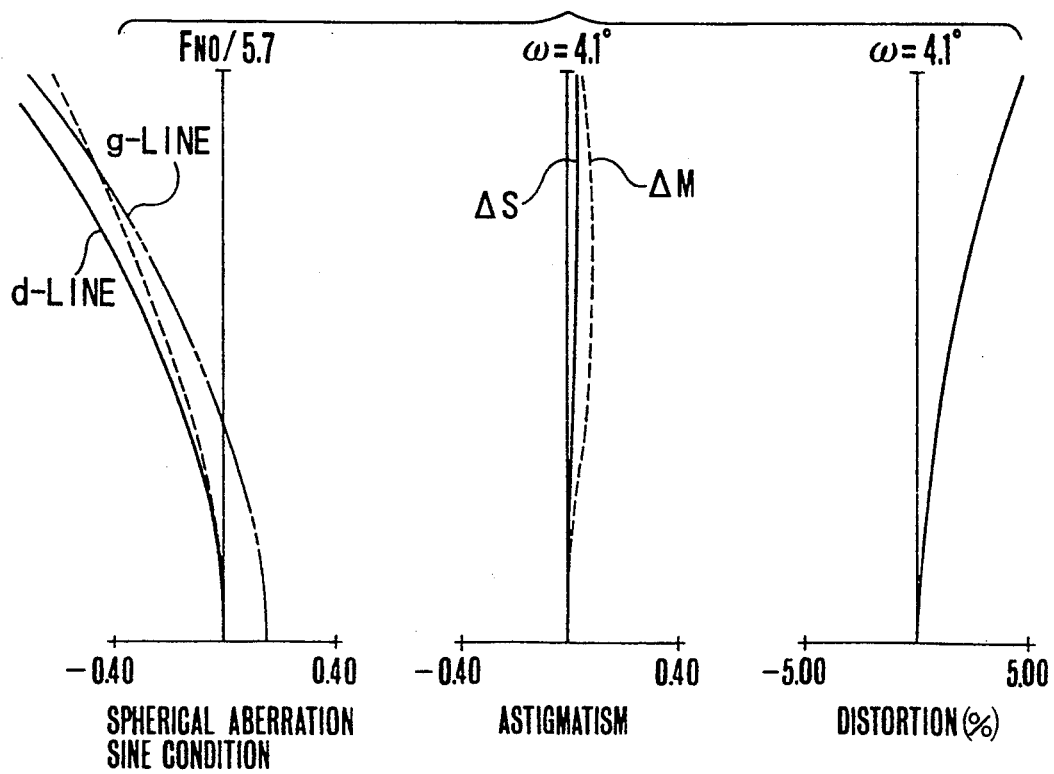
Figures 1, 24A:
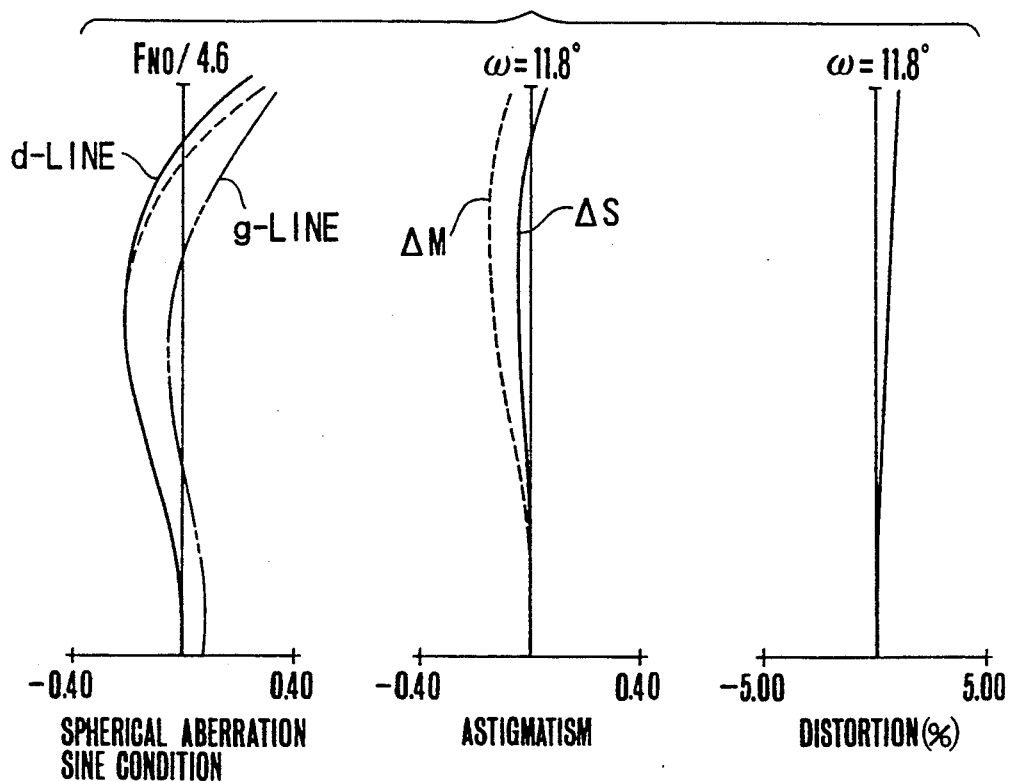
Figures 2, 24A:
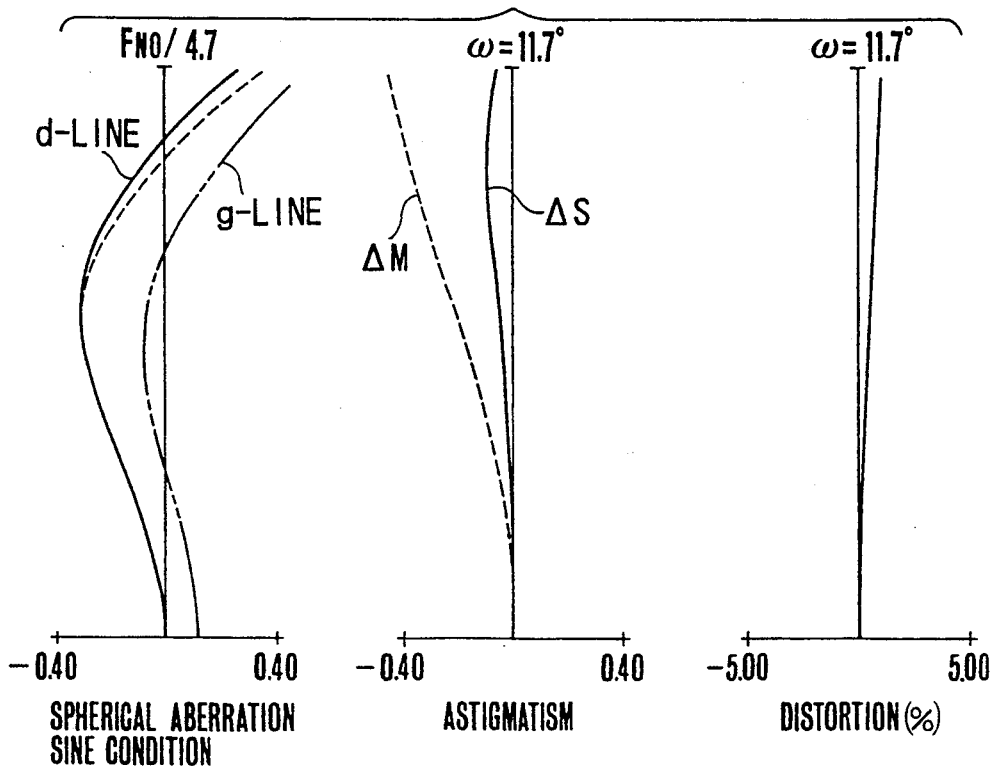
Figures 1, 24B:
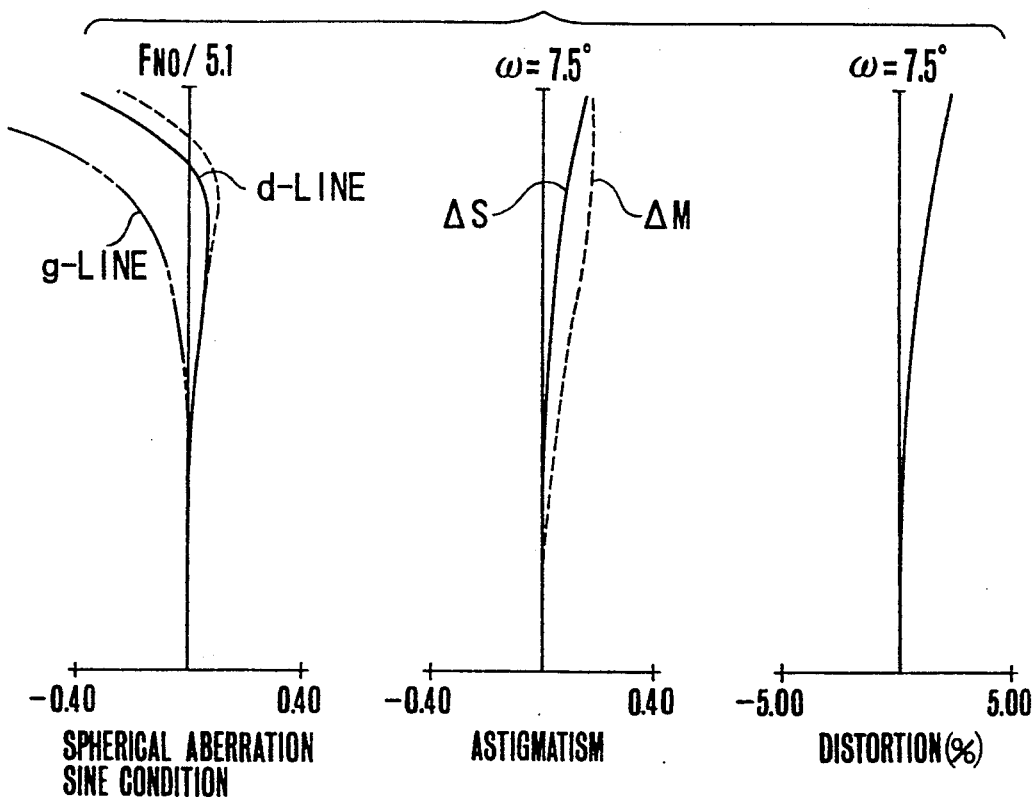
Figures 2, 24B:
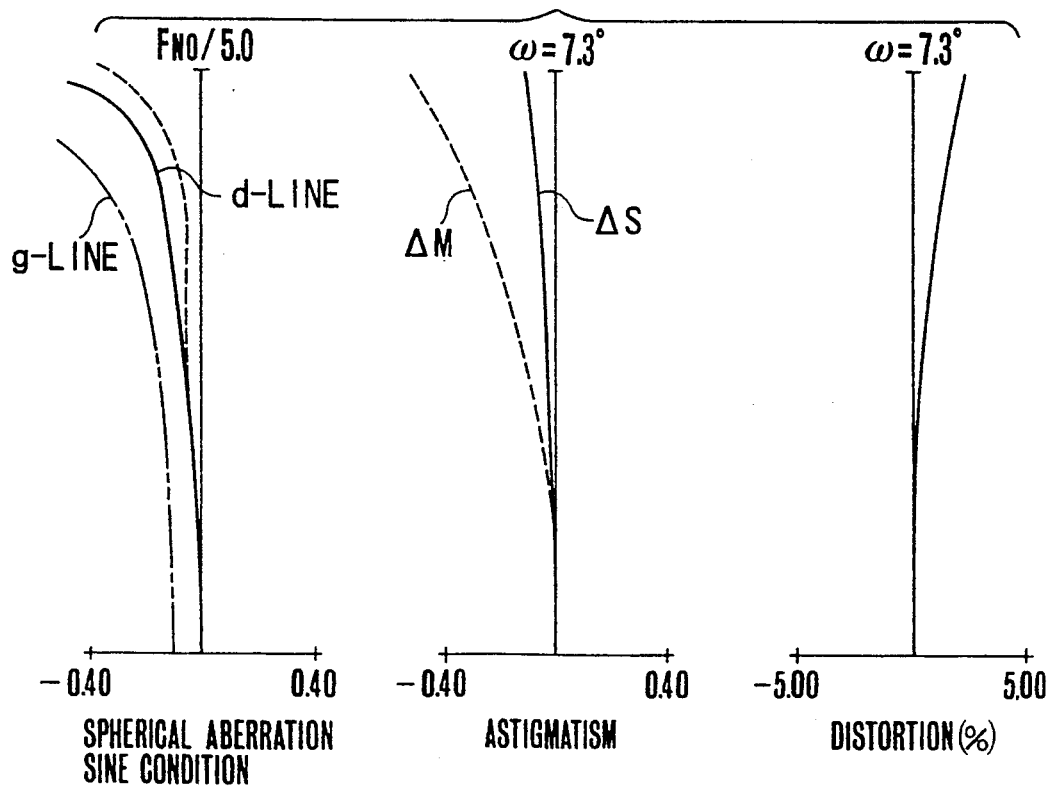
Figures 1, 24C:
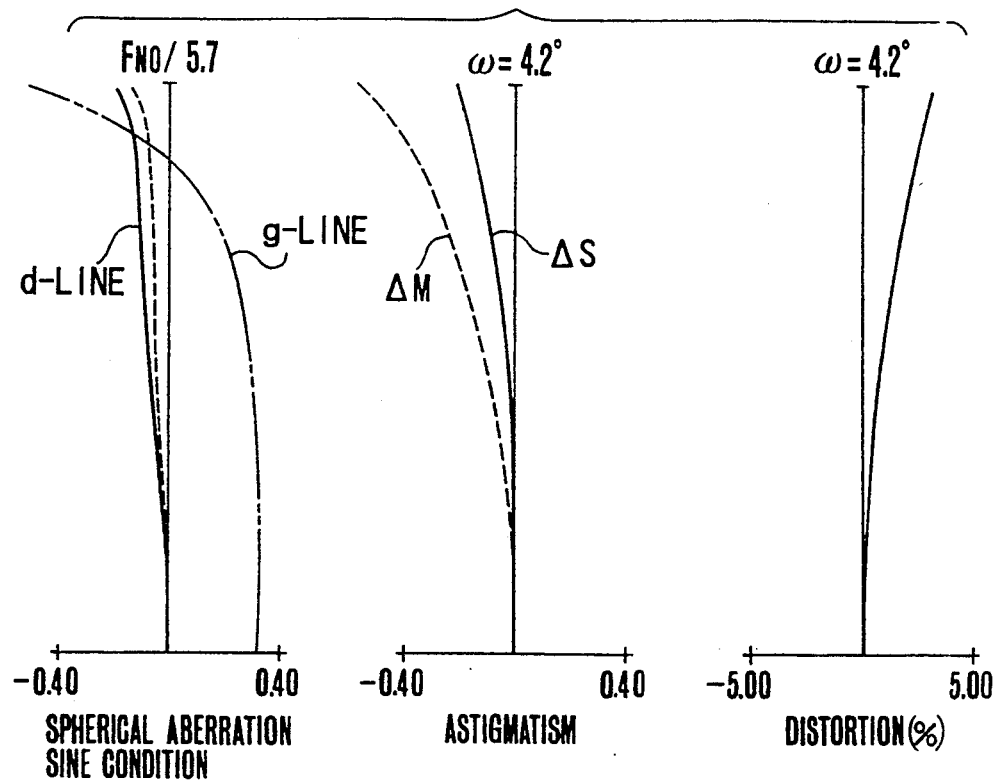
Figures 2, 24C:
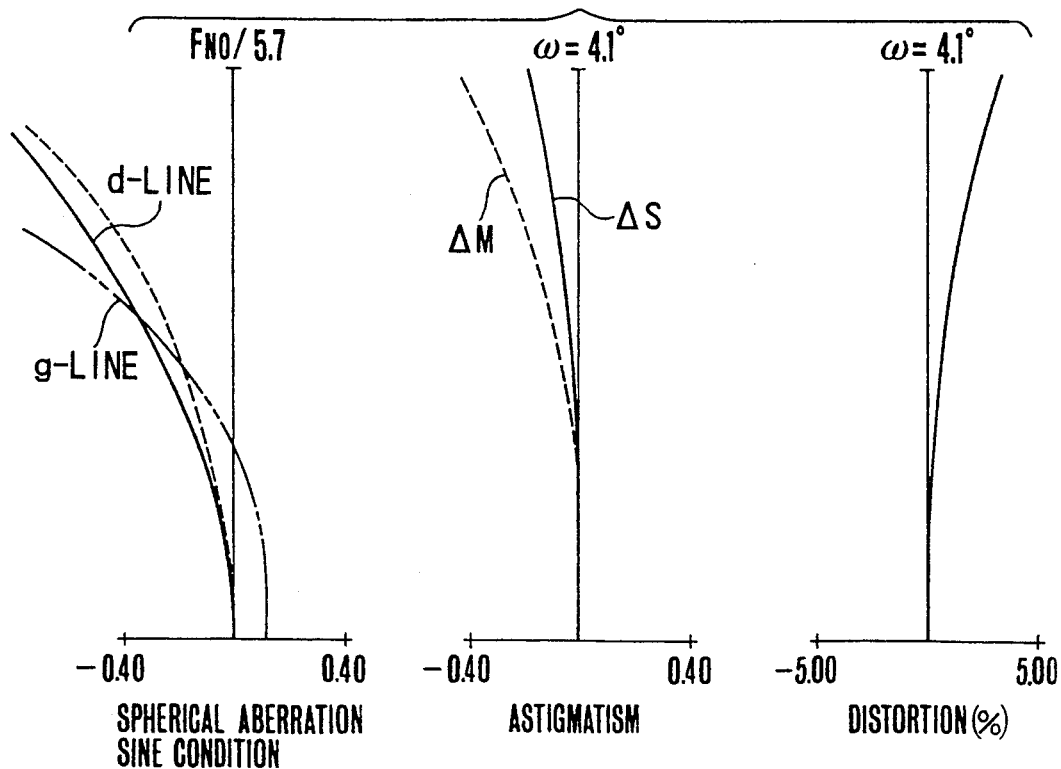
Figures 1, 25A:
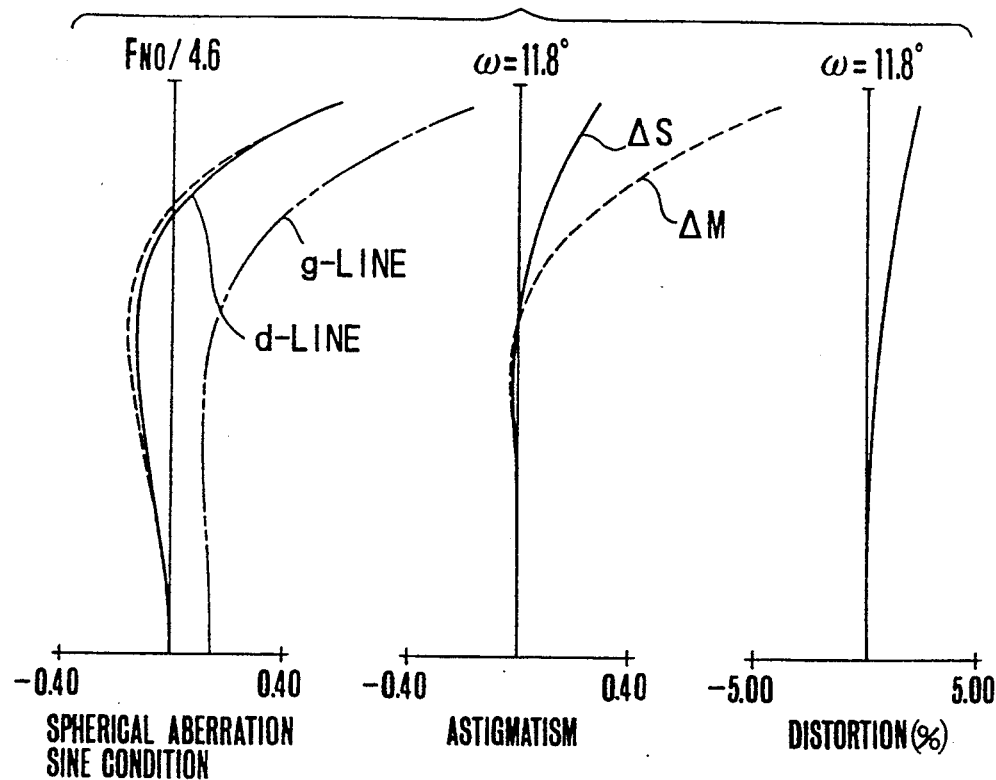
Figures 2, 25A:
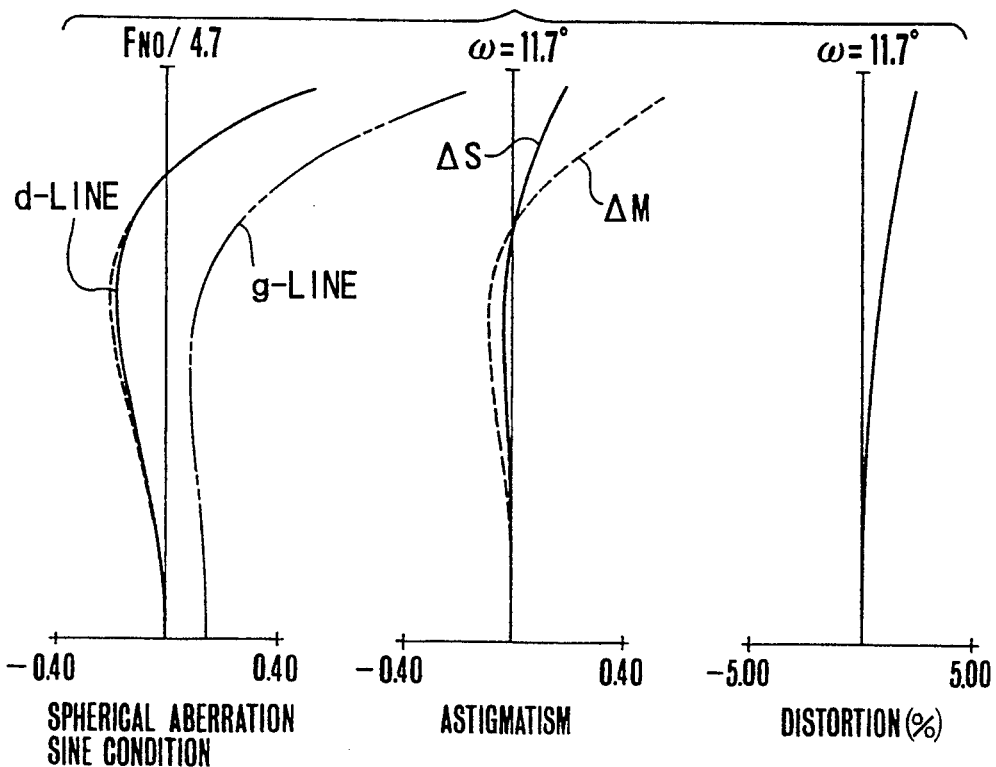
Figures 1, 25B:
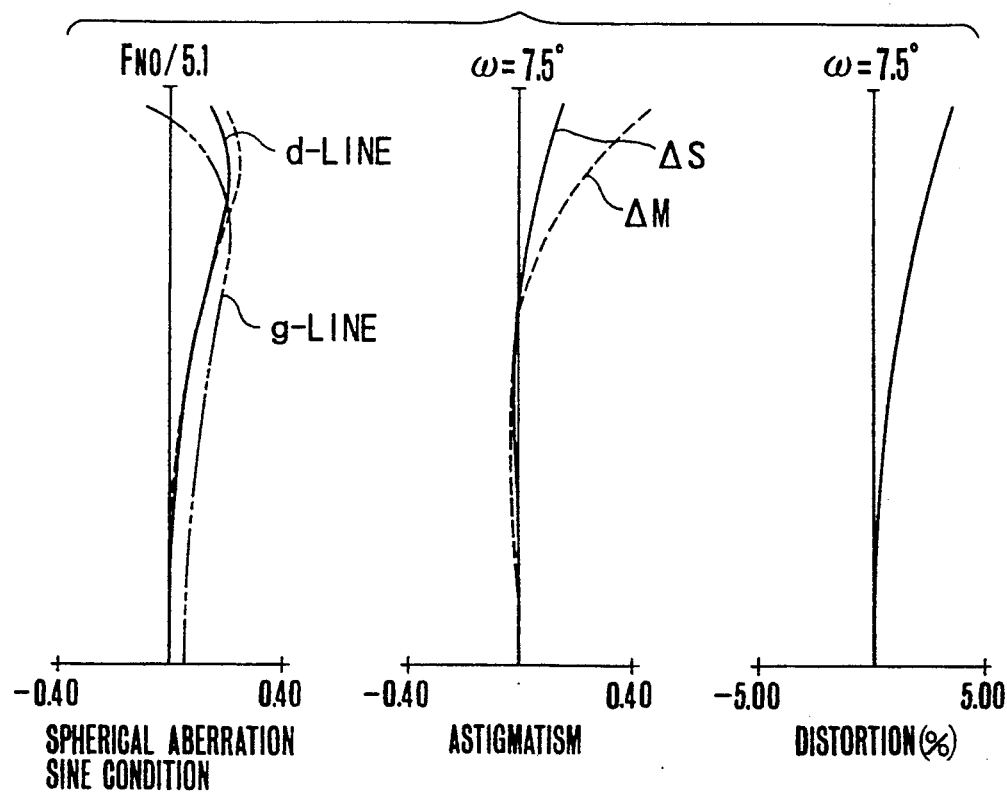
Figures 2, 25B:
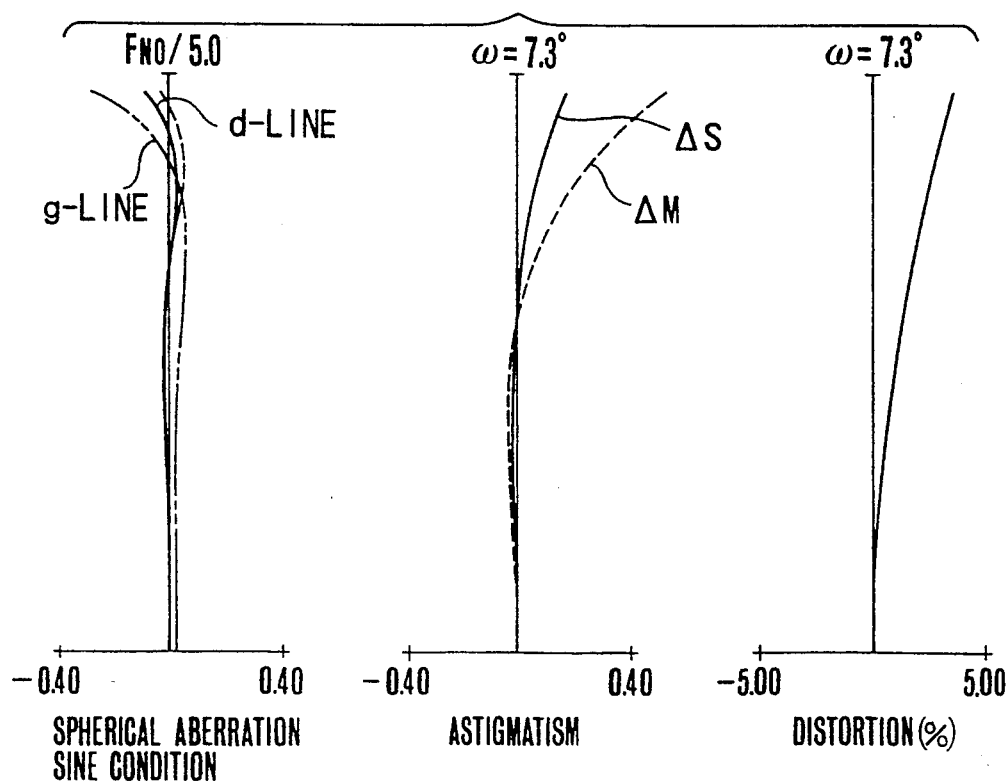
Figures 1, 25C:
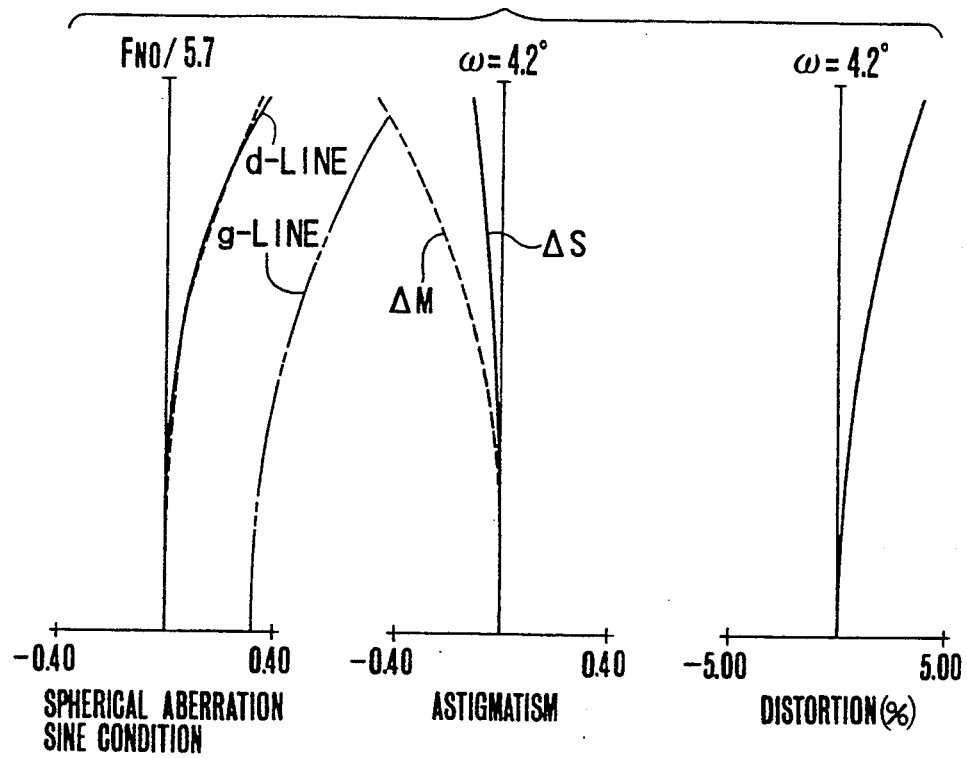
Figures 2, 25C:
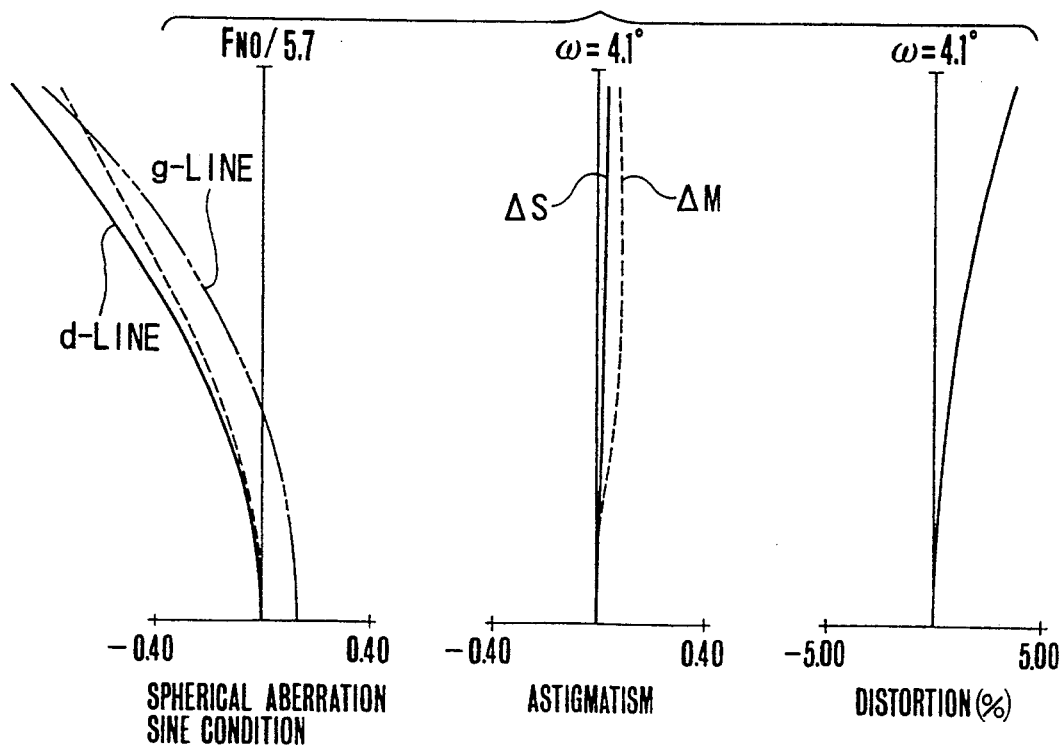
Figures 1, 26A:
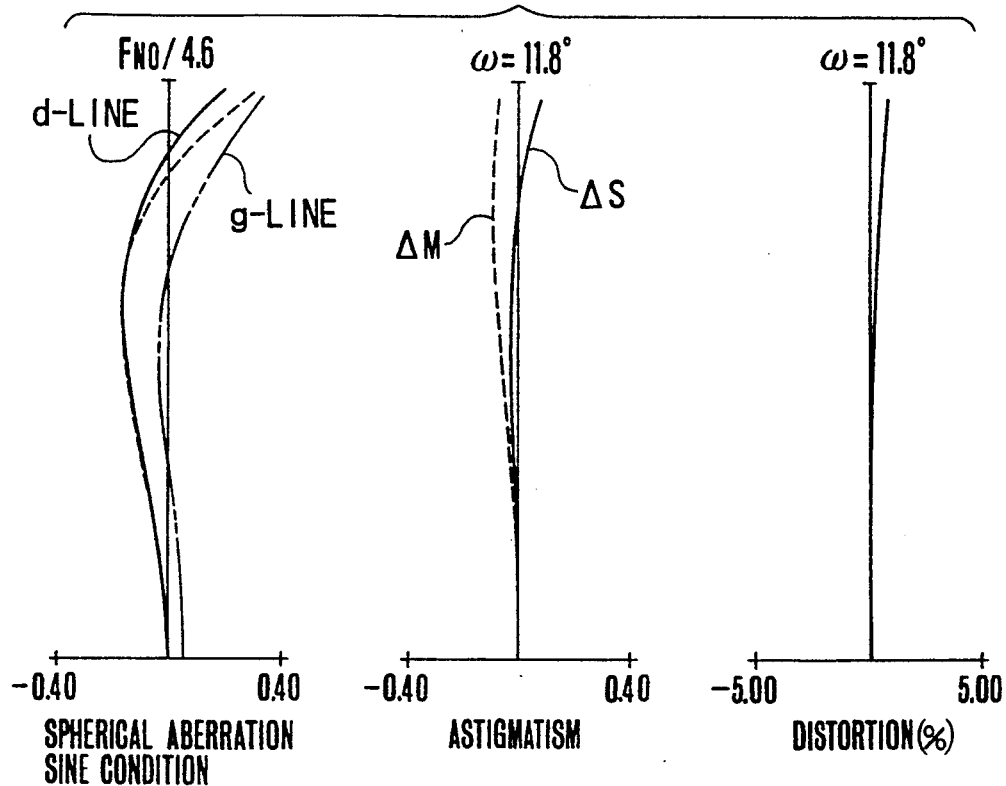
Figures 2, 26A:
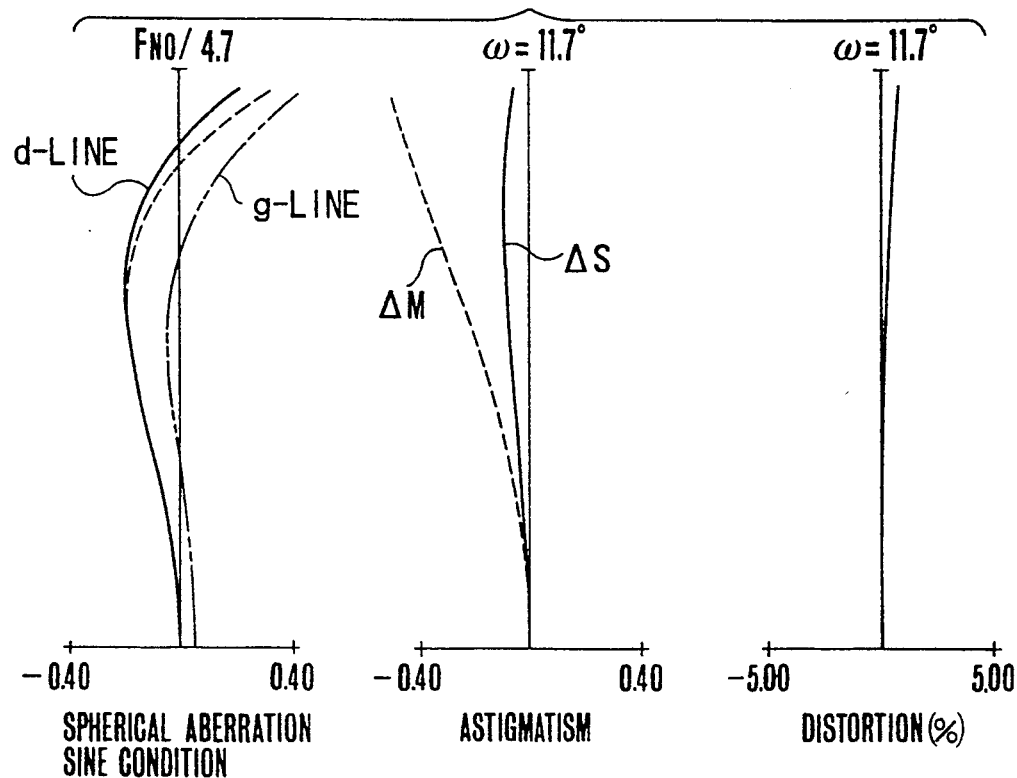
Figures 1, 26B:
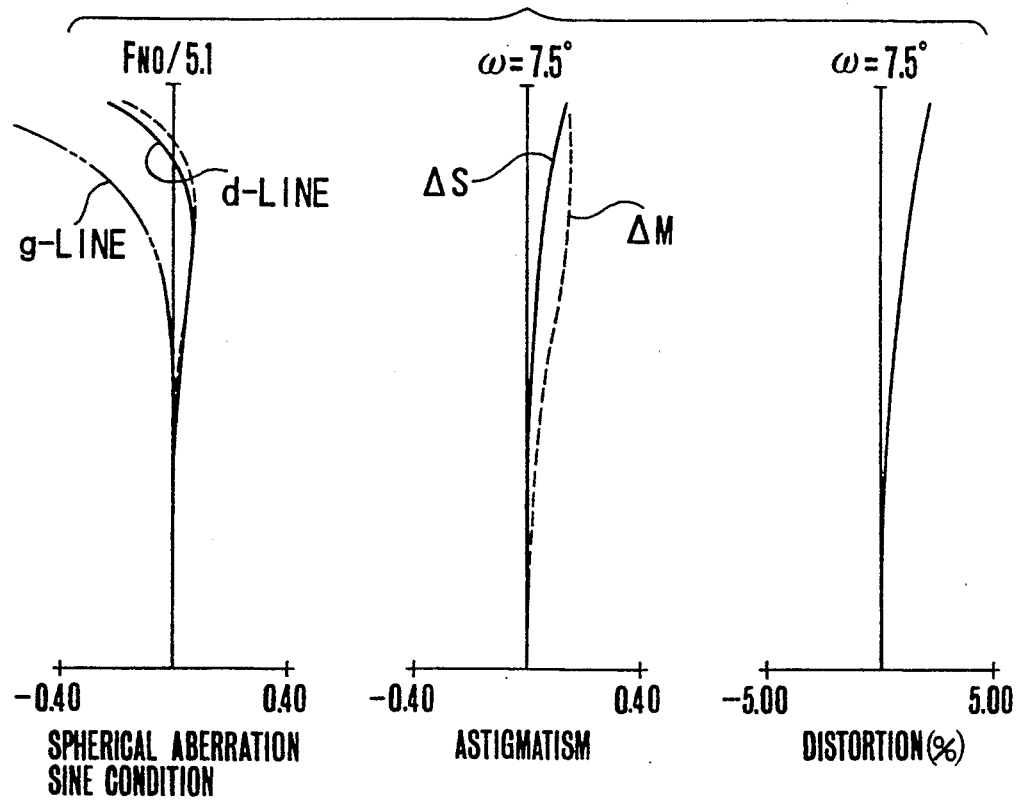
Figures 2, 26B:
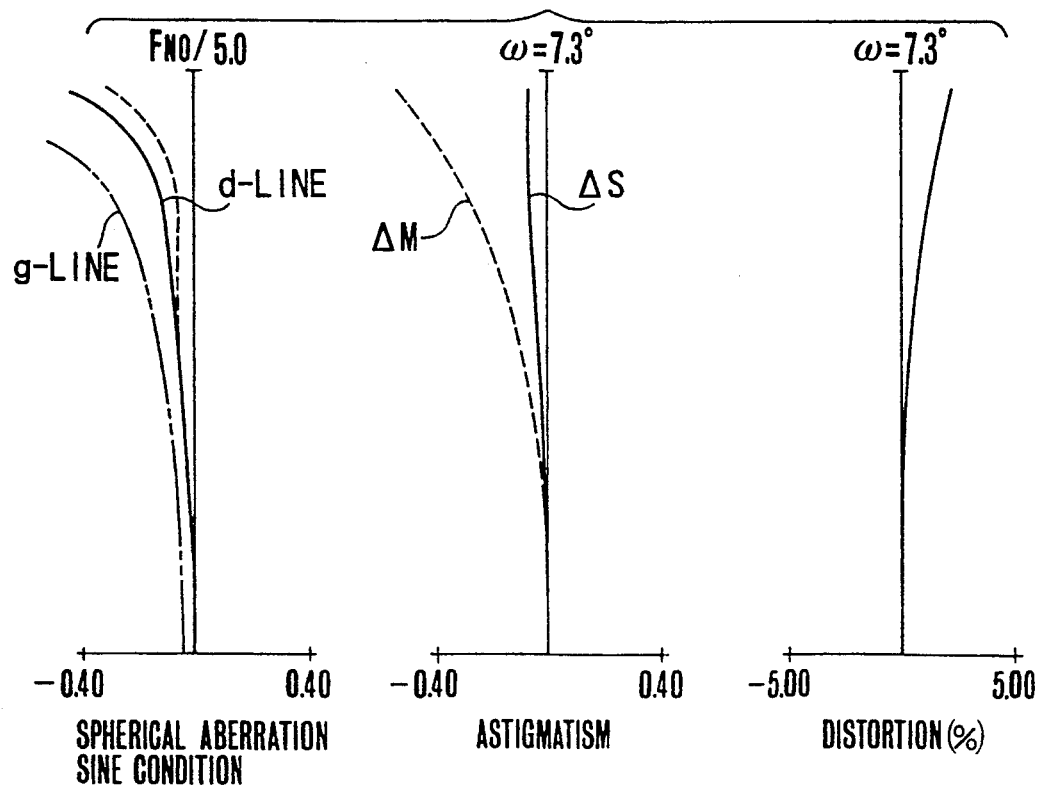
Figures 1, 26C:
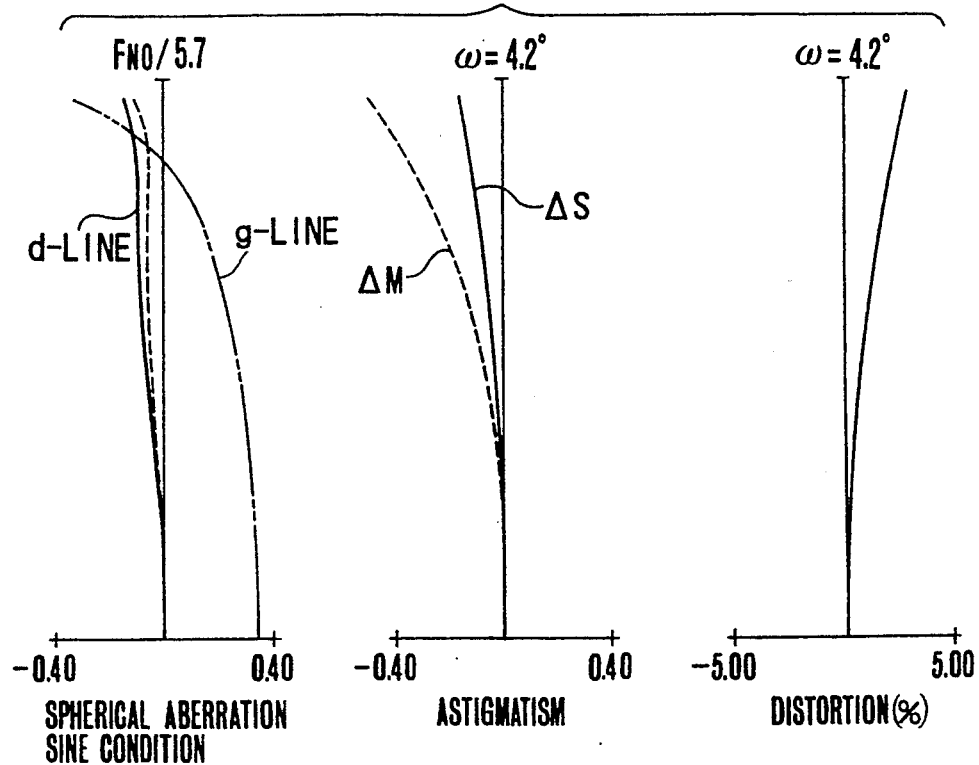
Figures 2, 26C:
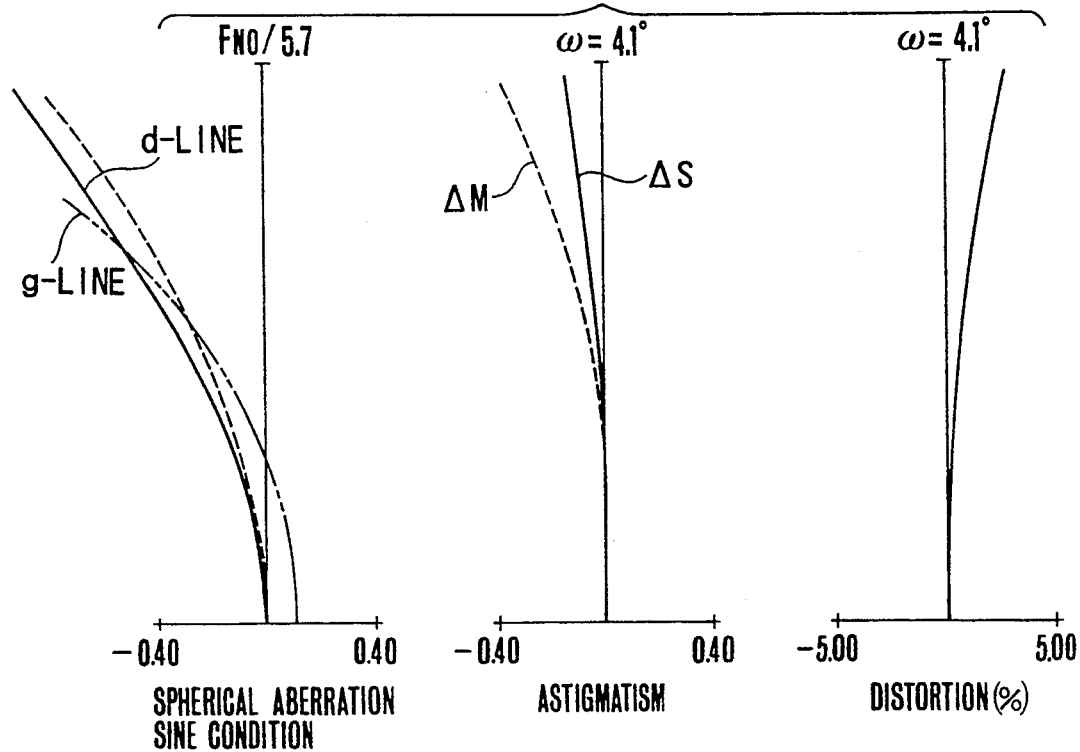

A further embodiment of the invention is shown in FIGS. 13 to 15 where as focusing from an infinitely distant object to a close object, the fifth lens unit of the rear lens group is moved rearward as indicated by an arrow of parallel solid line to the optical axis, thereby improving the ability to control and the optical performance throughout an extended focusing range.

To deal with the fifth lens unit as the focusing lens unit, it is preferably to set forth the following conditions:

$$0.01 < E_{5T}/(E_{5W} \cdot z^2) < 0.7 \quad (11)$$

$$0.07 < |f_5|/f_T < 0.45 \quad (12)$$

$$0.095 < |M_5|/(Z \cdot |f_5|) < 0.5 \quad (13)$$

where $f_5$ is the focal length of the fifth lens unit, $E_{5T}$ and $E_{5W}$ are the sensitivities of the fifth lens unit in the telephoto end and wide-angle end respectively, $f_T$ is the longest focal length of the entire lens system, $M_5$ is the total zooming movement of the fifth lens unit (where the direction from the object side to the image side is taken as positive), and Z is the zoom ratio.

These conditions are explained below.

The inequalities of condition (11) are to prescribe the ratio of the focusing movements for the same object in the wide-angle and telephoto ends. To exceed the lower limit of the condition (11) means that the sensitivity in the wide-angle end is much too large, or the sensitivity in the telephoto end is much too small. In the former case, the focusing lens unit becomes difficult to control mechanically. In the latter case, the total focusing movement in the telephoto end becomes much too large. So, neither of these is good. To exceed the upper limit of the condition (11) means that the sensitivity in the wide-angle end is much too small, or the sensitivity in the telephoto end is too much large. In the former case, there arises the necessity of taking a wider amount of space for focusing purposes in the wide-angle end, and the total length of the lens is caused to become long. In the latter case, the deterioration of performance due to the manufacturing errors increases objectionably. By setting the sensitivities $E_{5W}$ and $E_{5T}$ so as to satisfy the condition (11), therefore, the focusing movement for the same object is made small in the wide-angle end and large in the telephoto end, giving advantages that the space for focusing purposes in the wide-angle end decreases, and the total length of the lens in the wide-angle end is shortened. In the telephoto end, on the other hand, the widened space by zooming is utilized in focusing. Therefore, an advance in the compactness of the entire lens system becomes possible.

The inequalities of condition (12) are for making proper the sensitivity of the fifth lens unit. When the focal length of the fifth lens unit compared with the longest focal length of the entire lens system is short as exceeding the lower limit of the condition (12), this is advantageous at minimizing the total length of the lens, but the sensitivity of the fifth lens unit becomes much too large, which is unfavorable in the manufacturing and controlling of the focusing lens unit. When the focal length of the fifth lens unit compared with the longest focal length of the entire lens system is long as exceeding the upper limit of the condition (12), the minimization of the total length of the lens becomes insufficient.

The inequalities of condition (13) have an aim that within the framework of the condition (12), the ratio of the sensitivity for the wide-angle end and the sensitivity for the telephoto end is made proper. When the total zooming movement of the fifth lens unit compared with the zoom ratio and the focal length of the fifth lens unit is small as exceeding the the lower limit of the condition (13), the ratio of the sensitivities for the wide-angle and telephoto ends becomes much too small. So the total focusing movement in the wide-angle end becomes much too small. When the total zooming movement of the fifth lens unit is large as exceeding the upper limit of the condition (13), the total focusing movement in the wide-angle end increases largely. To create a space for this increase, the total length of the lens has to be increased objectionably.

It should be noted that, needless to say, it is desirable even in this embodiment to satisfy the other conditions (1) to (10). Three numerical examples 7 to 9 of this embodiment are shown below.

Numerical Example 7
F = 103-290    FNo = 1:4.6-5.7    2ω = 23.8 − 8.6

| | | | |
|---|---|---|---|
| R1 = 151.419 | D1 = 2.70 | N1 = 1.80518 | ν1 = 25.4 |
| R2 = 85.522 | D2 = 7.20 | N2 = 1.48749 | ν2 = 70.2 |
| R3 = −219.368 | D3 = 0.20 | | |
| R4 = 61.836 | D4 = 4.80 | N3 = 1.48749 | ν3 = 70.2 |
| R5 = 167.012 | D5 = Variable | | |
| R6 = −85.347 | D6 = 1.40 | N4 = 1.83481 | ν4 = 42.7 |
| R7 = 29.329 | D7 = 2.42 | | |
| R8 = 35.612 | D8 = 3.60 | N5 = 1.78472 | ν5 = 25.7 |
| R9 = 2177.654 | D9 = Variable | | |
| R10 = Stop | D10 = 8.50 | | |
| R11 = −252.784 | D11 = 1.60 | N6 = 1.84666 | ν6 = 23.9 |
| R12 = 87.928 | D12 = 2.60 | | |
| R13 = 96.615 | D13 = 5.30 | N7 = 1.61772 | ν7 = 49.8 |
| R14 = −37.882 | D14 = Variable | | |
| R15 = 39.984 | D15 = 6.50 | N8 = 1.48749 | ν8 = 70.2 |
| R16 = −38.235 | D16 = 1.40 | N9 = 1.83400 | ν9 = 37.2 |
| R17 = −92.140 | D17 = Variable | | |
| R18 = −514.962 | D18 = 1.20 | N10 = 1.83481 | ν10 = 42.7 |
| R19 = 53.917 | D19 = 1.30 | | |
| R20 = −148.709 | D20 = 1.10 | N11 = 1.83481 | ν11 = 42.7 |
| R21 = 22.894 | D21 = 3.20 | N12 = 1.76182 | ν12 = 26.5 |

Numerical Example 7
F = 103-290    FNo = 1:4.6-5.7    2ω = 23.8 − 8.6

R22 = 384.995

Lens Separations During Zooming

| Focal Length | 103.00 | 162.45 | 290.02 |
|---|---|---|---|
| D5 | 7.59 | 30.12 | 53.58 |
| D9 | 25.70 | 14.31 | 3.43 |
| D14 | 3.62 | 15.01 | 25.89 |
| D17 | 26.58 | 18.43 | 1.58 |

Numerical Example 8
F = 102-292    FNo = 1:4.6-5.7    2ω = 23.8 − 8.4

| | | | |
|---|---|---|---|
| R1 = 156.793 | D1 = 2.60 | N1 = 1.80518 | ν1 = 25.4 |
| R2 = 88.242 | D2 = 7.20 | N2 = 1.48749 | ν2 = 70.2 |
| R3 = −210.753 | D3 = 0.20 | | |
| R4 = 63.077 | D4 = 4.80 | N3 = 1.48749 | ν3 = 70.2 |
| R5 = 166.860 | D5 = Variable | | |
| R6 = −92.826 | D6 = 1.40 | N4 = 1.83481 | ν4 = 42.7 |
| R7 = 29.604 | D7 = 2.40 | | |
| R8 = 35.140 | D8 = 3.80 | N5 = 1.78472 | ν5 = 25.7 |
| R9 = 859.732 | D9 = Variable | | |
| R10 = Stop | D10 = 8.50 | | |
| R11 = −179.282 | D11 = 1.80 | N6 = 1.84666 | ν6 = 23.9 |
| R12 = 89.259 | D12 = 2.50 | | |
| R13 = 105.962 | D13 = 5.30 | N7 = 1.62374 | ν7 = 47.1 |
| R14 = −37.805 | D14 = Variable | | |
| R15 = 38.427 | D15 = 6.50 | N8 = 1.48749 | ν8 = 70.2 |
| R16 = −38.480 | D16 = 1.40 | N9 = 1.83400 | ν9 = 37.2 |
| R17 = −89.953 | D17 = Variable | | |
| R18 = −534.328 | D18 = 1.20 | N10 = 1.83481 | ν10 = 42.7 |
| R19 = 50.749 | D19 = 1.30 | | |
| R20 = −231.829 | D20 = 1.10 | N11 = 1.83481 | ν11 = 42.7 |
| R21 = 22.982 | D21 = 3.20 | N12 = 1.76182 | ν12 = 26.5 |
| R22 = 384.995 | | | |

Lens Separations During Zooming

| Focal Length | 102.50 | 162.54 | 292.04 |
|---|---|---|---|
| D5 | 8.26 | 31.98 | 56.66 |
| D9 | 28.24 | 16.14 | 6.44 |
| D14 | 3.10 | 14.02 | 22.49 |
| D17 | 27.03 | 18.86 | 1.98 |

Numerical Example 9
F = 72-205    FNo = 1:4-5.7    2ω = 33.4 − 12

| | | | |
|---|---|---|---|
| R1 = 156.592 | D1 = 2.50 | N1 = 1.80518 | ν1 = 25.4 |
| R2 = 81.673 | D2 = 5.50 | N2 = 1.51633 | ν2 = 64.1 |
| R3 = −180.309 | D3 = 0.20 | | |
| R4 = 59.077 | D4 = 3.80 | N3 = 1.48749 | ν3 = 70.2 |
| R5 = 116.654 | D5 = Variable | | |
| R6 = −63.522 | D6 = 1.60 | N4 = 1.80400 | ν4 = 46.6 |
| R7 = 29.983 | D7 = 2.50 | | |
| R8 = 35.776 | D8 = 3.50 | N5 = 1.84666 | ν5 = 23.9 |
| R9 = 160.174 | D9 = Variable | | |
| R10 = Stop | D10 = 5.00 | | |
| R11 = −36.727 | D11 = 1.80 | N6 = 1.83400 | ν6 = 37.2 |
| R12 = −333.474 | D12 = 0.50 | | |
| R13 = −296.400 | D13 = 4.50 | N7 = 1.48749 | ν7 = 70.2 |
| R14 = −30.837 | D14 = 0.20 | | |
| R15 = 195.329 | D15 = 5.00 | N8 = 1.51112 | ν8 = 60.5 |
| R16 = −40.915 | D16 = Variable | | |

-continued

Numerical Example 9
F = 72-205  FNo = 1:4-5.7  2ω = 33.4 − 12

| | | | |
|---|---|---|---|
| R17 = 40.212 | D17 = 6.30 | N9 = 1.48749 | ν9 = 70.2 |
| R18 = −40.212 | D18 = 1.60 | N10 = 1.83400 | ν10 = 37.2 |
| R19 = −284.938 | D19 = 0.20 | | |
| R20 = 108.141 | D20 = 3.00 | N11 = 1.51633 | ν11 = 64.1 |
| R21 = −165.797 | D21 = Variable | | |
| R22 = −219.549 | D22 = 2.50 | N12 = 1.80518 | ν12 = 25.4 |
| R23 = −48.294 | D23 = 1.20 | | |
| R24 = −46.114 | D24 = 1.80 | N13 = 1.77250 | ν13 = 49.6 |
| R25 = 41.025 | | | |

Lens Separations During Zooming

| Focal Length | 72.00 | 138.37 | 204.90 |
|---|---|---|---|
| D5 | 6.41 | 38.57 | 54.41 |
| D9 | 26.79 | 11.71 | 5.94 |
| D16 | 2.97 | 18.05 | 23.82 |
| D21 | 18.63 | 11.23 | 2.31 |

In the next embodiment, as shown in FIGS. 19 to 22, the fifth lens unit is moved rearward to effect focusing from an infinitely distant object to a closest object and at the same time either the second or the third lens unit is made to move as indicated by arrows of parallel solid line to the optical axis, thereby giving a good stability of optical performance throughout an extended focusing range. Even in this embodiment, zooming from the wide-angle end to the telephone end is performed by moving three or all of the lens units as indicated by arrows of inclined line curves. It is needless to say that the above-described conditions all should be satisfied. Four numerical examples 10 to 13 of this embodiment are shown below.

Numerical Example 10
F = 103-290  FNo = 1:4.6-5.7  2ω = 23.7 − 8.4

| | | | |
|---|---|---|---|
| R1 = 114.286 | D1 = 2.00 | N1 = 1.80518 | ν1 = 25.4 |
| R2 = 72.562 | D2 = 7.60 | N2 = 1.48749 | ν2 = 70.2 |
| R3 = −207.072 | D3 = 0.20 | | |
| R4 = 56.591 | D4 = 4.00 | N3 = 1.48749 | ν3 = 70.2 |
| R5 = 105.000 | D5 = Variable | | |
| R6 = −61.005 | D6 = 1.30 | N4 = 1.80400 | ν4 = 46.6 |
| R7 = 31.734 | D7 = 2.85 | | |
| R8 = 39.830 | D8 = 3.70 | N5 = 1.72825 | ν5 = 28.5 |
| R9 = −161.753 | D9 = Variable | | |
| R10 = Stop | D10 = 5.00 | | |
| R11 = −2008.834 | D11 = 1.60 | N6 = 1.84666 | ν6 = 23.9 |
| R12 = 80.150 | D12 = 2.60 | | |
| R13 = 80.211 | D13 = 5.50 | N7 = 1.52226 | ν7 = 60.6 |
| R14 = −35.893 | D14 = Variable | | |
| R15 = 44.110 | D15 = 6.20 | N8 = 1.48749 | ν8 = 70.2 |
| R16 = −32.668 | D16 = 1.40 | N9 = 1.83400 | ν9 = 37.2 |
| R17 = −67.966 | D17 = Variable | | |
| R18 = −150.229 | D18 = 1.00 | N10 = 1.88300 | ν10 = 40.8 |
| R19 = 37.471 | D19 = 1.30 | | |
| R20 = −375.210 | D20 = 3.00 | N11 = 1.76182 | ν11 = 26.5 |
| R21 = −21.869 | D21 = 1.00 | N12 = 1.77250 | ν12 = 49.6 |
| R22 = −800.000 | | | |

Lens Separations During Zooming

| Focal Length | 103.00 | 163.62 | 290.11 |
|---|---|---|---|
| D5 | 3.27 | 28.28 | 54.31 |
| D9 | 20.44 | 9.68 | 2.52 |
| D14 | 2.55 | 13.32 | 20.47 |
| D17 | 26.14 | 17.42 | 1.14 |

Numerical Example 11
F = 102-295  FNo = 1:4.6-5.7  2ω = 23.7 − 8.4

| | | | |
|---|---|---|---|
| R1 = 143.702 | D1 = 2.70 | N1 = 1.80518 | ν1 = 25.4 |
| R2 = 82.618 | D2 = 7.20 | N2 = 1.48749 | ν2 = 70.2 |
| R3 = −195.670 | D3 = 0.20 | | |
| R4 = 59.892 | D4 = 4.40 | N3 = 1.48749 | ν3 = 70.2 |
| R5 = 134.744 | D5 = Variable | | |
| R6 = −99.755 | D6 = 1.30 | N4 = 1.83481 | ν4 = 42.7 |
| R7 = 28.536 | D7 = 2.42 | | |
| R8 = 34.301 | D8 = 3.60 | N5 = 1.78472 | ν5 = 25.7 |
| R9 = 415.447 | D9 = Variable | | |
| R10 = Stop | D10 = 6.50 | | |
| R11 = −206.016 | D11 = 1.60 | N6 = 1.84666 | ν6 = 23.9 |
| R12 = 134.483 | D12 = 2.60 | | |
| R13 = 142.033 | D13 = 5.30 | N7 = 1.61720 | ν7 = 54.0 |
| R14 = −38.583 | D14 = Variable | | |
| R15 = 39.050 | D15 = 6.50 | N8 = 1.48749 | ν8 = 70.2 |
| R16 = −38.920 | D16 = 1.40 | N9 = 1.83400 | ν9 = 37.2 |
| R17 = −101.882 | D17 = Variable | | |
| R18 = 596.864 | D18 = 1.10 | N10 = 1.83481 | ν10 = 42.7 |
| R19 = 39.370 | D19 = 1.15 | | |
| R20 = −207.111 | D20 = 2.70 | N11 = 1.78472 | ν11 = 25.7 |
| R21 = −21.199 | D21 = 1.10 | N12 = 1.88300 | ν12 = 40.8 |
| R22 = −812.000 | | | |

Lens Separations During Zooming

| Focal Length | 103.00 | 163.72 | 295.18 |
|---|---|---|---|
| D5 | 5.09 | 28.86 | 53.59 |
| D9 | 30.32 | 19.63 | 9.34 |
| D14 | 4.00 | 13.17 | 21.87 |
| D17 | 27.36 | 19.28 | 2.46 |

Numerical Example 12
F = 103-290  FNo = 1:4.6-5.7  2ω = 23.7 − 8.4

| | | | |
|---|---|---|---|
| R1 = 114.286 | D1 = 2.00 | N1 = 1.80518 | ν1 = 25.4 |
| R2 = 72.562 | D2 = 7.60 | N2 = 1.48749 | ν2 = 70.2 |
| R3 = −207.072 | D3 = 0.20 | | |
| R4 = 56.591 | D4 = 4.00 | N3 = 1.48749 | ν3 = 70.2 |
| R5 = 105.000 | D5 = Variable | | |
| R6 = −61.005 | D6 = 1.30 | N4 = 1.80400 | ν4 = 46.6 |
| R7 = 31.734 | D7 = 2.85 | | |
| R8 = 39.830 | D8 = 3.70 | N5 = 1.72825 | ν5 = 28.5 |
| R9 = −161.753 | D9 = Variable | | |
| R10 = Stop | D10 = 5.00 | | |
| R11 = −2008.834 | D11 = 1.60 | N6 = 1.84666 | ν6 = 23.9 |
| R12 = 80.150 | D12 = 2.60 | | |
| R13 = 80.211 | D13 = 5.50 | N7 = 1.52226 | ν7 = 60.6 |
| R14 = −35.893 | D14 = Variable | | |
| R15 = 44.110 | D15 = 6.20 | N8 = 1.48749 | ν8 = 70.2 |
| R16 = −32.668 | D16 = 1.40 | N9 = 1.83400 | ν9 = 37.2 |
| R17 = −67.966 | D17 = Variable | | |
| R18 = 150.229 | D18 = 1.00 | N10 = 1.88300 | ν10 = 40.8 |
| R19 = 37.471 | D19 = 1.30 | | |
| R20 = −375.210 | D20 = 3.00 | N11 = 1.76182 | ν11 = 26.5 |
| R21 = −21.869 | D21 = 1.00 | N12 = 1.77250 | ν12 = 49.6 |

-continued

Numerical Example 12
F = 103–290  FNo = 1:4.6–5.7  2ω = 23.7 – 8.4

R22 = −800.000

Lens Separations During Zooming

| Focal Length | 103.00 | 163.62 | 290.11 |
|---|---|---|---|
| D5 | 3.27 | 28.28 | 54.31 |
| D9 | 20.44 | 9.68 | 2.52 |
| D14 | 2.55 | 13.32 | 20.47 |
| D17 | 26.14 | 17.42 | 1.14 |

Numerical Example 13
F = 102–295  FNo = 1:4.6–5.7  2ω = 23.7 – 8.4

| R1 = 143.702 | D1 = 2.70 | N1 = 1.80518 | ν1 = 25.4 |
| R2 = 82.618 | D2 = 7.20 | N2 = 1.48749 | ν2 = 70.2 |
| R3 = −195.670 | D3 = 0.20 | | |
| R4 = 59.892 | D4 = 4.40 | N3 = 1.48749 | ν3 = 70.2 |
| R5 = 134.744 | D5 = Variable | | |
| R6 = −99.755 | D6 = 1.30 | N4 = 1.83481 | ν4 = 42.7 |
| R7 = 28.536 | D7 = 2.42 | | |
| R8 = 34.301 | D8 = 3.60 | N5 = 1.78472 | ν5 = 25.7 |
| R9 = 415.447 | D9 = Variable | | |
| R10 = Stop | D10 = 6.50 | | |
| R11 = −206.016 | D11 = 1.60 | N6 = 1.84666 | ν6 = 23.9 |
| R12 = 134.483 | D12 = 2.60 | | |
| R13 = 142.033 | D13 = 5.30 | N7 = 1.61720 | ν7 = 54.0 |
| R14 = −38.583 | D14 = Variable | | |
| R15 = 39.050 | D15 = 6.50 | N8 = 1.48749 | ν8 = 70.2 |
| R16 = −38.920 | D16 = 1.40 | N9 = 1.83400 | ν9 = 37.2 |
| R17 = −101.882 | D17 = Variable | | |
| R18 = 596.864 | D18 = 1.10 | N10 = 1.83481 | ν10 = 42.7 |
| R19 = 39.370 | D19 = 1.15 | | |
| R20 = −207.111 | D20 = 2.70 | N11 = 1.78472 | ν11 = 25.7 |
| R21 = −21.199 | D21 = 1.10 | N12 = 1.88300 | ν12 = 40.8 |
| R22 = −812.000 | | | |

Lens Separations During Zooming

| Focal Length | 103.00 | 163.72 | 295.18 |
|---|---|---|---|
| D5 | 5.09 | 28.86 | 53.59 |
| D9 | 30.32 | 19.63 | 9.34 |
| D14 | 4.00 | 13.17 | 21.87 |
| D17 | 27.36 | 19.28 | 2.46 |

As has been described above, according to the present invention, it is made possible to provide a rear-focusing zoom lens which, though being very compact, has a high zoom ratio, while still maintaining good stability of optical performance throughout an extended focusing range.

What is claimed is:

1. A zoom lens comprising:
a front lens group having a plurality of lens units and having a positive refractive power as a whole; and
a rear lens group having a positive unit and a negative lens unit having a negative refractive power as a whole,
wherein zooming from a wide-angle end to a telephoto end is performed by varying lens separations between the successive two of said lens units, within and between said front lens group and said rear lens group, so as to increase the image magnification of said front lens group and also to increase the image magnification of said rear lens group, and focusing is performed by varying at least a lens separation between said positive lens unit of said rear lens group and said negative lens unit of said rear lens group.

2. A zoom lens according to claim 1, satisfying the following condition:

$$|\beta_5| < 1$$

where $\beta_4$ is the lateral magnification of said positive lens unit.

3. A zoom lens according to claim 1, wherein said positive lens unit is made to move to effect focusing.

4. A zoom lens according to claim 1, wherein said negative lens unit is made to move to effect focusing.

5. A zoom lens according to claim 1, wherein said positive lens unit is located on the object side of said negative lens unit.

6. A zoom lens according to claim 5, wherein said front lens group includes, from front to rear, a positive first lens unit, a negative second lens unit and a positive third lens unit and, wherein said positive lens unit and said negative lens unit of said rear lens group are made to be a fourth lens unit and a fifth lens unit, respectively.

7. A zoom lens according to claim 6, satisfying the following conditions:

$$0.5 < |f_5|/e_{5W} < 1.4$$

$$0.35 < \beta_{4T}/(\beta_{4W} \cdot Z) < 0.95$$

where
$e_{5W}$: the distance from a rear principal point of said fifth lens unit in the wide-angle end to an image plane;
$\beta_{4W}$: the lateral magnification of said fourth lens unit in the wide-angle end;
$\beta_{4T}$: the lateral magnification of said fourth lens unit in the telephoto end;
Z: the zoom ratio; and
$f_5$: the focal length of said fifth lens unit.

8. A zoom lens according to claim 6 or 7, wherein zooming from the wide angle end to the telephoto end is performed by widening a lens separation between said first lens unit and said second lens unit, narrowing a lens separation between said second lens unit and said third lens unit, widening a lens separation between said third lens unit and said fourth lens unit and narrowing a lens separation between said fourth lens unit and said fifth lens unit.

9. A zoom lens according to claim 8, wherein either said second lens unit or said third lens unit is also made to move to effect focusing.

10. A zoom lens according to claim 8, satisfying the following conditions:

$$M_5 < 0$$

$$0.07 < |f_5|/f_T < 0.45$$

$$0.095 < |M_5|/(Z \cdot |f_5|) < 0.5$$

where $M_5$ is the amount of movement of said fifth lens unit when zooming from the wide-angle end to the telephoto end (where the direction from the object side to the image side is taken as positive), $f_5$ is the focal length of said fifth lens unit, $f_T$ is the longest focal length of the entire lens system, and Z is the zoom ratio.

11. A zoom lens according to claim 4, wherein said positive lens unit is located on the object side of said negative lens unit.

12. A zoom lens according to claim 11, wherein said front lens group includes, from front to rear, a positive first lens unit, a negative second lens unit and a positive third lens unit and, wherein said positive lens unit and said negative lens unit of said rear lens group are made to be a fourth lens unit and a fifth lens unit, respectively.

13. A zoom lens according to claim 12, satisfying the following conditions:

$$0.01 < E_{5T}/(E_{5W} \cdot Z^2) < 0.7$$

$$0.07 < |f_5|/f_T < 0.45$$

$$0.095 < |M_5 = 1/(Z \cdot |f_5|) < 0.5$$

where $f_5$ is the focal length of said fifth lens unit, $E_{5T}$ and $E_{5W}$ are the sensitivities of said fifth lens unit in the telephoto end and the wide-angle end respectively, $f_T$ is the longest focal length of the entire lens system, $M_5$ is the amount of movement of said fifth lens unit when zooming from the wide-angle end to the telephoto end, and Z is the zoom ratio.

14. A zoom lens according to claim 13, wherein zooming from the wide angle end to the telephone end is performed by widening a lens separation between said first lens unit and said second lens unit, narrowing a lens separation between said second lens unit and said third lens unit, widening a lens separation between said third lens unit and said fourth lens unit and narrowing a lens separation between said fourth lens unit and said fifth lens unit.

15. A zoom lens according to claim 14, wherein either said negative second lens unit of said front lens group or said positive third lens unit of said front lens group is also made to move to effect focusing.

16. A zoom lens according to claim 14 or 15, satisfying the following conditions:

$$M_5 < 0$$

$$0.07 < |f_5|/f_T < 0.45$$

$$0.095 < |M_5|/(Z \cdot |f_5|) < 0.05$$

where $M_5$ is the amount of movement of said fifth lens unit when zooming from the wide-angle end to the telephoto end where the direction from the object side to the image side is taken as positive), $f_5$ is the focal length of said fifth lens unit, $f_T$ is the longest focal length of the entire lens system, and Z is the zoom ratio.

17. A zoom lens according to claim 9, satisfying the following conditions:

$$M_5 < 0$$

$$0.07 < |f_5|/f_t < 0.45$$

$$0.095 < |M_5|/Z \cdot |f_5|) < 0.5$$

where $M_5$ is the amount of movement of said fifth lens unit when zooming from the wide-angle end to the telephoto end (where the direction from the object side to the image side is taken as positive), $f_5$ is the focal length of said fifth lens unit, $f_T$ is the longest focal length of the entire lens system, and Z is the zoom ratio.

18. A zoom lens comprising:
a front lens group having a positive lens unit, a negative lens unit and a positive lens unit and having a positive refractive power as a whole; and
a rear lens group having a positive lens unit and a negative lens unit and having a negative refractive power as a whole,
wherein zooming is performed by varying each lens separation between the lens units, and focusing is performed by varying at least a lens separation between said positive lens unit and said negative lens unit of said rear lens group.

19. A zoom lens according to claim 18, satisfying the following conditions:

$$0.01 < E_{5T}/(E_{5W} \cdot Z^2) < 0.7$$

$$0.07 < |f_5|/f_T < 0.45$$

$$0.095 < |M_5|/(Z \cdot |f_5|) < 0.5$$

where $f_5$ is the focal length of said negative lens unit of said rear lens group, $E_{5T}$ and $E_{5W}$ are the sensitivities of said negative lens unit of said rear lens group in a telephoto end and a wide-angle end respectively, $f_T$ is the longest focal length of the entire lens system, $M_5$ is the amount of movement of said negative lens unit of said rear lens group when zooming from the wide-angle end to the telephoto end (where the direction from the object side to the image side is taken as positive), and Z is the zoom ratio.

20. A zoom lens according to claim 18, wherein zooming from the wide-angle end to the telephoto end is performed by narrowing a lens separation between said positive lens unit and said negative lens unit of said rear lens group.

* * * * *

UNITED STATES PATENT AND TRADEMARK OFFICE
CERTIFICATE OF CORRECTION

PATENT NO. : 5,241,421

DATED : August 31, 1993

INVENTOR(S) : HIROSHI ENDO, ET AL

It is certified that error appears in the above-indentified patent and that said Letters Patent is hereby corrected as shown below:

COLUMN 2:

Line 35, "4()A) -2," should read --4 (A) -2,--.

COLUMN 10:

Line 51, "FNo = 1:4.5 - 5.7" should read --FNo = 1:4.6 -5.7--.

COLUMN 12:

Line 35, "preferably" should read --preferable--.

COLUMN 18:

Line 9, "$|B_5|<1$" should read --$|B_4|<1$--; and
Line 17, "claim 1," should read --claim 3,--.

UNITED STATES PATENT AND TRADEMARK OFFICE
CERTIFICATE OF CORRECTION

PATENT NO. : 5,241,421

DATED : August 31, 1993

INVENTOR(S) : HIROSHI ENDO, ET AL

It is certified that error appears in the above-indentified patent and that said Letters Patent is hereby corrected as shown below:

COLUMN 19:

Line 17, "$0.095 < |M5 \equiv 1/(z \cdot |f_5|) < 0.5$" should read --$0.095 < |M5|/(z \cdot |f_5|) < 0.5$--.
Line 25, "end," should read --end (where the direction from the object side to the image side is taken as postive),--
Line 51, "where" should read --(where--.

COLUMN 20:

Line 8, "$0.07 < |f5|/f_t < 0.45$" should read --$0.07 < |f_5|/f_T < 0.45$--.

Signed and Sealed this

Thirty-first Day of May, 1994

BRUCE LEHMAN

Attest:

Attesting Officer

Commissioner of Patents and Trademarks